US007899977B2

(12) United States Patent
Pandya

(10) Patent No.: US 7,899,977 B2
(45) Date of Patent: *Mar. 1, 2011

(54) PROGRAMMABLE INTELLIGENT SEARCH MEMORY

(76) Inventor: Ashish A. Pandya, El Dorado Hills, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 11/952,114

(22) Filed: Dec. 6, 2007

(65) Prior Publication Data

US 2008/0140912 A1 Jun. 12, 2008

Related U.S. Application Data

(60) Provisional application No. 60/965,267, filed on Aug. 17, 2007, provisional application No. 60/965,170, filed on Aug. 17, 2007, provisional application No. 60/963,059, filed on Aug. 1, 2007, provisional application No. 60/961,596, filed on Jul. 23, 2007, provisional application No. 60/933,313, filed on Jun. 6, 2007, provisional application No. 60/933,332, filed on Jun. 6, 2007, provisional application No. 60/930,607, filed on May 17, 2007, provisional application No. 60/928,883, filed on May 10, 2007, provisional application No. 60/873,632, filed on Dec. 8, 2006, provisional application No. 60/873,889, filed on Dec. 8, 2006.

(51) Int. Cl.
*G06F 13/00* (2006.01)
*G06F 13/28* (2006.01)

(52) U.S. Cl. .................. 711/103; 711/108; 711/E12.002

(58) Field of Classification Search .................. 711/103, 711/108, E12.002
See application file for complete search history.

(56) References Cited

U.S. PATENT DOCUMENTS

| 6,778,557 | B1 | 8/2004 | Yuki et al. |
|---|---|---|---|
| 6,892,237 | B1 * | 5/2005 | Gai et al. ................ 709/224 |
| 7,353,332 | B2 * | 4/2008 | Miller et al. ................ 711/108 |
| 7,406,470 | B2 | 7/2008 | Mathur et al. |
| 7,464,254 | B2 | 12/2008 | Sharangpani et al. |
| 7,472,285 | B2 | 12/2008 | Graunke et al. |
| 7,660,140 | B1 * | 2/2010 | Joshi et al. ................ 365/49.17 |
| 7,685,254 | B2 | 3/2010 | Pandya |
| 2002/0161664 | A1 | 10/2002 | Shaya et al. |
| 2004/0059443 | A1 | 3/2004 | Sharangpani |
| 2004/0083387 | A1 | 4/2004 | Dapp et al. |
| 2004/0215593 | A1 * | 10/2004 | Sharangpani et al. ............ 707/1 |
| 2005/0012521 | A1 | 1/2005 | Sharangpani et al. |
| 2005/0052934 | A1 | 3/2005 | Tran |
| 2005/0108518 | A1 | 5/2005 | Pandya |
| 2005/0216770 | A1 * | 9/2005 | Rowett et al. ................ 713/201 |
| 2006/0085533 | A1 | 4/2006 | Hussain et al. |

(Continued)

OTHER PUBLICATIONS

Notice of Allowance issued in U.S. Appl. No. 11/952,103, mailed Jun. 28, 2010.

(Continued)

*Primary Examiner* — Sheng-Jen Tsai
*Assistant Examiner* — Edward J Dudek, Jr.
(74) *Attorney, Agent, or Firm* — DLA Piper LLP US

(57) ABSTRACT

Memory architecture provides capabilities for high performance content search. The architecture creates an innovative memory that can be programmed with content search rules which are used by the memory to evaluate presented content for matching with the programmed rules. When the content being searched matches any of the rules programmed in the Programmable Intelligent Search Memory (PRISM) action (s) associated with the matched rule(s) are taken. Content search rules comprise of regular expressions which are converted to finite state automata and then programmed in PRISM for evaluating content with the search rules.

16 Claims, 25 Drawing Sheets

State Block Bit In PRISM

U.S. PATENT DOCUMENTS

| | | | |
|---|---|---|---|
| 2006/0136570 A1* | 6/2006 | Pandya | 709/217 |
| 2006/0253816 A1* | 11/2006 | Gould et al. | 716/5 |
| 2007/0038798 A1 | 2/2007 | Bouchard et al. | |
| 2007/0061884 A1 | 3/2007 | Dapp et al. | |
| 2007/0255894 A1 | 11/2007 | Hessel et al. | |
| 2008/0008202 A1 | 1/2008 | Terrell et al. | |
| 2008/0046423 A1 | 2/2008 | Khan Alicherry et al. | |
| 2008/0133517 A1 | 6/2008 | Kapoor et al. | |
| 2008/0255839 A1 | 10/2008 | Larri et al. | |
| 2009/0100055 A1 | 4/2009 | Wang | |

OTHER PUBLICATIONS

Notice of Allowance issued in U.S. Appl. No. 11/952,104, mailed Jun. 30, 2010.
Notice of Allowance issued in U.S. Appl. No. 11/952,112, mailed Jun. 28, 2010.
Amendment filed Aug. 12, 2010 in U.S. Appl. No. 11/952,108.
Amendment filed Aug. 12, 2010 in U.S. Appl. No. 11/952,117.
Amendment filed Aug. 12, 2010 in U.S. Appl. No. 11/952,110.
Ville Laurikari, "NFAs with Tagged Transitions, Their Conversion to Deterministic Automata and Application to Regular Expressions", Seventh International Symposium on String Processing Infomratino Retrieval (SPIRE'00), Sep. 27-29, 2000.
Gerard Berry et al,, "From Regular Expressions to Deterministic Automata", Theoretical Computer Science, vol. 48, pp. 117-126 (1986).
Bruce W. Watson, "A Taxonomy of Finite Automata Contruction Algorithms", Computing Science, May 18, 1994.
Sailesh Kumar et al., "Algorithms to Accelerate Multiple Regular Expression Matching for Deep Packet Inspection", SIGCOMM'06, Sep. 11-15, 2006, Pisa, Italy, pp. 339-350.
Reetinder Sidhu et al., "Fast Regular Expression Matching Using FPGAs", Proceedings of the 9th Annual IEEE Symposium of Field-Programmable Custom Computing Machines, pp. 227-238 (2001).
Alfred V. Aho et al., "Efficient String Matching: An Aid to Bibliographic Search", Communication of the ACM, vol. 18, No. 6, pp. 333-340, Jun. 1975.
James Moscola et al., "Implementation of a Content-Scanning Module for an Internet Firewall", Proceedings of the 11th Annual IEEE Symposium on Field-Programmable Custom Computing Machines, pp. 31, 2003 (9 pages).
Sarang Dhamapurikar et al., "Deep Packet Inspection Using Parallell Bloom Filters", Hot Interconnects 11, IEEE Computer Society, pp. 52-61, Jan. 2004.
Ken Thompson, "Regular Expression Search Algorithm", Communication of the ACM, vol. 11, No. 6, pp. 419-422, Jun. 1968.
S.C. Kleene, "Representation of Events in Nerve Nets and Finite Automata", In Automata Studies, C.E. Shannon and J. McCarthy (eds.), Princeton, University Press, 1956, pp. 3-40.
M. O. Rabin et al., "Finite Automata and Their Decision Problems", IBM Journal, pp. 114-125, Apr. 1959.
John E. Hopcroft et al., "Introduction to Automata Theory, Language, and Computation", Addison-Wesley Publishing Company, 1979.
File History of U.S. Appl. No. 11/952,028.
File History of U.S. Appl. No. 11/952,043.
File History of U.S. Appl. No. 11/952,103.
File History of U.S. Appl. No, 11/952,104.
File History of U.S. Appl. No. 11/952,108.
File History of U.S. Appl. No. 11/952,110.
File History of U.S. Appl. No. 11/952,111.
File History of U.S. Appl. No. 11/952,112.
File History of U.S. Appl. No. 11/952,117.
Office Action issued in U.S. Appl. No. 11/952,111, mailed Sep. 20, 2010.
Office Action issued in U.S. Appl. No. 11/952,028, mailed Sep. 22, 2010.
Notice of Allowance issued in U.S. Appl. No. 11/952,110, mailed Oct. 14, 2010.
Notice of Allowance issued in U.S. Appl. No. 11/952,108, mailed Sep. 24, 2010.
Notice of Allowance issued in U.S. Appl. No. 11/952,117, mailed Oct. 28, 2010.
Notice of Allowance issued in U.S. Appl. No. 11/952,043, mailed Nov. 22, 2010.
Alfred V. Aho et al., "Compilers: Principles, Techniques, and Tools", Pearson Education Inc., Aug. 31, 2006.
File History of U.S. Appl. No. 12/899,336, Dec. 16, 2010.
File History of U.S. Appl. No. 12/902,485, Dec. 16, 2010.
File History of U.S. Appl. No. 12/902,500, Dec. 16, 2010.

* cited by examiner

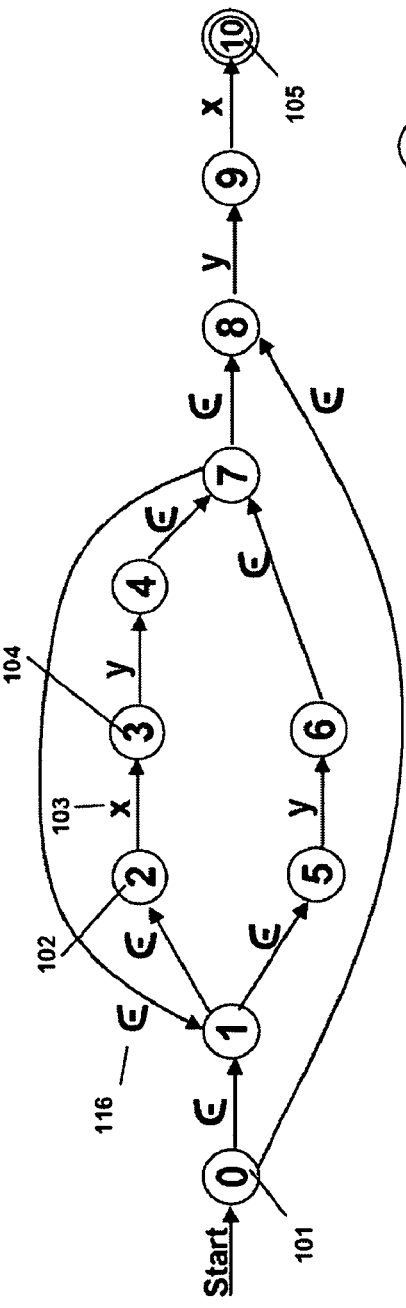
Fig. 1a Thompson's NFA (Prior Art)
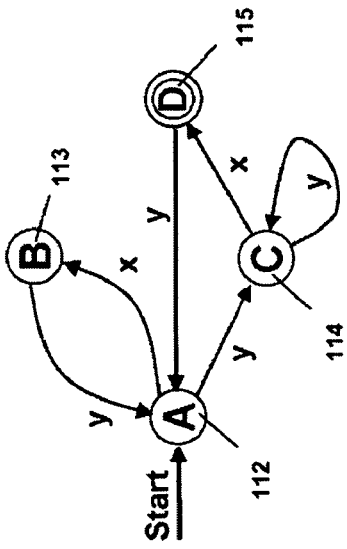
Fig. 1c DFA (Prior Art)
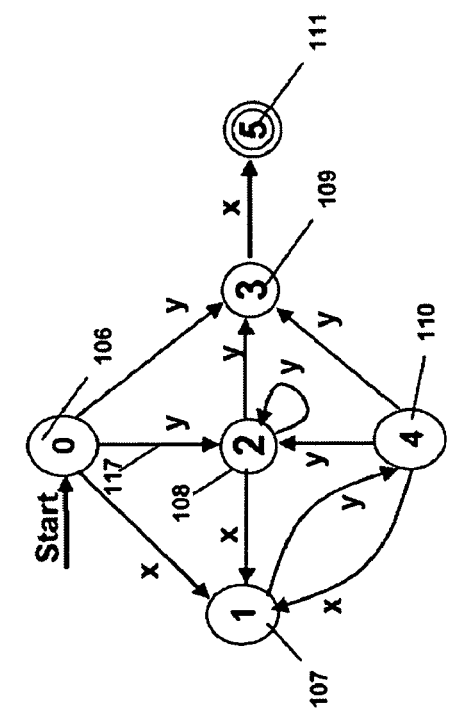
Fig. 1b Berry-Sethi NFA (Prior Art)

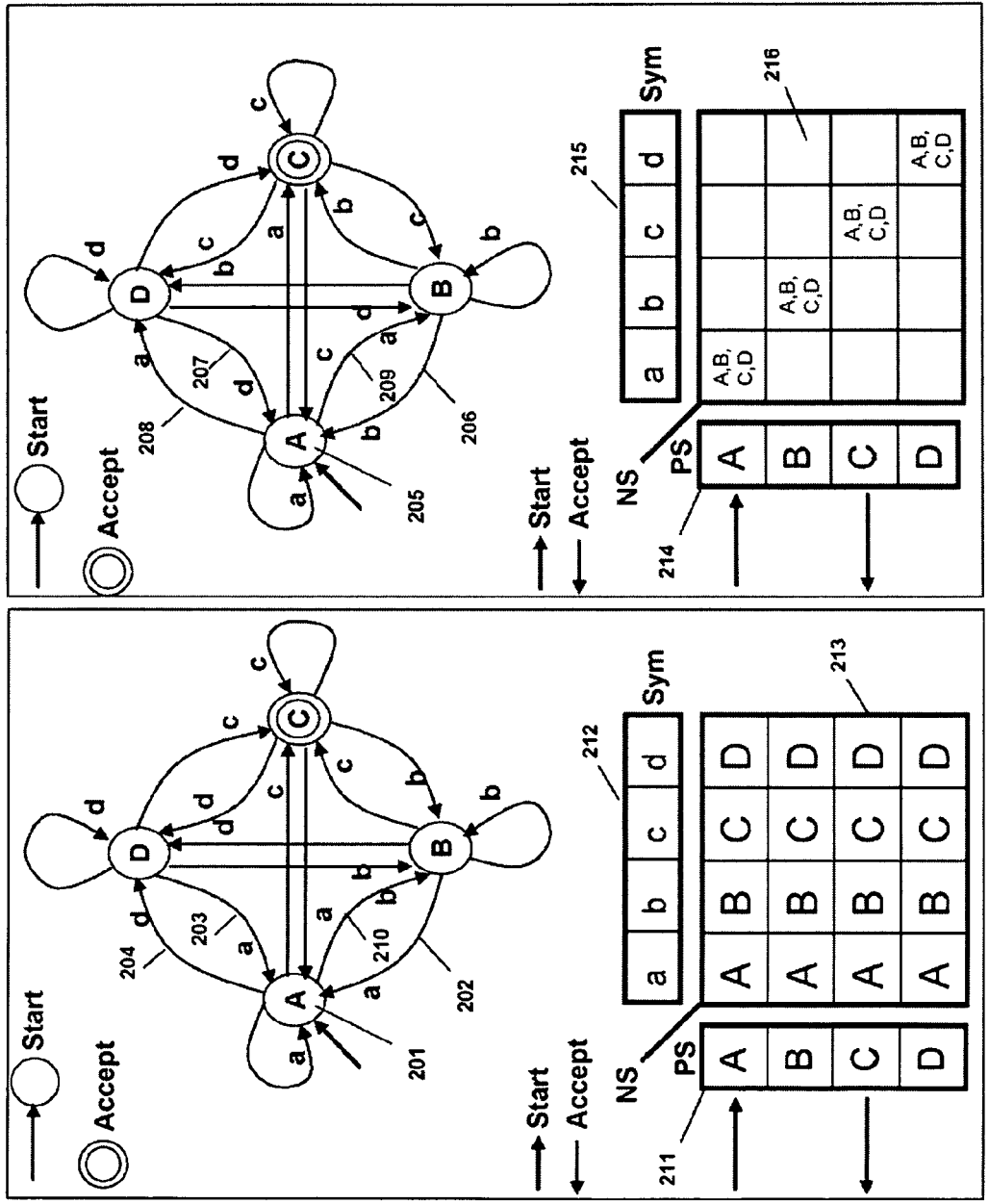
Fig. 2a A Left-biased NFA & State Transition Table (Prior Art)
Fig. 2b A Right-biased NFA & State Transition Table (Prior Art)

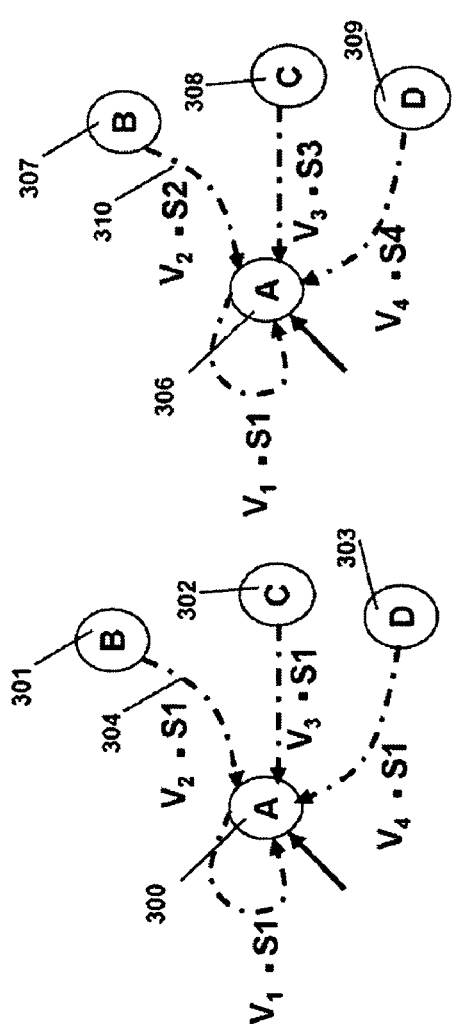
Fig. 3a State Transition Controls
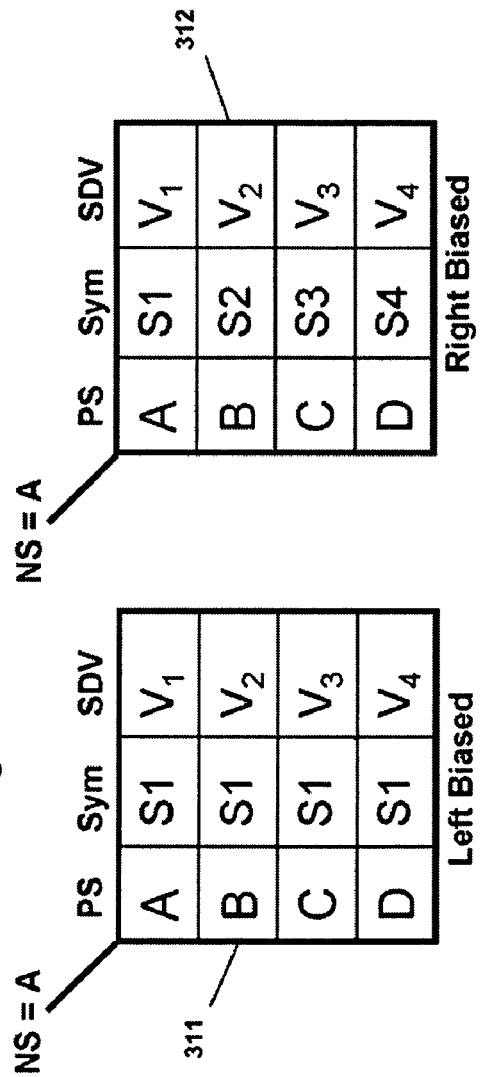
Fig. 3b Configurable Next State Table per State
State Prop: LB, RB, SDV, Start, Accept, Action

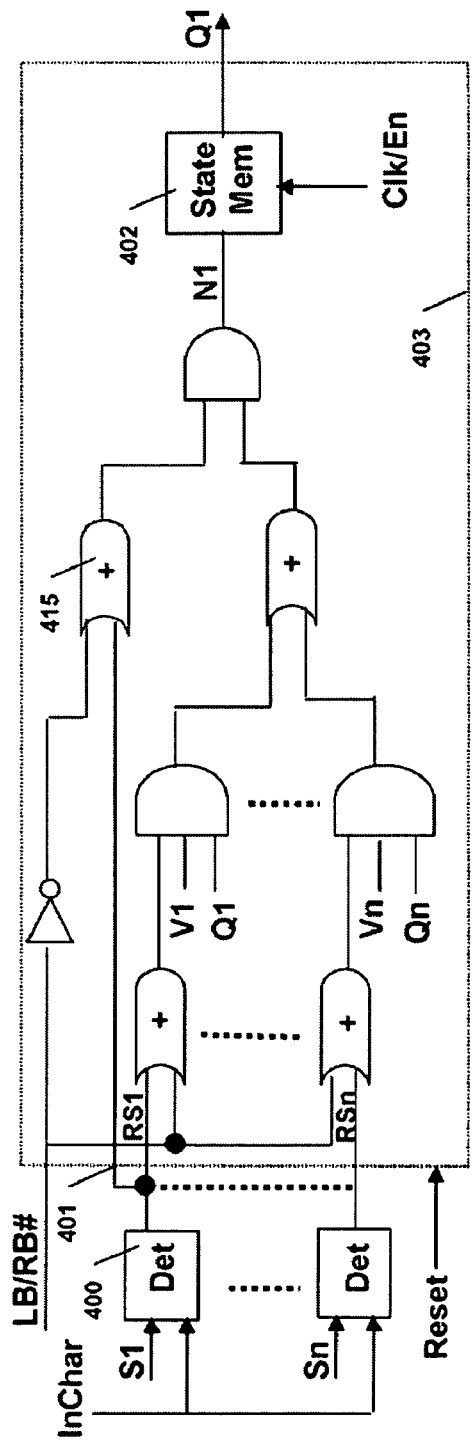
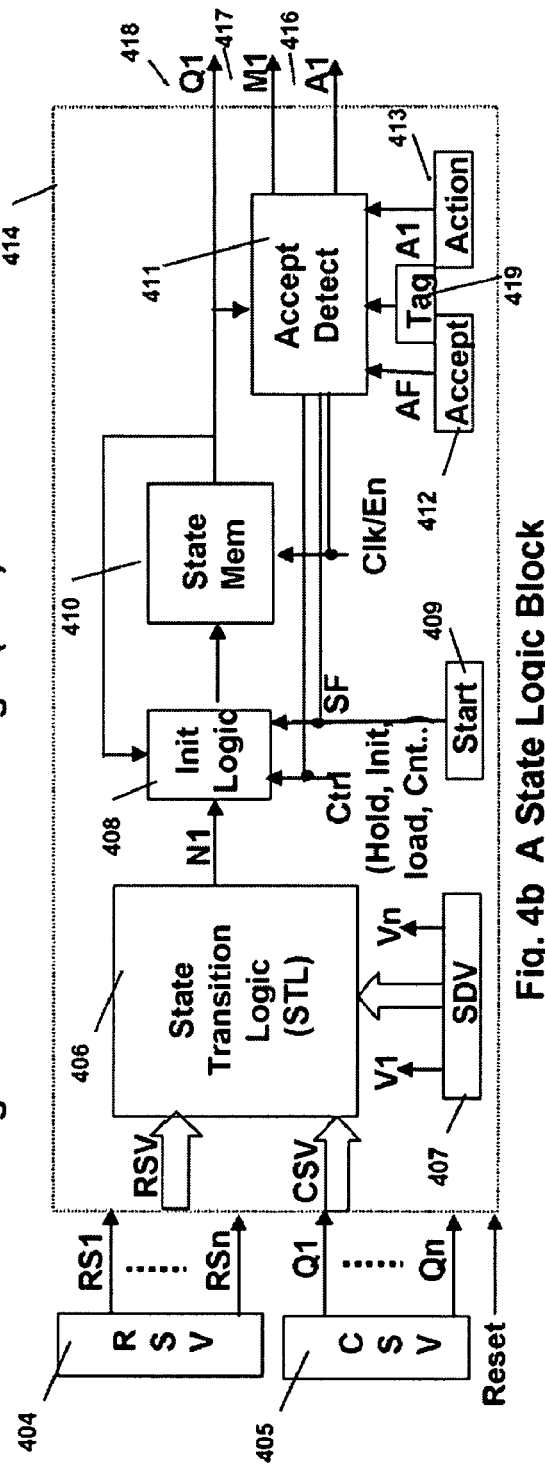
Fig. 4a State transition logic (STL) for a state
Fig. 4b A State Logic Block

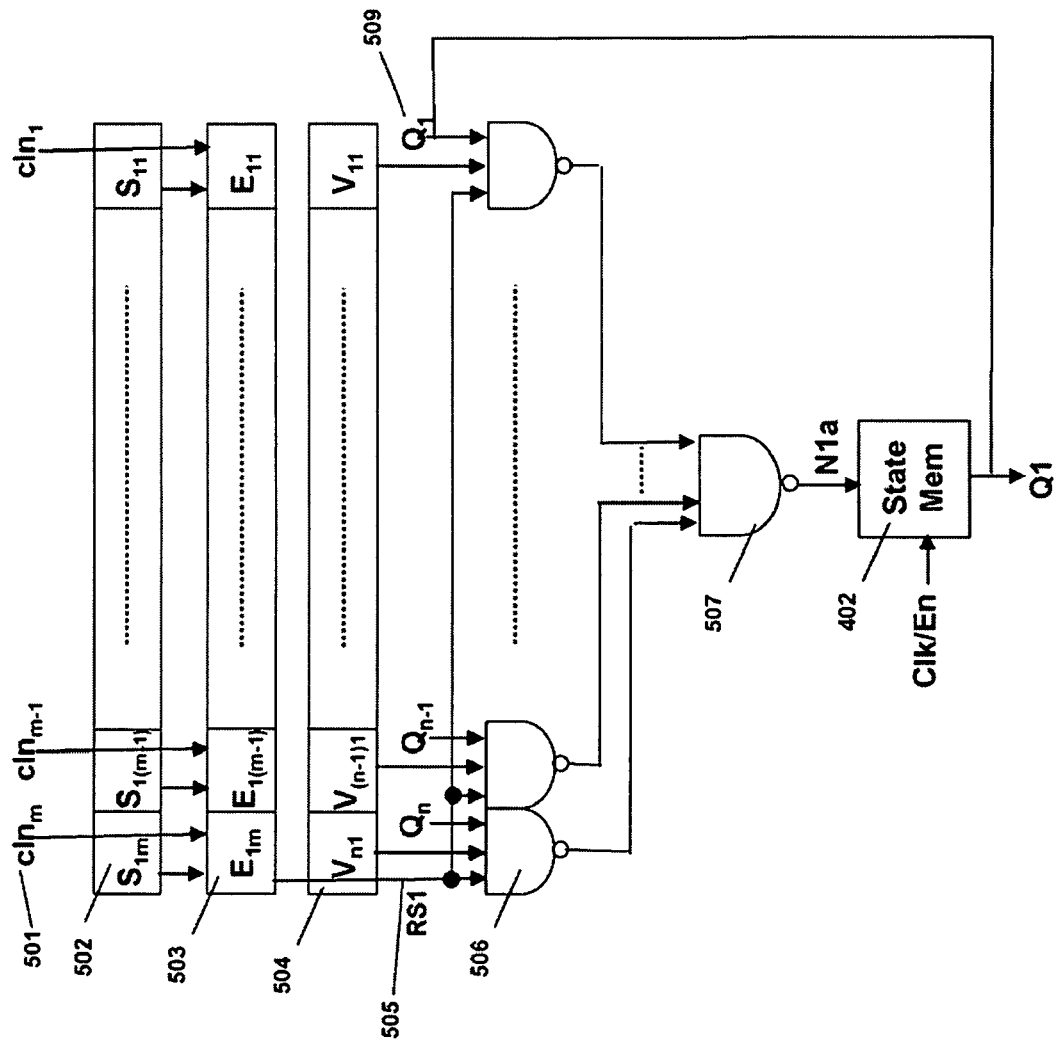
Fig. 5a State transition logic (STL) for a state in Left-biased FSA

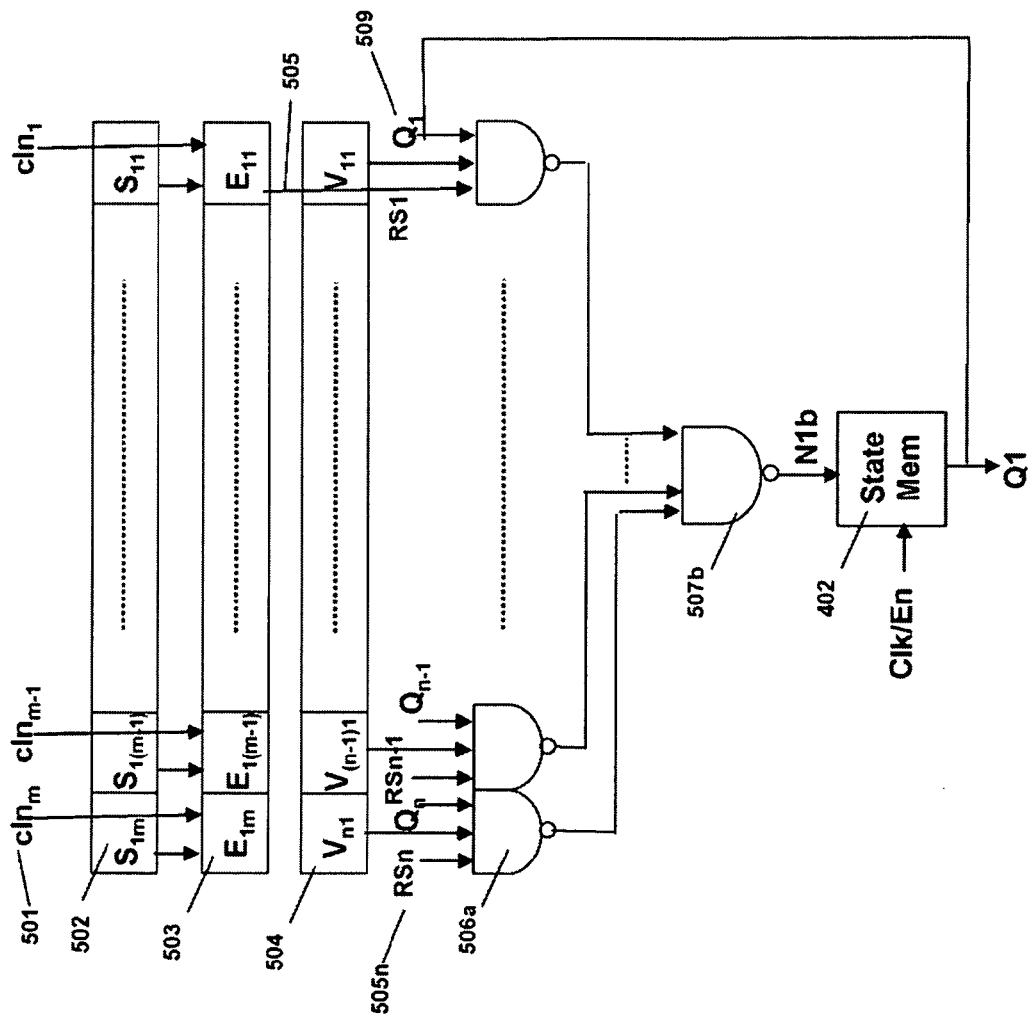
Fig. 5b State transition logic (STL) for a state in Right-biased FSA

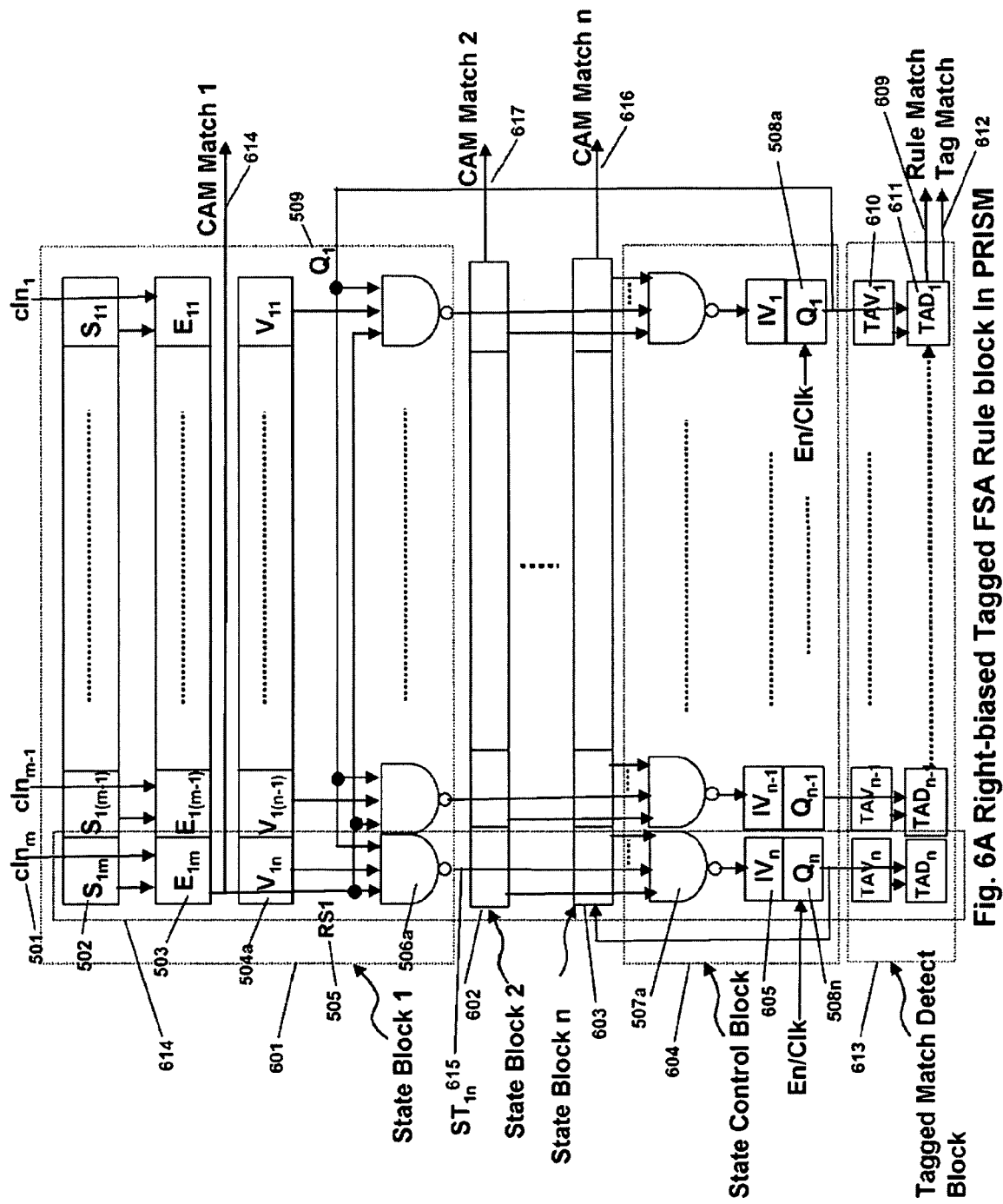

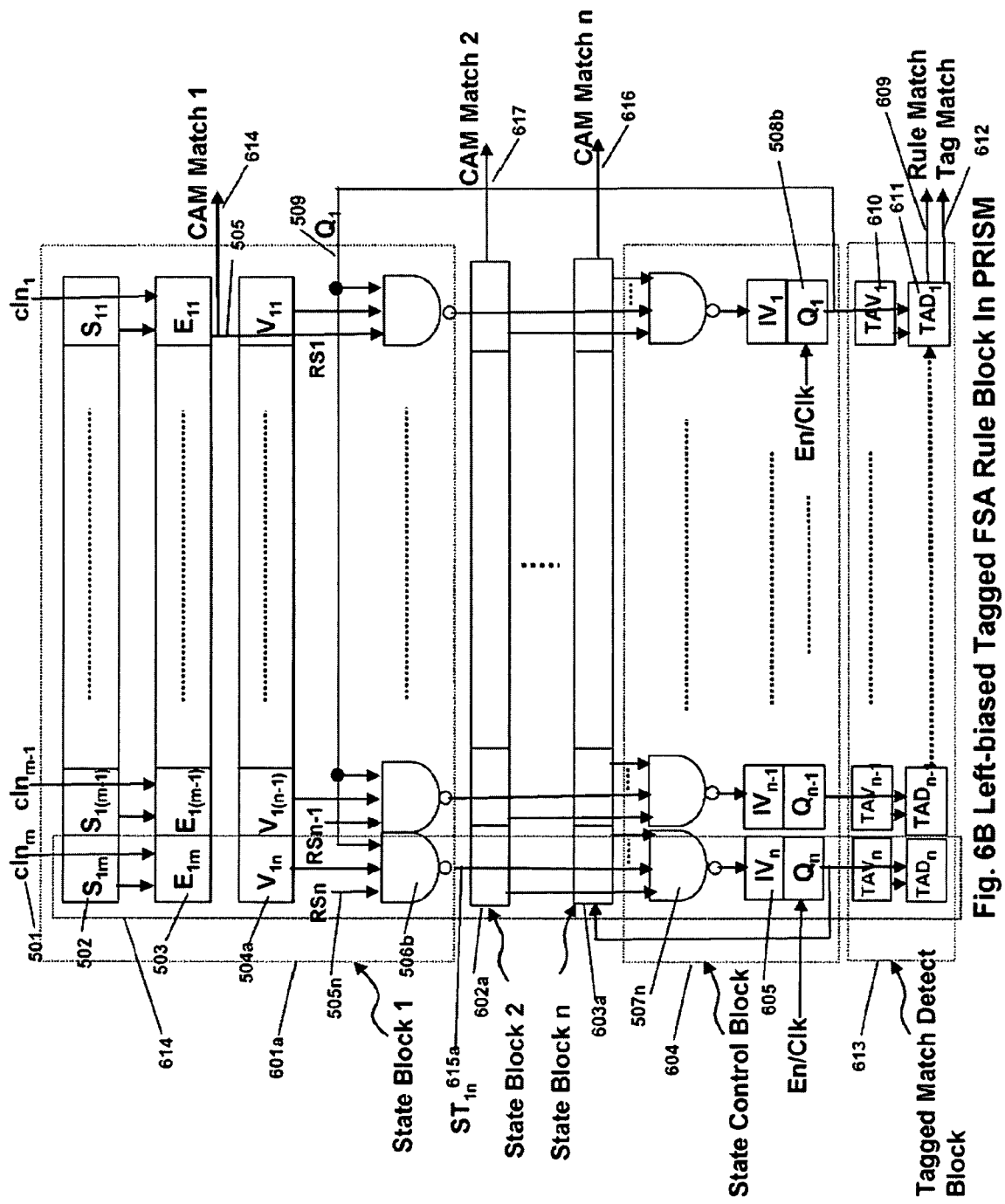
Fig. 6B Left-biased Tagged FSA Rule Block In PRISM

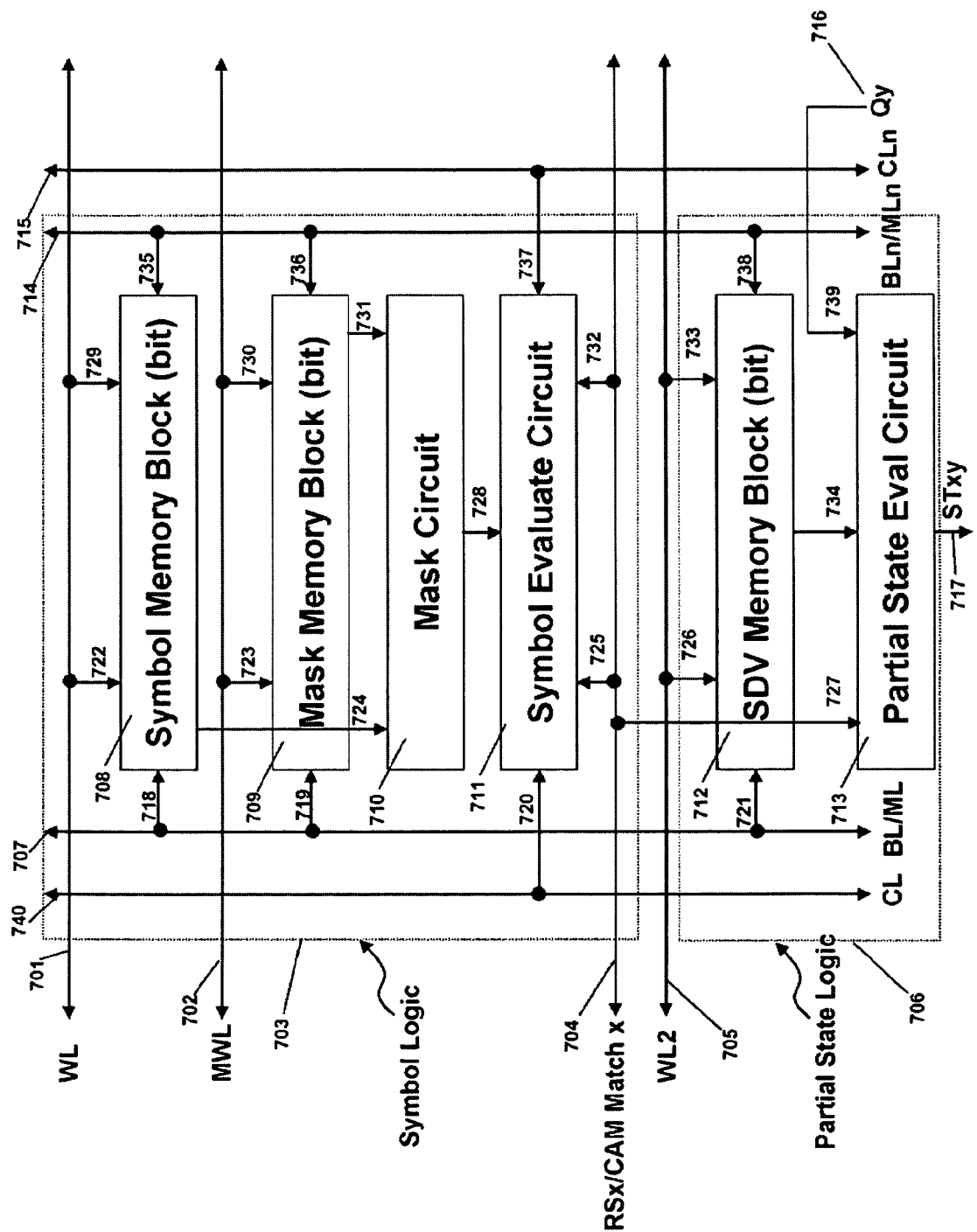
Fig. 7A State Block Bit In PRISM

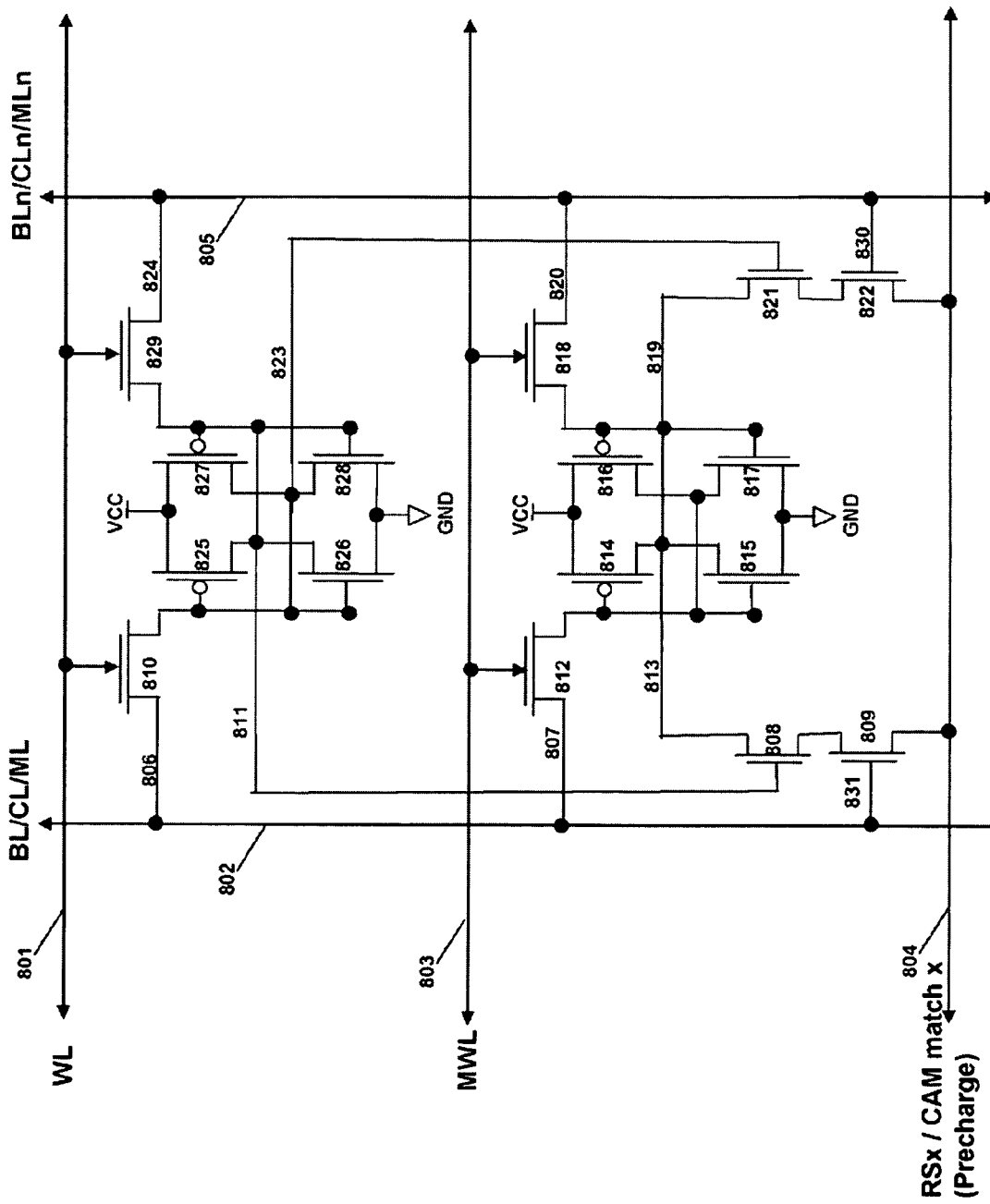
Fig. 8A Symbol Logic Bit in PRISM

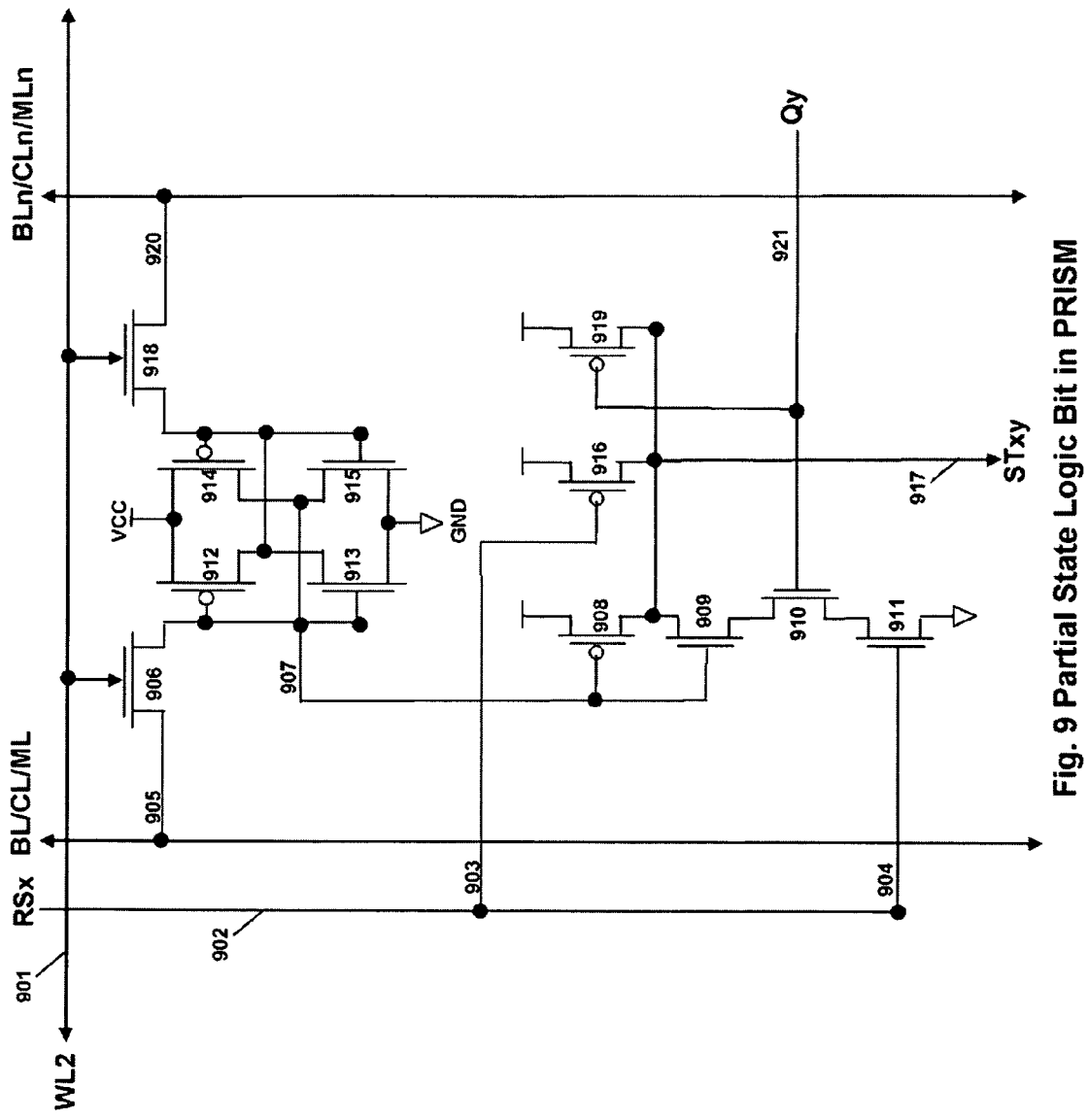
Fig. 9 Partial State Logic Bit in PRISM

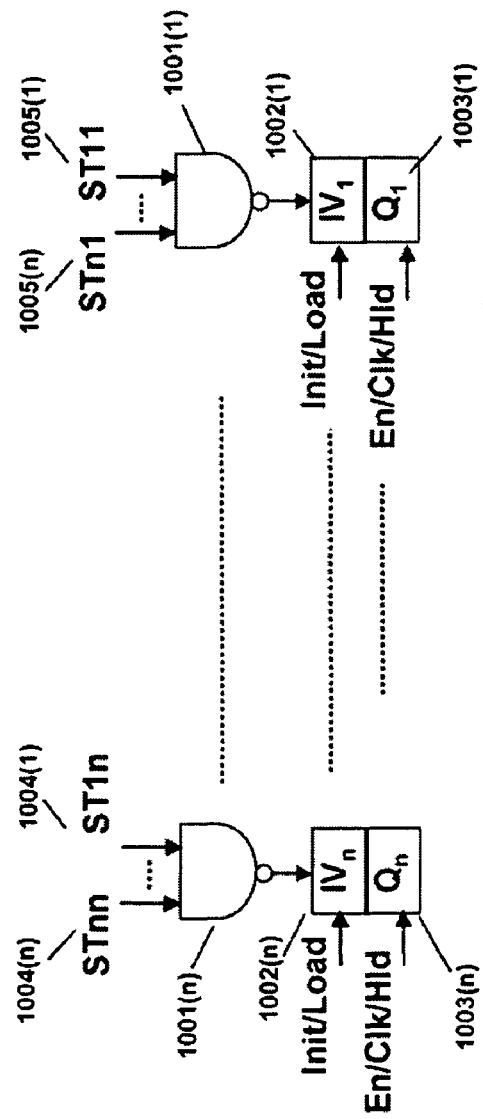
Fig. 10a State Control Block in PRISM
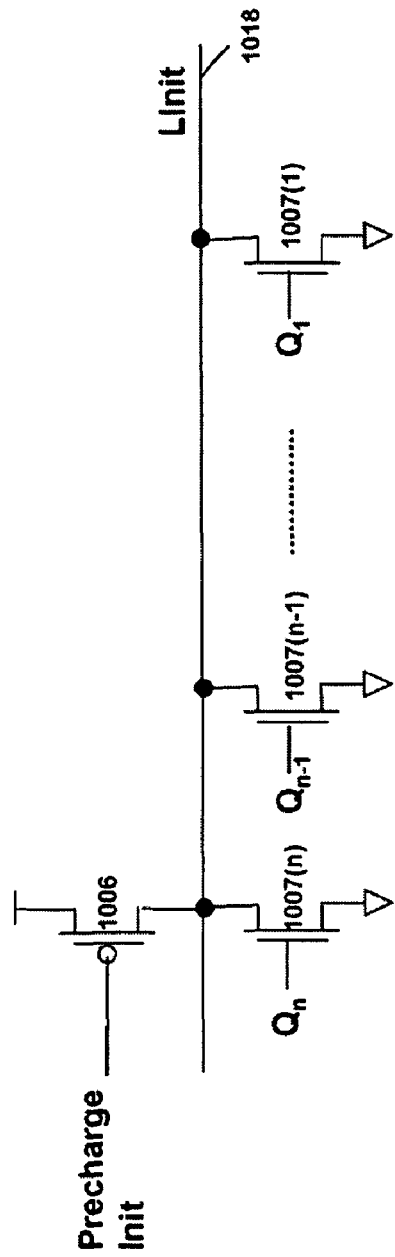
Fig. 10b Local Init Detect Circuit in PRISM

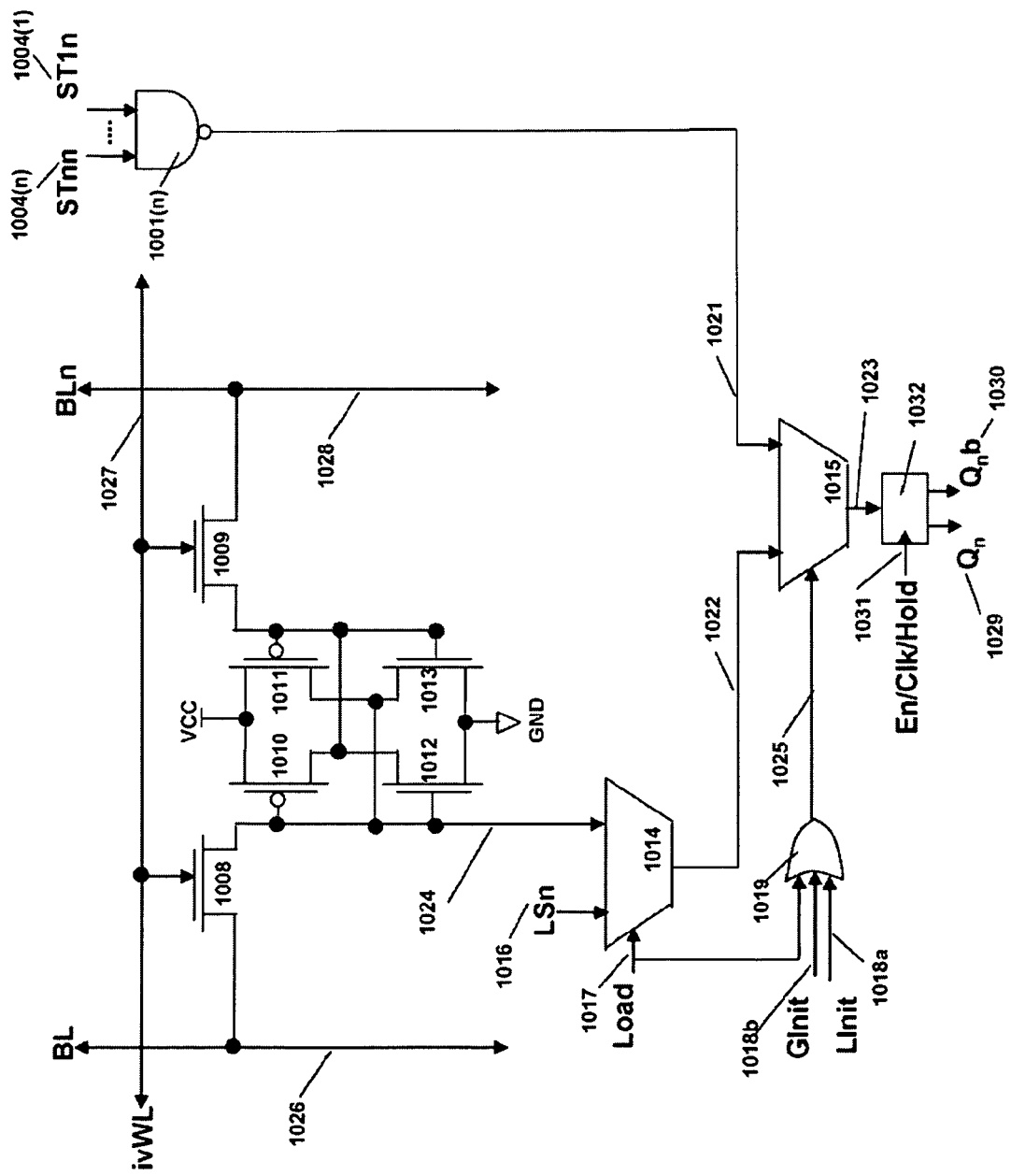
Fig. 10c State Control Block Bit in PRISM

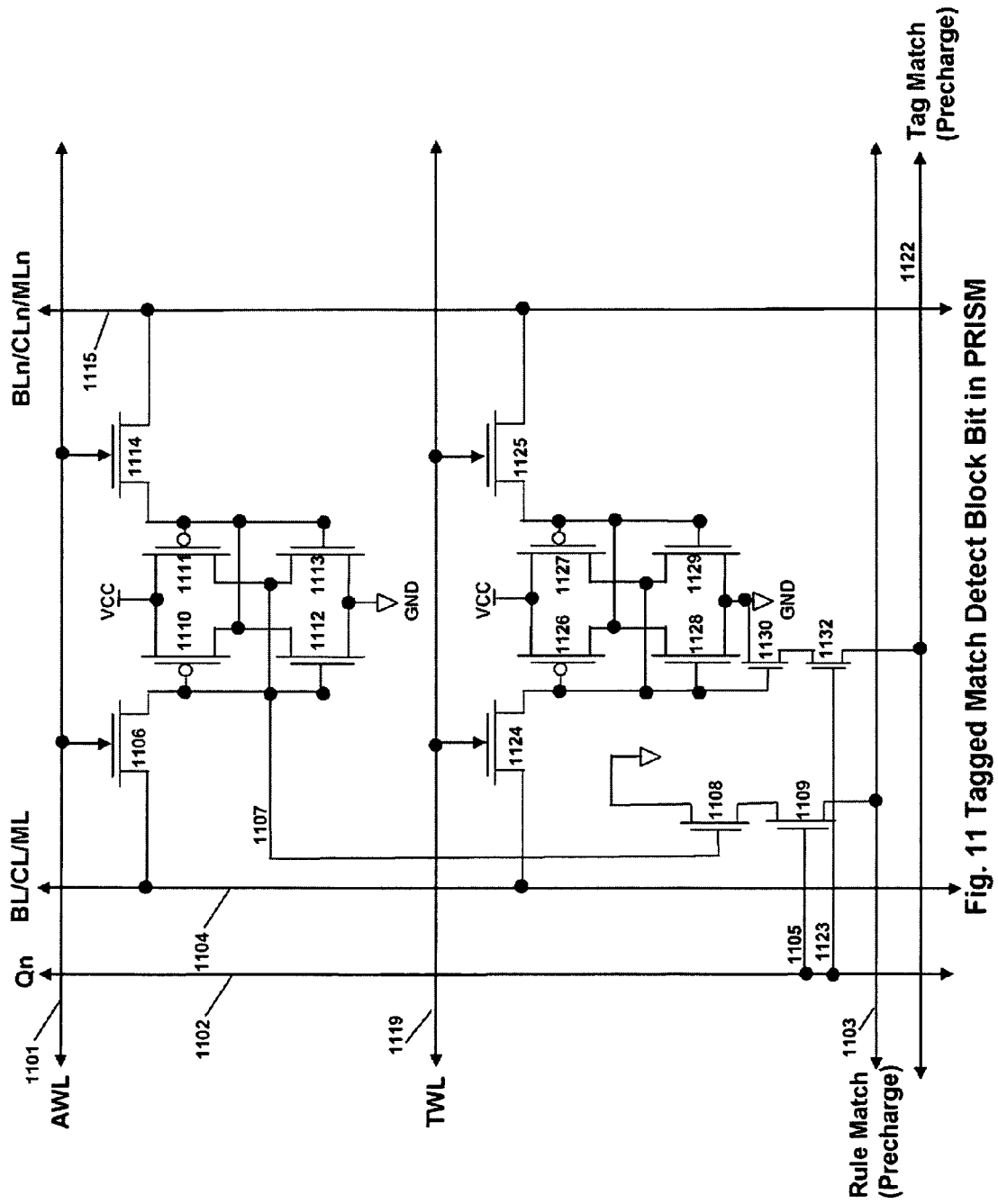

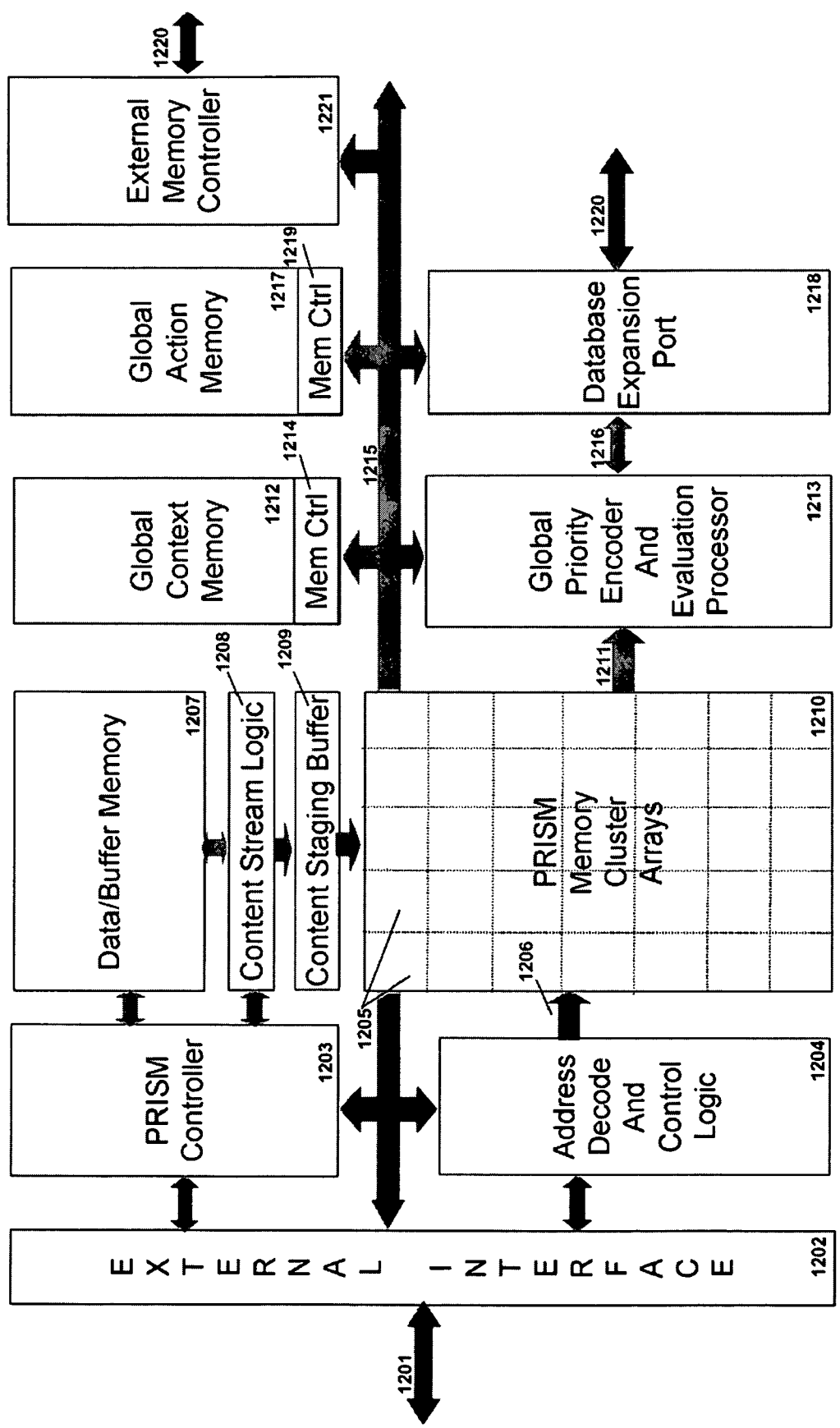
Fig. 12 PRISM Block Diagram

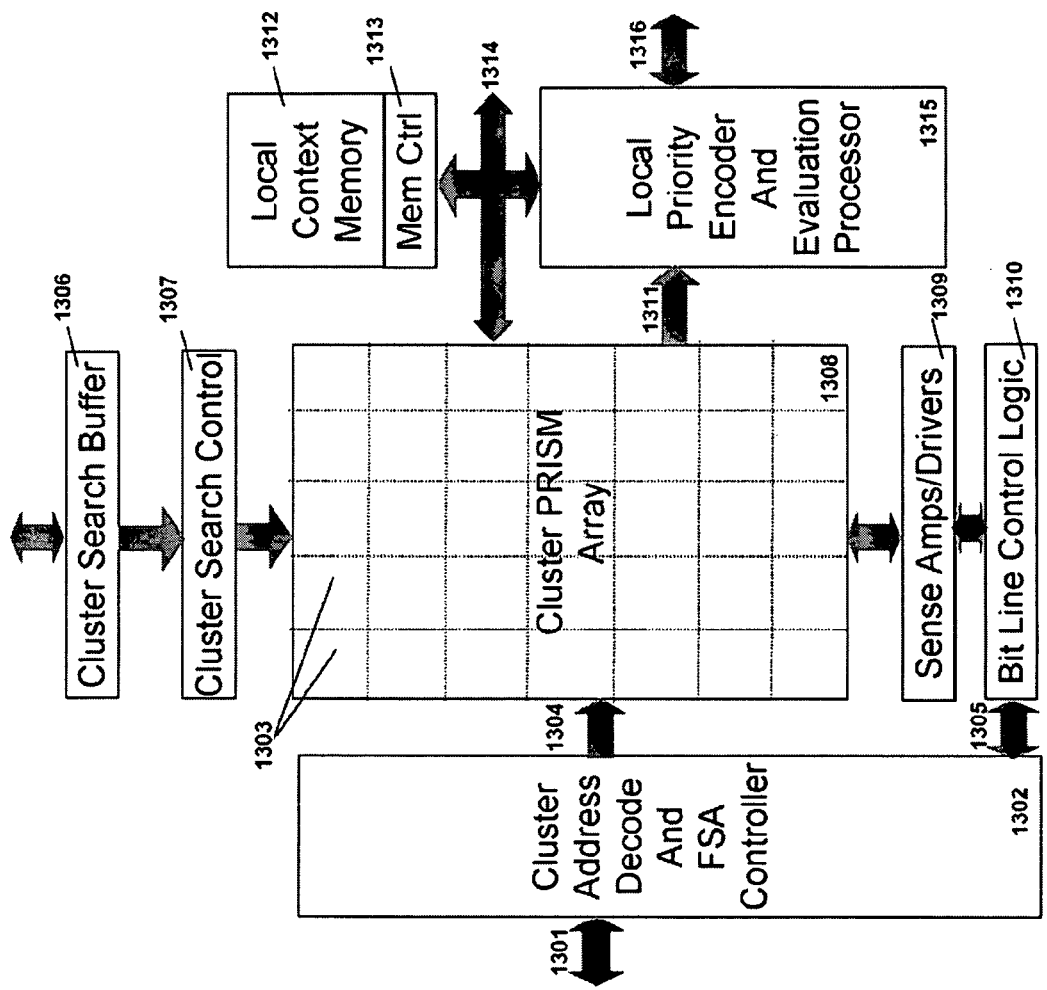
Fig. 13a PRISM Memory Cluster Block Diagram

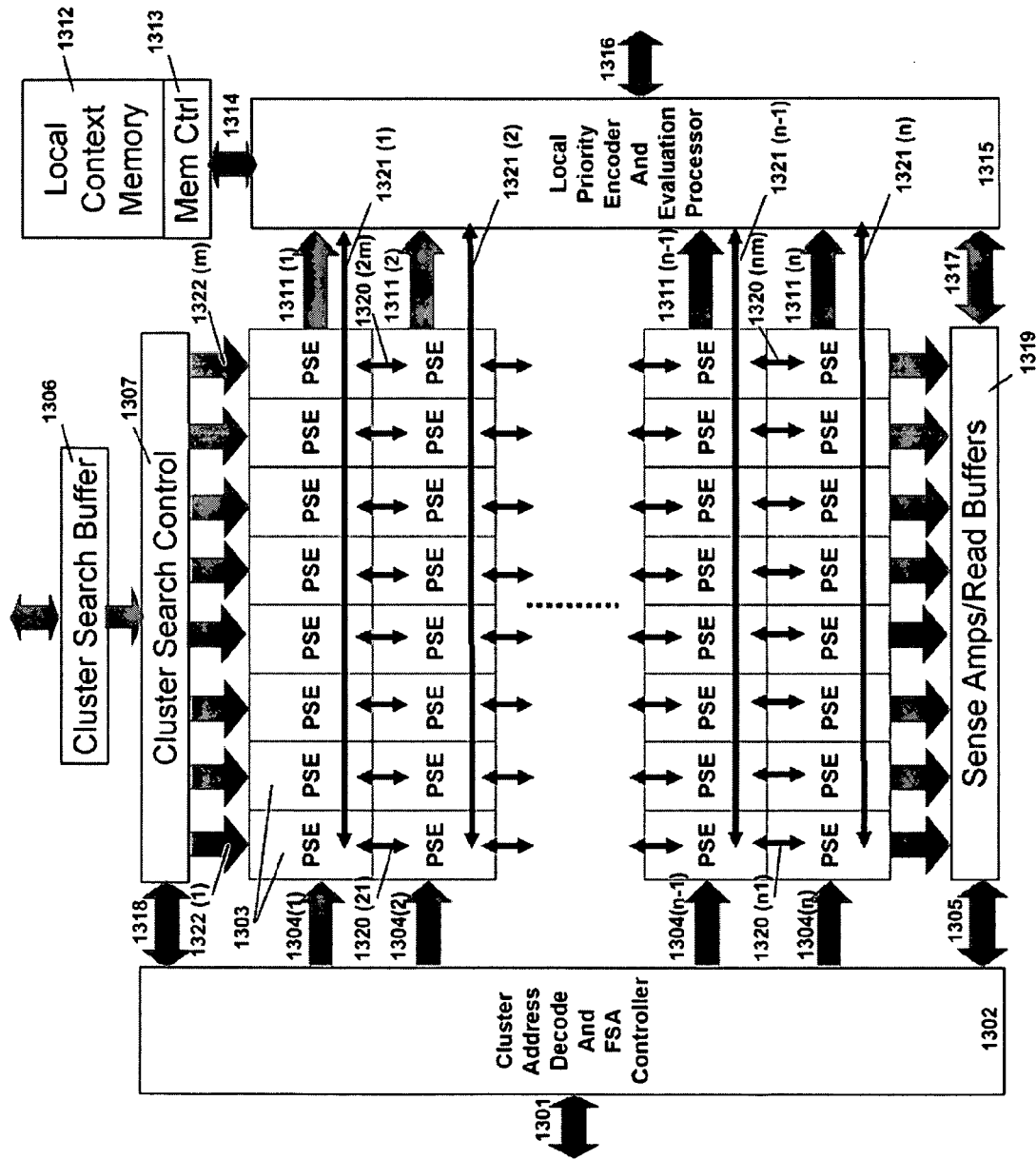
Fig. 13b PRISM Memory Cluster Detailed Block Diagram

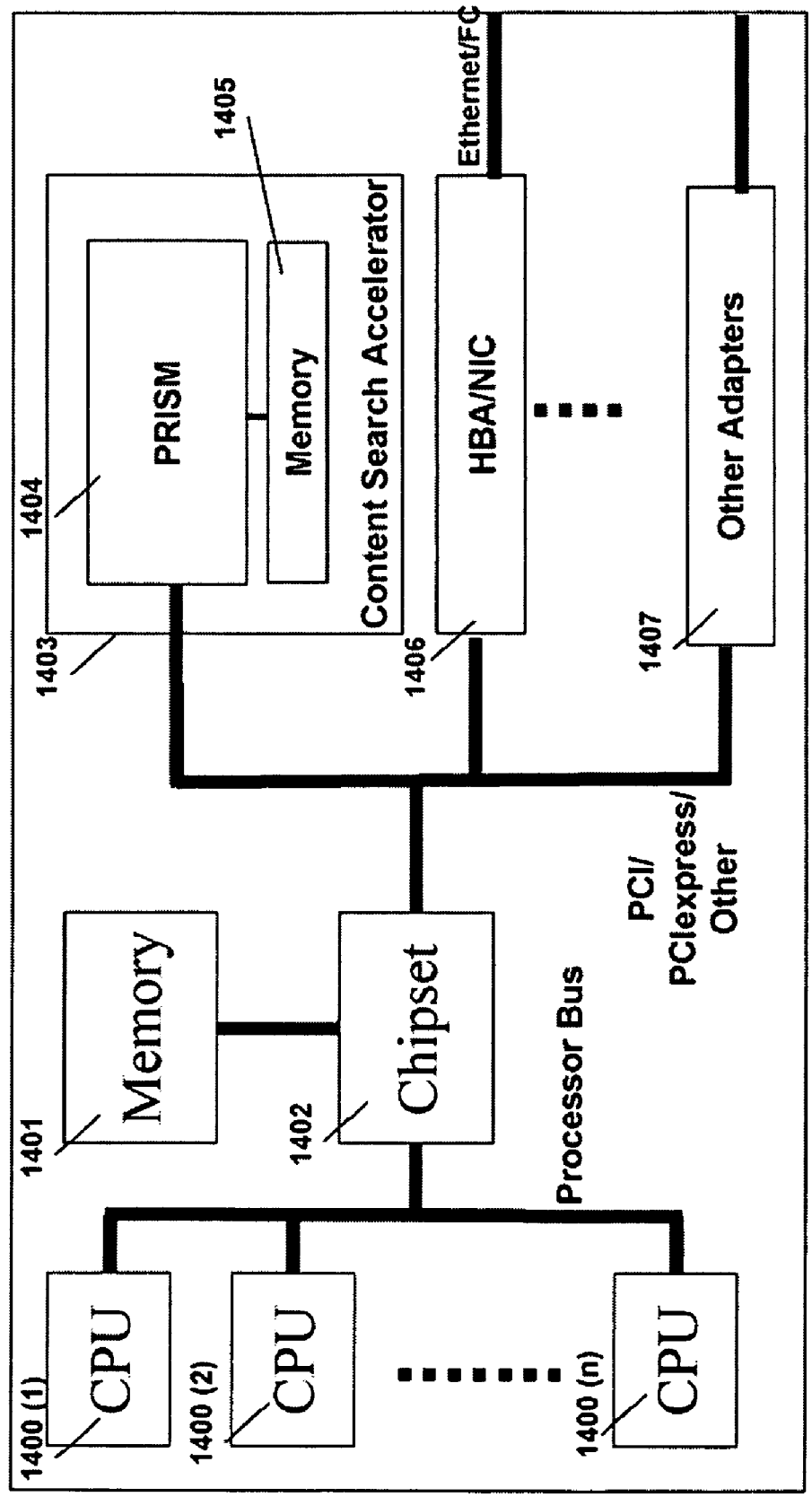
Fig. 14 Computing Device with Content Search Memory Based Accelerator

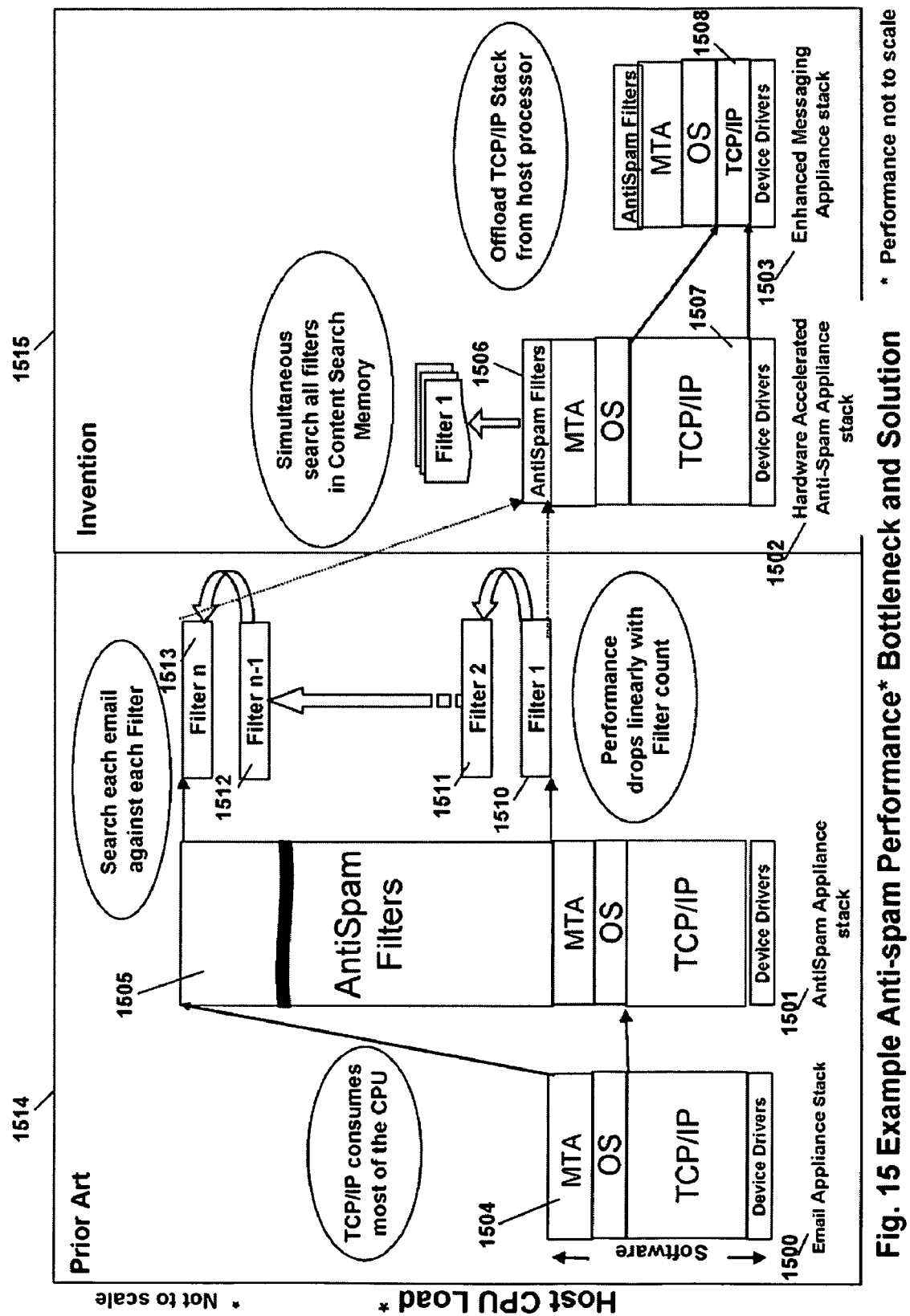
Fig. 15 Example Anti-spam Performance* Bottleneck and Solution

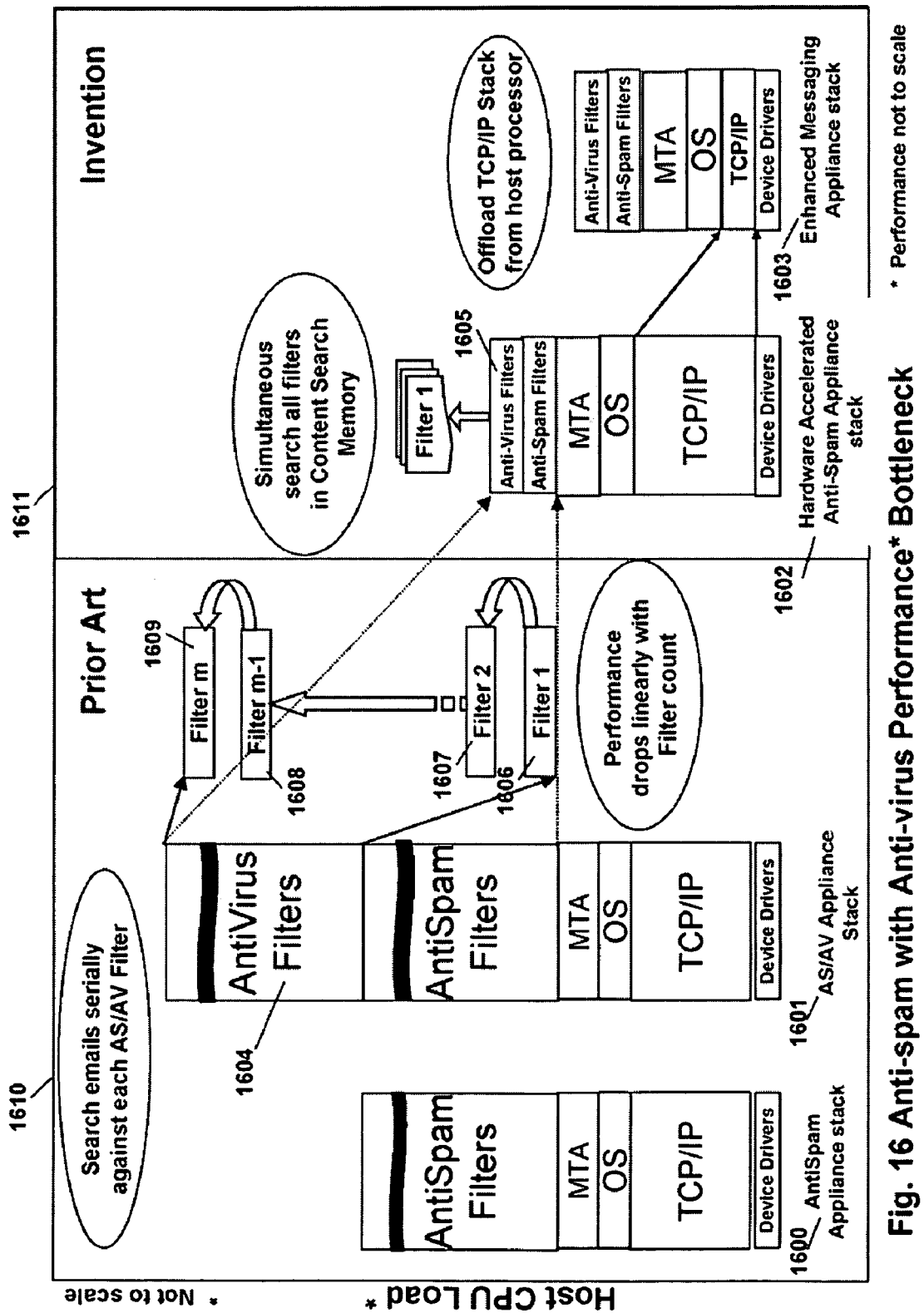
Fig. 16 Anti-spam with Anti-virus Performance* Bottleneck

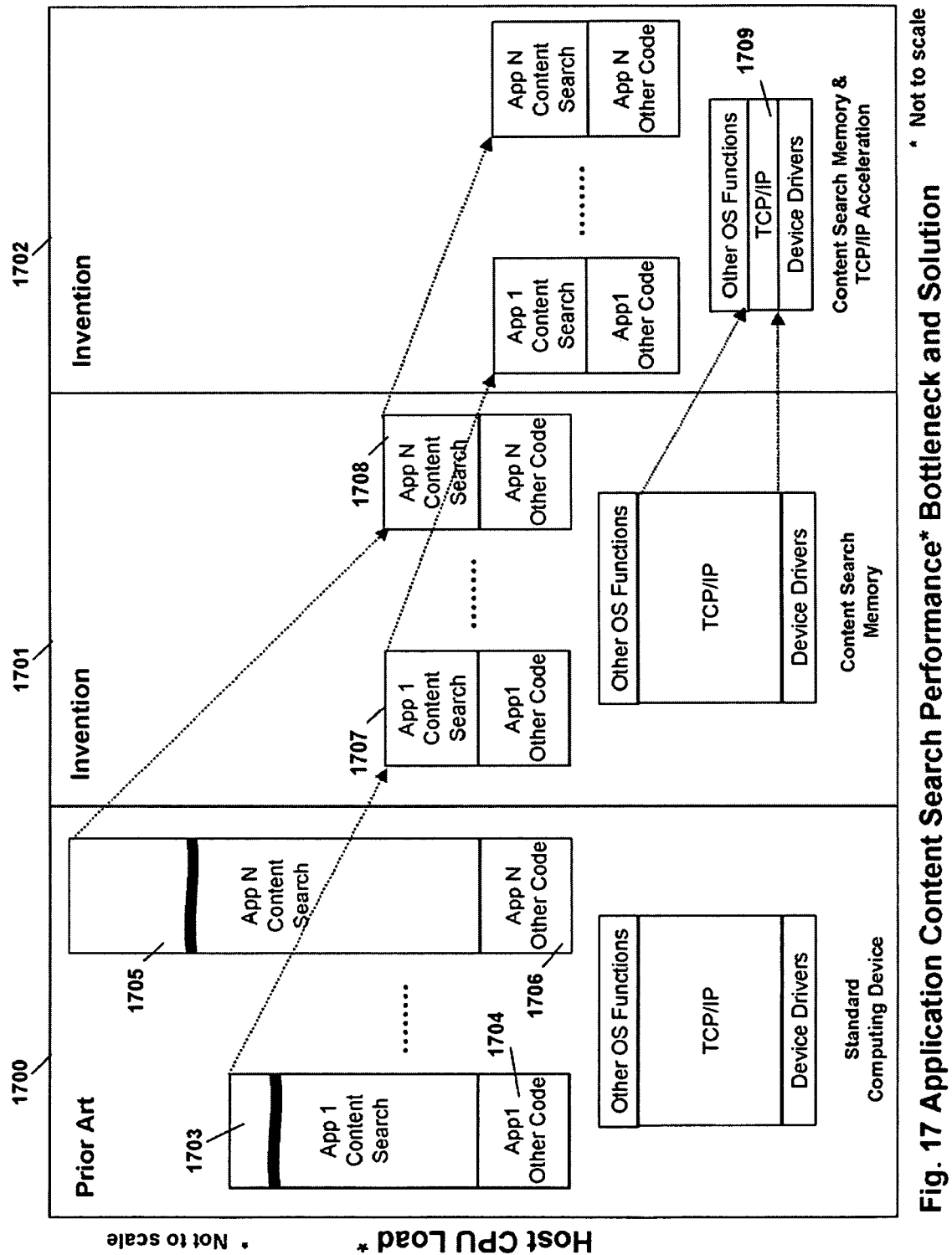
Fig. 17 Application Content Search Performance* Bottleneck and Solution

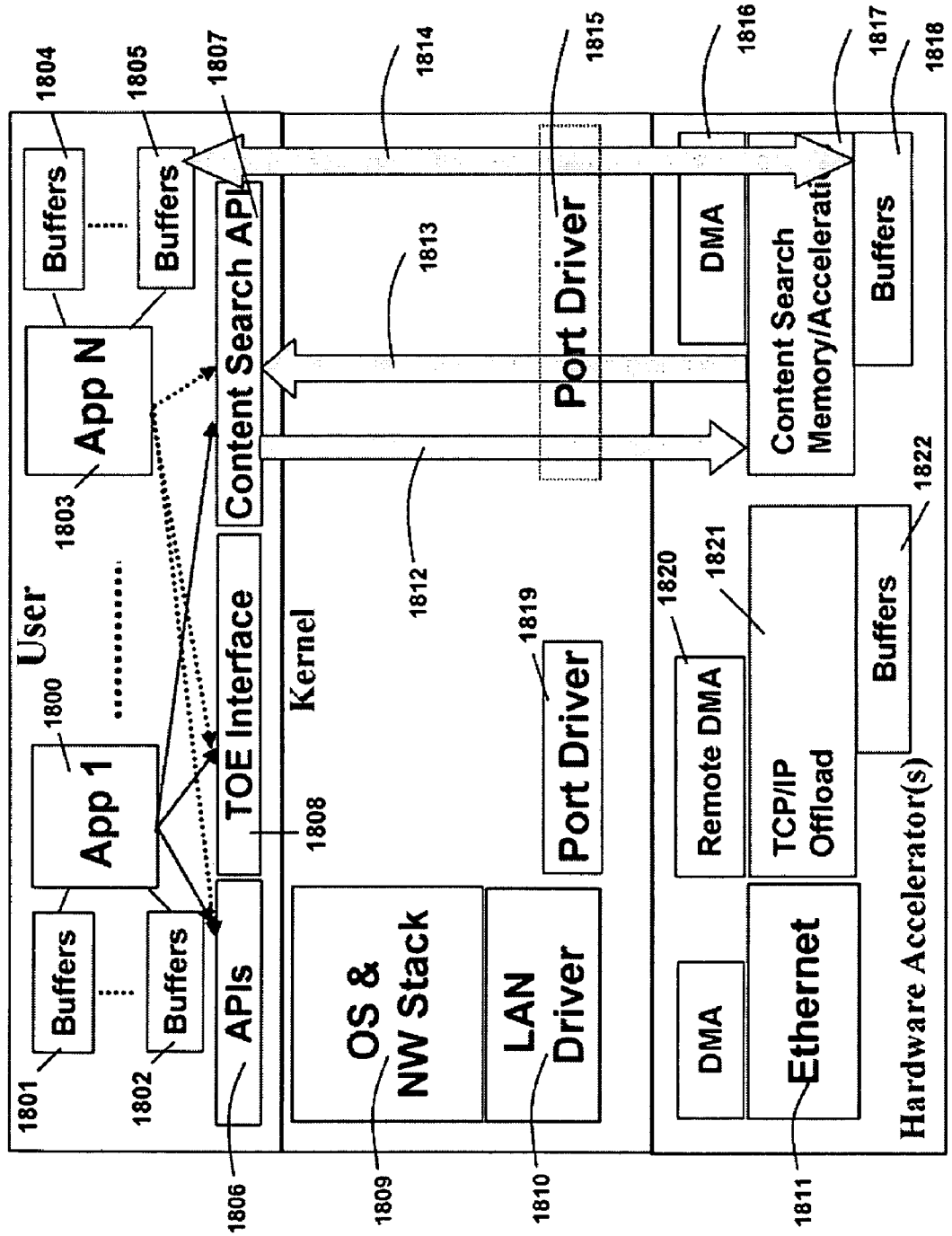
Fig. 18 An example content search API usage model

| API * (*parameters are not illustrated) | Description |
|---|---|
| Initialize() | Initialize the hardware |
| getCapabilities() | Query the capabilities of the current hardware |
| setNFARule() | set an NFA rule in PRISM |
| Set_tNFA_Rule() | set a tagged NFA rule in PRISM |
| setContext() | set the context for PRISM |
| sndDataPtr() | send the pointer of the data buffer that needs to be searched |
| getRes() | retrieve the result from PRISM |
| getResPtr() | retrieve the pointer to the memory buffer that holds the results |
| switchContext() | Switch the current active context of the FSA blocks |
| setRuleGroup() | set the rule group that a specific rule belongs |
| selectRuleGroup() | select a specific rule group for access |
| setInitGroup() | set the initial group that is active for a given flow |
| startHWSearch() | start the hardware search |
| stopHWSearch() | stop the hardware search |

Fig. 19 An example Content Search API with example functions

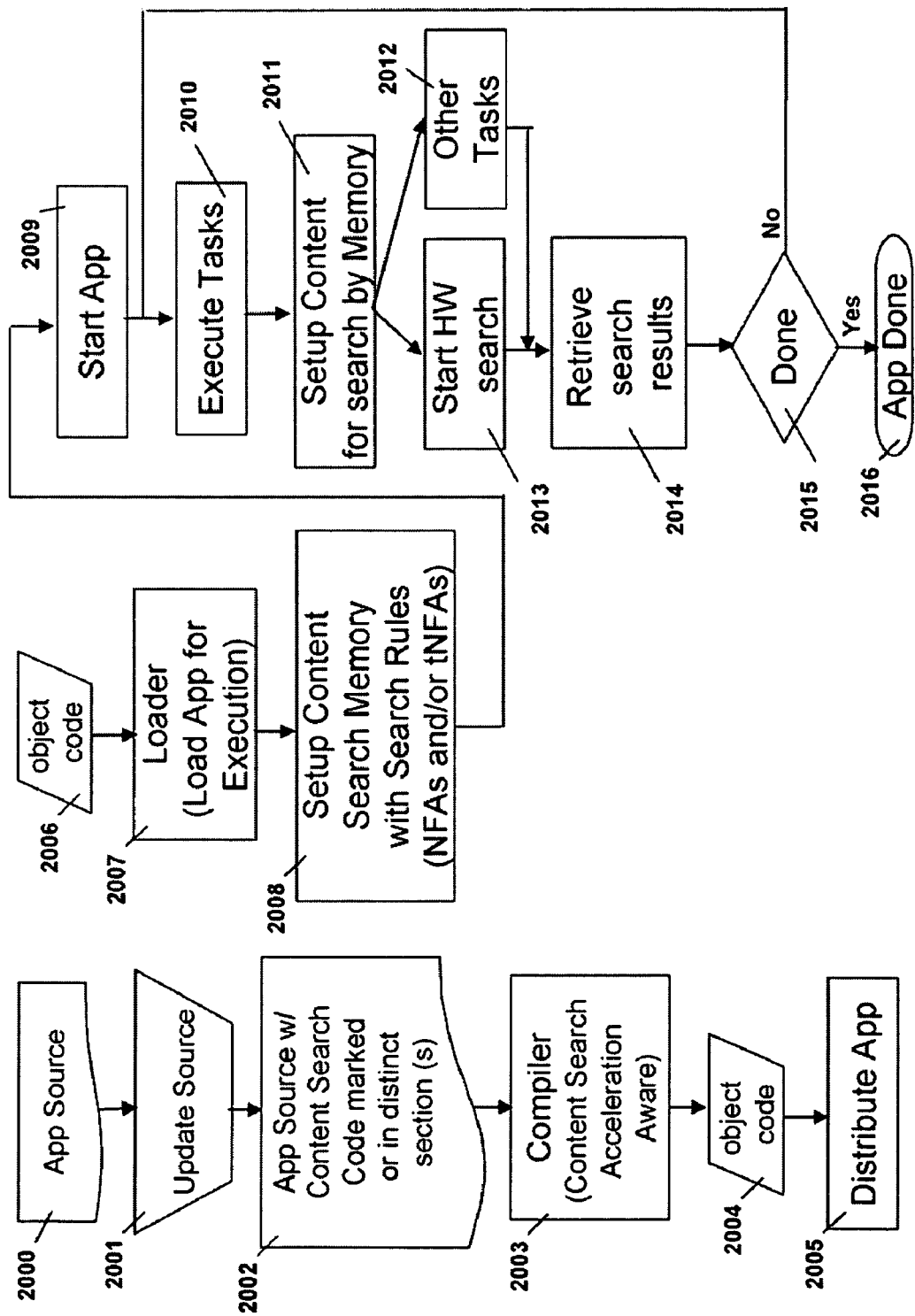
Fig. 20 An example application flow (static setup) for PRISM

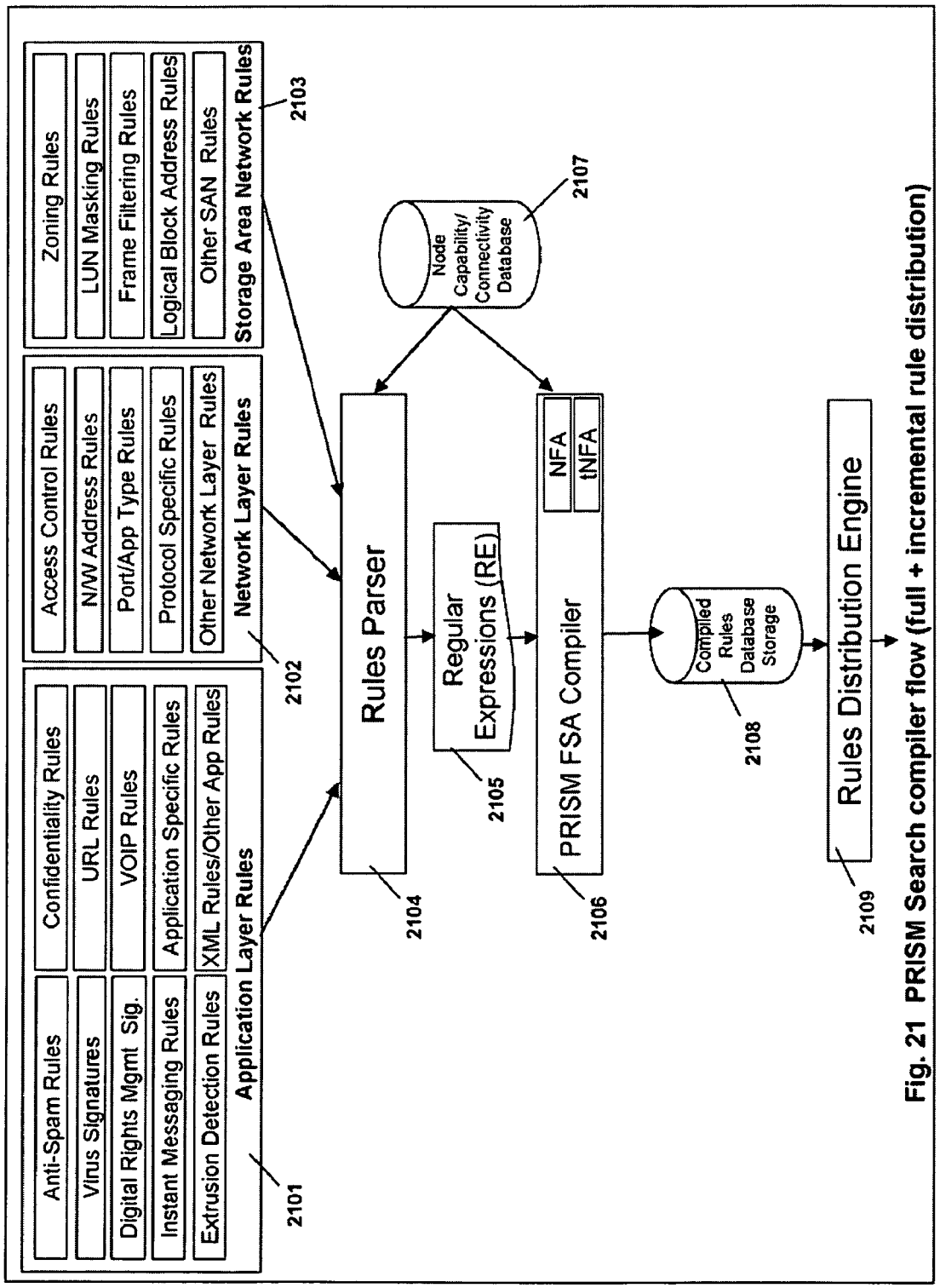
Fig. 21 PRISM Search compiler flow (full + incremental rule distribution)

PROGRAMMABLE INTELLIGENT SEARCH MEMORY

RELATED APPLICATIONS

Priority is claimed to Provisional Application Ser. No. 60/965,267 filed on Aug. 17, 2007 entitled Embedded programmable intelligent search memory, Provisional Application Ser. No. 60/965,170 filed on Aug. 17, 2007 entitled 100 Gbps security and search architecture using programmable intelligent search memory, Provisional Application Ser. No. 60/963,059 filed on Aug. 1, 2007 entitled Signature search architecture for programmable intelligent search memory, Provisional Application Ser. No. 60/961,596 filed on Jul. 23, 2007 entitled Interval symbol architecture for programmable intelligent search memory, Provisional Application Ser. No. 60/933,313 filed on Jun. 6, 2007 entitled FSA context switch architecture for programmable intelligent search memory, Provisional Application Ser. No. 60/933,332 filed on Jun. 6, 2007 entitled FSA extension architecture for programmable intelligent search memory, Provisional Application Ser. No. 60/930,607 filed on May 17, 2007 entitled Compiler for programmable intelligent search memory, Provisional Application Ser. No. 60/928,883 filed on May 10, 2007 entitled Complex symbol evaluation for programmable intelligent search memory, Provisional Application Ser. No. 60/873,632 filed on Dec. 8, 2006 entitled Programmable intelligent search memory, Provisional Application Ser. No. 60/873,889 filed on Dec. 8, 2006 entitled Dynamic programmable intelligent search memory, which are all incorporated herein by reference in their entirety as if fully set forth herein.

Priority is also claimed to U.S. patent application number not yet assigned filed on Dec. 6, 2007 entitled Embedded programmable intelligent search memory, U.S. patent application number not yet assigned filed on Dec. 6, 2007 entitled 100 Gbps security and search architecture using programmable intelligent search memory, U.S. patent application number not yet assigned filed on Dec. 6, 2007 entitled Signature search architecture for programmable intelligent search memory, U.S. patent application number not yet assigned filed on Dec. 6, 2007 entitled Interval symbol architecture for programmable intelligent search memory, U.S. patent application number not yet assigned filed on Dec. 6, 2007 entitled FSA context switch architecture for programmable intelligent search memory, U.S. patent application number not yet assigned filed on Dec. 6, 2007 entitled FSA extension architecture for programmable intelligent search memory, U.S. patent application number not yet assigned filed on Dec. 6, 2007 entitled Compiler for programmable intelligent search memory, U.S. patent application number not yet assigned filed on Dec. 6, 2007 entitled Complex symbol evaluation for programmable intelligent search memory, U.S. patent application number not yet assigned filed on Dec. 6, 2007 entitled Dynamic programmable intelligent search memory which are all co-pending U.S. patent applications of common ownership.

BACKGROUND OF THE INVENTION

This invention relates generally to memory technology and in particular to a new high performance intelligent content search memory.

Many modern applications depend on fast information search and retrieval. With the advent of the world-wide-web and the phenomenal growth in its usage, content search has become a critical capability. A large number of servers get deployed in web search applications due to the performance limitations of the state of the art microprocessors for regular expression driven search.

There have been significant research and development resources devoted to the topic of searching of lexical information or patterns in strings. Regular expressions have been used extensively since the mid 1950s to describe the patterns in strings for content search, lexical analysis, information retrieval systems and the like. Regular expressions were first studied by S. C. Kleene in mid-1950s to describe the events of nervous activity. It is well understood in the industry that regular expression (RE) can also be represented using finite state automata (FSA). Non-deterministic FSA (NFA) and deterministic FSA (DFA) are two types of FSAs that have been used extensively over the history of computing. Rabin and Scott were the first to show the equivalence of DFA and NFA as far as their ability to recognize languages in 1959. In general a significant body of research exists on regular expressions. Theory of regular expressions can be found in "Introduction to Automata Theory, Languages and Computation" by Hopcroft and Ullman and a significant discussion of the topics can also be found in book "Compilers: Principles, Techniques and Tools" by Aho, Sethi and Ullman.

Computers are increasingly networked within enterprises and around the world. These networked computers are changing the paradigm of information management and security. Vast amount of information, including highly confidential, personal and sensitive information is now being generated, accessed and stored over the network. This information needs to be protected from unauthorized access. Further, there is a continuous onslaught of spam, viruses, and other inappropriate content on the users through email, web access, instant messaging, web download and other means, resulting in significant loss of productivity and resources.

Enterprise and service provider networks are rapidly evolving from 10/100 Mbps line rates to 1 Gbps, 10 Gbps and higher line rates. Traditional model of perimeter security to protect information systems pose many issues due to the blurring boundary of an organization's perimeter. Today as employees, contractors, remote users, partners and customers require access to enterprise networks from outside, a perimeter security model is inadequate. This usage model poses serious security vulnerabilities to critical information and computing resources for these organizations. Thus the traditional model of perimeter security has to be bolstered with security at the core of the network. Further, the convergence of new sources of threats and high line rate networks is making software based perimeter security to stop the external and internal attacks inadequate. There is a clear need for enabling security processing in hardware inside core or end systems beside a perimeter security as one of the prominent means of security to thwart ever increasing security breaches and attacks.

FBI and other leading research institutions have reported in recent years that over 70% of intrusions in organizations have been internal. Hence a perimeter defense relying on protecting an organization from external attacks is not sufficient as discussed above. Organizations are also required to screen outbound traffic to prevent accidental or malicious disclosure of proprietary and confidential information as well as to prevent its network resources from being used to proliferate spam, viruses, worms and other malware. There is a clear need to inspect the data payloads of the network traffic to protect and secure an organization's network for inbound and outbound security.

Data transported using TCP/IP or other protocols is processed at the source, the destination or intermediate systems in the network or a combination thereof to provide data security or other services like secure sockets layer (SSL) for socket layer security, Transport layer security, encryption/decryption, RDMA, RDMA security, application layer security, virtualization or higher application layer processing, which may further involve application level protocol processing (for example, protocol processing for HTTP, HTTPS, XML, SGML, Secure XML, other XML derivatives, Telnet, FTP, IP Storage, NFS, CIFS, DAFS, and the like). Many of these processing tasks put a significant burden on the host processor that can have a direct impact on the performance of applications and the hardware system. Hence, some of these tasks need to be accelerated using dedicated hardware for example SSL, or TLS acceleration. As the usage of XML increases for web applications, it is creating a significant performance burden on the host processor and can also benefit significantly from hardware acceleration. Detection of spam, viruses and other inappropriate content require deep packet inspection and analysis. Such tasks can put huge processing burden on the host processor and can substantially lower network line rate. Hence, deep packet content search and analysis hardware is also required.

Internet has become an essential tool for doing business at small to large organizations. HTML based static web is being transformed into a dynamic environment over last several years with deployment of XML based services. XML is becoming the lingua-franca of the web and its usage is expected to increase substantially. XML is a descriptive language that offers many advantages by making the documents self-describing for automated processing but is also known to cause huge performance overhead for best of class server processors. Decisions can be made by processing the intelligence embedded in XML documents to enable business to business transactions as well as other information exchange. However, due to the performance overload on the best of class server processors from analyzing XML documents, they cannot be used in systems that require network line rate XML processing to provide intelligent networking. There is a clear need for acceleration solutions for XML document parsing and content inspection at network line rates which are approaching 1 Gbps and 10 Gbps, to realize the benefits of a dynamic web based on XML services.

Regular expressions can be used to represent the content search strings for a variety of applications like those discussed above. A set of regular expressions can then form a rule set for searching for a specific application and can be applied to any document, file, message, packet or stream of data for examination of the same. Regular expressions are used in describing anti-spam rules, anti-virus rules, anti-spyware rules, anti-phishing rules, intrusion detection rules, intrusion prevention rules, extrusion detection rules, extrusion prevention rules, digital rights management rules, legal compliance rules, worm detection rules, instant message inspection rules, VOIP security rules, XML document security and search constructs, genetics, proteomics, XML based protocols like XMPP, web search, database search, bioinformatics, signature recognition, speech recognition, web indexing and the like. These expressions get converted into NFAs or DFAs for evaluation on a general purpose processor. However, significant performance and storage limitations arise for each type of the representation. For example an N character regular expression can take up to the order of $2^N$ memory for the states of a DFA, while the same for an NFA is in the order of N. On the other hand the performance for the DFA evaluation for an M byte input data stream is in the order of M memory accesses and the order of (N*M) processor cycles for the NFA representation on modern microprocessors.

When the number of regular expressions increases, the impact on the performance deteriorates as well. For example, in an application like anti-spam, there may be hundreds of regular expression rules. These regular expressions can be evaluated on the server processors using individual NFAs or DFAs. It may also be possible to create a composite DFA to represent the rules. Assuming that there are X REs for an application, then a DFA based representation of each individual RE would result up to the order of $(X*2^N)$ states however the evaluation time would grow up to the order of $(X*N)$ memory cycles. Generally, due to the potential expansion in the number of states for a DFA they would need to be stored in off chip memories. Using a typical access time latency of main memory systems of 60 ns, it would require about $(X*60 ns*N*M)$ time to process an X RE DFA with N states over an M byte data stream. This can result in tens of Mbps performance for modest size of X, N & M. Such performance is obviously significantly below the needs of today's network line rates of 1 Gbps to 10 Gbps. On the other hand, if a composite DFA is created, it can result in an upper bound of storage in the order of $2^{N*X}$ which may not be within physical limits of memory size for typical commercial computing systems even for a few hundred REs. Thus the upper bound in memory expansion for DFAs can be a significant issue. Then on the other hand NFAs are non-deterministic in nature and can result in multiple state transitions that can happen simultaneously. NFAs can only be processed on a state of the art microprocessor in a scalar fashion, resulting in multiple executions of the NFA for each of the enabled paths. X REs with N characters on average can be represented in the upper bound of $(X*N)$ states as NFAs. However, each NFA would require M iterations for an M-byte stream, causing an upper bound of $(X*N*M*$processor cycles per loop). Assuming the number of processing cycles are in the order of 10 cycles, then for a best of class processor at 4 GHz, the processing time can be around $(X*N*M*2.5 ns)$, which for a nominal N of 8 and X in tens can result in below 100 Mbps performance. There is a clear need to create high performance regular expression based content search acceleration which can provide the performance in line with the network rates which are going to 1 Gbps and 10 Gbps.

The methods for converting a regular expression to Thompson's NFA and DFA are well known. The resulting automata are able to distinguish whether a string belongs to the language defined by the regular expression however it is not very efficient to figure out if a specific sub-expression of a regular expression is in a matching string or the extent of the string. Tagged NFAs enable such queries to be conducted efficiently without having to scan the matching string again. For a discussion on Tagged NFA refer to the paper "NFAs with Tagged Transitions, their Conversion to Deterministic Automata and Application to Regular Expressions", by Ville Laurikari, Helsinki University of Technology, Finland.

US Patent Applications, 20040059443 and 20050012521, describe a method and apparatus for efficient implementation and evaluation of state machines and programmable finite state automata using programmable registers, and associated logic. These applications describe single chip regular expression processor that can support 1000 to 2000 finite state machines implemented in the state of the art (0.13 um to 90 nm) process technology. These applications describe a state machine architecture where nodes of the state machine architecture are interconnected with each other using an interconnection network which forms an AND-OR logic based on the current state, received symbol and state transition connectivity control. However, for basic operations the apparatus and the method described in these applications becomes virtually inoperable in the event of input stream containing a symbol not recognized by the regular expression. For instance, if the finite state machine receives a symbol which is not in the set of symbols that are programmed for it to recognize, the finite state machine can enter into a condition where all the states are inactive or disabled and from that point forward the state machine stays in that state and does not recognize any symbols that are even part of the defined symbols. For example if a finite state machine is programmed to search for a string sequence "help", then the machine may get programmed with "h", "e", "l", "p" as the symbols of the state machine. The state machine gets initialized in a start state that may optionally be provided using the start state control. However, if the input stream being searched includes a symbol other than those programmed, the state machine described in these applications reach a state where all nodes of the state machine become inactive and stay inactive until they are re-initialized at startup of the finite state machine apparatus. For example, if the input string received is "henk will help you", then the finite state machine of these applications will reach an inactive state on processing the symbol "n" (third character of the phrase "henk will help you") and then will not recognize the "help" string that follows later. Thus these applications are virtually inoperable for regular expression matching as described. Beside this, the number of regular expressions that can be implemented and supported in the state of the art process technology using these methods are small compared to the needs of the applications as described below.

There is a class of applications like routing, access control, policy based processing and the like in the field of networking that require a special class of content search which amounts to looking up a set of data stored in the memory and detecting whether the data set contains data being searched. The data being searched may be an Internet Protocol (IP) address in a router or switch's forwarding database which can be hundreds of thousand entries. Since the speeds at which these searches have to be done to support high line rates like 1 Gbps, 10 Gbps and beyond, the traditional method of trie based searches is very time inefficient. For these types of applications that require rapid lookup of data among a large database a class of memory called Content Addressable Memory (CAM) has been used. CAMs have been used in high speed networking for a long time. The CAM architectures essentially compare incoming data with all data that is stored in the CAM simultaneously and deliver an indication of match or no match and the location of the match. However, these devices can only search for a fixed set of string of characters and are not well suited for regular expression searches. For example a regular expression like "a*b" which states to find a string of zero or more occurrences of character "a" followed by character "b" cannot be adequately represented in a CAM or would occupy a large number of entries and it becomes impractical for a set of regular expressions with any more complexity. Thus CAMs generally get used for searching for fixed patterns, typically network packet headers, and are not suited for regular expressions search. However, the systems that use CAMs, like unified threat management devices or routers or switches or gateways or the like that provide content based intelligent applications like upper layer security, have a clear need for high speed deep packet inspection or content search which involves a large number of rich regular expressions.

SUMMARY OF THE INVENTION

I describe a high performance Programmable Intelligent Search Memory™ (PRISM™) for searching content with regular expressions as well as other pattern searches. The high performance programmable intelligent content search memory can have myriad of uses wherever any type of content needs to be searched for example in networking, storage, security, web search applications, XML processing, bio informatics, signature recognition, genetics, proteomics, speech recognition, database search, enterprise search and the like. The programmable intelligent search memory of my invention may be embodied as independent PRISM memory integrated circuits working with or may also be embodied within microprocessors, multi-core processors, network processors, TCP Offload Engines, network packet classification engines, protocol processors, regular expression processors, content search processors, network search engines, content addressable memories, mainframe computers, grid computers, servers, workstations, personal computers, laptops, notebook computers, PDAs, handheld devices, cellular phones, wired or wireless networked devices, switches, routers, gateways, unified threat management devices, firewalls, VPNs, intrusion detection and prevention systems, extrusion detection systems, compliance management systems, wearable computers, data warehouses, storage area network devices, storage systems, data vaults, chipsets and the like or their derivatives or any combination thereof.

Content search applications require lot more regular expressions to be searched than those that can fit on state of the art regular expression processor like those described by the applications 20040059443 and 20050012521. For example, a very popular open source intrusion detection and prevention technology, SNORT, uses around 3500 to 5000 regular expressions. This is only one of the security applications that unified security threat management devices, routers, servers and the like support. These applications modestly need support for well over 10,000 regular expressions. However, as the security threats continue to grow the number of regular expressions needed for just these applications may rise substantially. Applications like gene database searches or web search applications like Google and others require orders of magnitude more regular expressions support than what can be supported by the state of the art regular expression processors.

Thus there is a clear need to for a solution that can support orders of magnitude larger number of regular expressions in a single chip for current and emerging content search applications. My invention describes such architectures, methods and apparatuses that can meet the needs of current and future applications for intelligent content search.

I describe programmable intelligent search memory in this invention, unlike a regular expression processor of the patent applications above, that overcomes the issues described above. I also show search memory architecture for performing a large number of regular expression searches at high line rates. I also show how my search memory architecture can be configured to behave like content addressable memory which can be very advantageous in applications that require a combination of searches that may be done using CAMs and deep packet content searches requiring regular expression search. I describe a content search memory which performs content search using regular expressions represented as left-biased or right-biased NFAs. My invention also provides capabilities to support Tagged NFA implementations. My invention also shows how content search memory can be used to provide application acceleration through search application programmer interface and the search memory of this invention. For clarity, as used in this patent the terms "programmable intelligent search memory", "search memory", "content search memory", or "PRISM memory" are used interchangeably and have the same meaning unless specifically noted. Further for clarity, as used in this patent the term "memory" when used independently is used to refer to random access memory or RAM or Dynamic RAM (DRAM) or DDR or QDR or RLDRAM or RDRAM or FCRAM or Static RAM (SRAM) or read only memory (ROM) or FLASH or cache memory or the like or any future derivatives of such memories.

The regular expressions may optionally be tagged to detect sub expression matches beside the full regular expression match. The regular expressions are converted into equivalent FSAs that may optionally be NFAs and may optionally be converted into tagged NFAs. The PRISM memory also optionally provides ternary content addressable memory functionality. So fixed string searches may optionally be programmed into the PRISM memory of my invention. PRISM memory of this invention enables a very efficient and compact realization of intelligent content search using FSA to meet the needs of current and emerging content search applications. Unlike a regular expression processor based approach, the PRISM memory can support tens of thousands to hundreds of thousands of content search rules defined as regular expressions as well as patterns of strings of characters.

The PRISM memory performs simultaneous search of regular expressions and other patterns (also referred to as "rules" or "regular expression rules" or "pattern search rules" or "patterns" or "regular expressions" in this patent) against the content being examined. The content may be presented to the search memory by a companion processor or PRISM controller or content stream logic or a master processor or the like which may be on the same integrated circuit chip as the PRISM memory or may be on a separate device. The content to be searched may be streaming content or network packets or data from a master processor or data from a disk or a file or reside in on-chip memory or off-chip memory or buffers or the like from which a controller may present it to the search memory arrays for examination. The content search memory arrays may initially be configured with the regular expression rules converted into NFAs or tagged NFAs and optionally other pattern search rules. PRISM memory may optionally comprise of configuration control logic which may be distributed or central or a combination thereof. The configuration control logic may optionally address PRISM memory cells to read and/or write FSA rules or other patterns to be searched. Once the PRISM memory is setup with all the related information about the NFAs and other rules, the content to be examined can be presented to the PRISM memory. PRISM memory provides capabilities to update rules or program new rules or additional rules, in line with the content examination within a few clock cycles unlike the current regular expression processors which require the content evaluation to stop for long periods of time until large tables of composite DFAs are updated in an external or internal memory. Typically the content is presented as a stream of characters or symbols which get examined against the rules in the PRISM memory simultaneously and whenever a rule is matched the PRISM memory array provides that indication as a rule match signal which is interpreted by the control logic of the PRISM. There may be multiple rule matches simultaneously in which case a priority encoder which may also be programmable is used to select one or more matches as the winner(s). The priority encoder may then provide a tag or an address or an action or a combination that may have already been programmed in the priority encoder which may be used to look-up related data from associated on-chip or off-chip memory that may optionally determine the next set of actions that may need to be taken on the content being examined. For example, in case of a security application if a set of regular expressions are defined and programmed for spam detection, then if one or more of these rules when matched can have action(s) associated with them that the message or content may need to quarantined for future examination by a user or it can have an action that says the content should be dropped or enable a group of regular expressions in the PRISM memory to be applied to the content or the like depending on the specific application. The PRISM memory architecture comprises of means or circuits or the like for programming and reprogramming of the FSA rules and optionally CAM signatures and masks. It further comprises of means or circuits or the like to stream the content to be searched to the PRISM memory arrays. It may further comprise of priority encoder which may optionally be programmable. The PRISM memory may optionally comprise of random access memory (on-chip or off-chip) which is used to store actions associated with specific rule matches. The PRISM memory may optionally comprise of database extension ports which may be optionally used when the number of rules is larger than those that may fit in a single integrated circuit chip. The PRISM memory may optionally comprise of clusters of PRISM memory cells that enable a group of FSA rules to be programmed per cluster. The PRISM clusters may optionally comprise of memory for fast storage and retrieval of FSA states for examination of content that belongs to different streams or contexts or flows or sessions or the like as described below referred to as context memory. For clarity, context memory or global context memory or local context memory or cluster context memory, all comprise of memory like random access memory or RAM or Dynamic RAM (DRAM) or DDR or QDR or RLDRAM or RDRAM or FCRAM or Static RAM (SRAM) or read only memory (ROM) or FLASH or cache memory or the like or any future derivatives of such memories as discussed above. The PRISM memory may optionally comprise of global context memory beside local cluster context memory for storage and retrieval of FSA states of different contexts and enable supporting a large number of contexts. The cluster context memory may optionally cache a certain number of active contexts while the other contexts may be stored in the global context memory. There may optionally be off-chip context memory as well, which can be used to store and retrieve FSA states for much larger number of contexts. The PRISM memory may optionally comprise of cache or context control logic (also referred as "context controller") that manages the cluster, global or external context memory or cache or a combination thereof. The cache or context control logic may optionally be distributed per cluster or may be central for the PRISM memory or any combination thereof. The PRISM controller or the content stream logic that streams the content to be searched may be provided with an indication of the context of the content being searched or it may detect the context of the content or a combination thereof, and may optionally direct the context memory and associated control logic i.e. the context controller to get the appropriate context ready. Once the context memory has the required context available an indication may be provided to PRISM configuration control logic that it may program or load the context states in the PRISM memory. The PRISM configuration control logic (also referred as "configuration controller" in this patent) may optionally first save the current context loaded in the set of active FSA blocks before loading the new context. The configuration controller(s) and the context controller(s) may thus optionally store and retrieve appropriate contexts of the FSAs and start searching the content against the programmed rules with appropriate context states of the FSAs restored. Thus PRISM memory may optionally dynamically reconfigure itself at run-time based on the context of the content or the type of the application or the like or a combination thereof enabling run-time adaptable PRISM memory architecture. The contexts as referred to in this patent may, as examples without limitation, be related to specific streams, or documents, or network connections or message streams or sessions or the like. The PRISM memory may process content from multiple contexts arriving in data groups or packets or the like. For content search in applications where the content belonging to one context may arrive interspersed with content from other contexts, it may be important to maintain the state of the content searched for a context up to the time when content from a different context gets searched by PRISM memory. The context memory or cache with the associated controllers as described in this patent enable handling of multiple contexts.

For clarification, the description in this patent application uses term NFA to describe the NFAs and optionally, when tagging is used in regular expressions, to describe tagged NFA unless tagged NFA is specifically indicated. All NFAs may optionally be tagged to form tagged NFAs, hence the description is not to be used as a limiter to apply only to tagged NFAs. The descriptions of this patent are applicable for non-tagged NFAs as well and tagging is an optional function which may or may not be implemented or used, and thus non-tagged NFAs are covered by the teachings of this patent as will be appreciated by one skilled in the art. At various places in this patent application the term content search memory, content search memory, search memory and the like are used interchangeably for programmable intelligent search memory or PRISM memory. These usages are meant to indicate the content search memory or PRISM memory of this invention without limitation.

In many content search applications like security, there is a need to constantly update the rules or the signatures being used to detect malicious traffic. In such applications it is critical that a solution be adaptable to keep up with the constantly evolving nature of the security threat. In an always connected type of usage models, it is extremely important to have the latest security threat mitigation rules updated in the security system on a frequent basis. When a composite DFA type architecture is used, compiling and releasing any new security rules or policy can consume a large amount of time, where the updates may not be timely to avoid the impact of the security threat. In such environments the release of new rule base may take up to 8 to 24 hours, which is quite delayed response to constantly evolving threat. In the architecture of this invention, that issue is addressed since the release of new rules is a matter of converting those rules into NFAs and updating or programming only these very small set of rules into the content search memory. Thus the response to new threats can be near immediate unlike the huge delays which occur from integration of the new rules in the composite rule base and converting those into composite DFAs.

There are several instances of REs which include only a few states. For example if the content search includes looking for *.exe or *.com or *.html or the like, the NFA for these REs include a small number of states. Thus if all NFA memory blocks support say 16 states, then it may be possible to include multiple rules per block. This invention enables the maximum utilization of the FSA blocks by allowing multiple rules per FSA block. The blocks may optionally provide FSA extension circuits to chain the base blocks together to create super blocks that can handle larger FSAs.

Berry and Sethi in their paper "From Regular Expressions to Deterministic Automata" Published in Theoretical Computer Science in 1986, showed that regular expressions can be represented by NFAs such that a given state in the state machine is entered by one symbol, unlike the Thompson NFA. Further, the Berry-Sethi NFAs are $\epsilon$-free. A 'V' term RE can be represented using 'V+1' states NFA using Berry-Sethi like NFA realization method. The duality of Berry-Sethi method also exists where all transitions that lead the machine out of a state are dependent on the same symbol. This is shown in the paper "A Taxonomy of finite automata construction algorithms" by Bruce Watson published in 1994 in section 4.3. I show a method of creating NFA search architecture in a memory leveraging the principles of Berry-Sethi's NFA realization and the dual of their construct. The NFA search memory is programmable to realize an arbitrary regular expression.

In this invention I also show how the content search memory of this invention can be used to create general application acceleration in a compute device like a server, personal computer, workstation, laptop, routers, switches, gateways, security devices, web search servers, grid computers, handheld devices, cell phones, or the like. I show an example content search application programmer interface which can be used as a general facility that may get offered by an operating system for those devices to applications running on them which can utilize the content search memory and significantly improve the performance of those applications compared to having them run on the general purpose processor of these devices.

An example application of anti-spam is illustrated in this application which can be accelerated to become a high line rate application unlike current solutions which run on general purpose processors. Although the illustration is with anti-spam application, other content search intensive applications like intrusion detection and prevention or anti-virus or other applications described in this patent can all be accelerated to very high line rate applications using the teachings of the inventions of this patent.

This patent also describes a content inspection architecture that may be used for detecting intrusions, extrusions and confidential information disclosure (accidental or malicious or intended), regulatory compliance search using hardware for regulations like HIPAA, Sarbanes-Oxley, Graham-Leach-Bliley act, California security bills, security bills of various states and/or countries and the like, deep packet inspection, detecting spam, detecting viruses, detecting worms, detecting spyware, detecting digital rights management information, instant message inspection, URL matching, application detection, detection of malicious content, and other content, policy based access control as well as other policy processing, content based switching, load balancing, virtualization or other application layer content inspection for application level protocol analysis and processing for web applications based on HTTP, XML and the like and applying specific rules which may enable anti-spam, anti-virus, other security capabilities like anti-spyware, anti-phishing and the like capabilities. The content inspection memory may be used for detecting and enforcing digital rights management rules for the content. The content inspection memory may also be used for URL matching, string searches, content based load balancing, sensitive information search like credit card numbers or social security numbers or health information or the like.

Classification of network traffic is another task that consumes up to half of the processing cycles available on packet processors leaving few cycles for deep packet inspection and processing at high line rates. The described content search memory can significantly reduce the classification overhead when deployed as companion search memory to packet processors or network processors or TOE or storage network processors or the like.

BRIEF DESCRIPTION OF THE DRAWINGS

FIG. 1a illustrates Thompson's NFA (prior art)
FIG. 1b illustrates Berry-Sethi NFA (prior art)
FIG. 1c illustrates DFA (prior art)
FIG. 2a illustrates a left-biased NFA and state transition table (prior art)
FIG. 2b illustrates a right-biased NFA and state transition table (prior art)
FIG. 3a illustrates state transition controls
FIG. 3b illustrates configurable next state tables per state
FIG. 4a illustrates state transition logic (STL) for a state
FIG. 4b illustrates a state logic block
FIG. 5a illustrates state transition logic (STL) for a state in Left-Biased FSA
FIG. 5b illustrates state transition logic (STL) for a state in Right-Biased FSA
FIG. 6A illustrates Right-biased Tagged FSA Rule block in PRISM
FIG. 6B illustrates Left-biased Tagged FSA Rule block in PRISM
FIG. 7A illustrates State Block Bit in PRISM
FIG. 7A illustrates State Block Bit in PRISM
FIG. 8A illustrates Symbol Logic Bit in PRISM
FIG. 9 illustrates Partial State Logic Bit in PRISM
FIG. 10a illustrates State Control Block in PRISM
FIG. 10b illustrates Local Init Detect Circuit in PRISM
FIG. 10c illustrates State Control Block Bit in PRISM
FIG. 11 illustrates Tagged Match Detect Block Bit in PRISM
FIG. 12 illustrates PRISM Block Diagram
FIG. 13a illustrates PRISM Memory Cluster Block Diagram
FIG. 13b illustrates PRISM Memory Cluster Detailed Block Diagram
FIG. 14 illustrates Computing Device with Content Search Memory Based Accelerator
FIG. 15 illustrates an example anti-spam performance bottleneck and solution
FIG. 16 illustrates anti-spam with anti-virus performance bottleneck
FIG. 17 illustrates application content search performance bottleneck and solution
FIG. 18 illustrates an example content search API usage model
FIG. 19 illustrates an example content search API with example functions
FIG. 20 illustrates an example application flow (static setup) for PRISM
FIG. 21 illustrates PRISM search compiler flow (full+ incremental rule distribution)

DESCRIPTION

I describe high performance Programmable Intelligent Search Memory for searching content with regular expressions as well as other pattern searches. The regular expressions may optionally be tagged to detect sub expression matches beside the full regular expression match. The regular expressions are converted into equivalent FSAs that may optionally be NFAs and may optionally be converted into tagged NFAS. The PRISM memory also optionally supports ternary content addressable memory functionality. So fixed string searches may optionally be programmed into the PRISM memory of my invention. PRISM memory of this invention enables a very efficient and compact realization of intelligent content search using FSA to meet the needs of current and emerging content search applications. Unlike a regular expression processor based approach, the PRISM memory can support tens of thousands to hundreds of thousands of content search rules defined as regular expressions as well as patterns of strings of characters. The PRISM memory performs simultaneous search of regular expressions and other patterns. The content search memory can perform high speed content search at line rates from 1 Gbps to 10 Gbps and higher, when the best of class server microprocessor can only perform the same tasks at well below 100 Mbps. The content search memory can be used not only to perform layer 2 through layer 4 searches that may be used for classification and security applications, it can also be used to perform deep packet inspection and layer 4 through layer 7 content analysis.

Following are some of the embodiments, without limitations, that can implement PRISM memory:

The PRISM memory may be embodied inside network interface cards of servers, workstations, client PCs, notebook computers, handheld devices, switches, routers and other networked devices. The servers may be web servers, remote access servers, file servers, departmental servers, storage servers, network attached storage servers, database servers, blade servers, clustering servers, application servers, content/media servers, VOIP servers and systems, grid computers/servers, and the like. The PRISM memory may also be used inside an I/O chipset of one of the end systems or network core systems like a switch or router or appliance or the like.

The PRISM memory may also be embodied on dedicated content search acceleration cards that may be used inside various systems described in this patent. Alternatively, PRISM memory may also be embodied as a content search memory inside a variety of hardware and/or integrated circuits like ASSPs, ASICs, FPGA, microprocessors, multi-core processors, network processors, TCP Offload Engines, network packet classification engines, protocol processors, regular expression processors, content search processors, mainframe computers, grid computers, servers, workstations, personal computers, laptops, handheld devices, cellular phones, wired or wireless networked devices, switches, routers, gateways, XML accelerators, VOIP servers, Speech recognition systems, bio informatics systems, genetic and proteomics search systems, web search servers, electronic vault application networks and systems, Data Warehousing systems, Storage area network systems, content indexing appliances like web indexing, email indexing and the like, chipsets and the like or any combination thereof. Alternatively, PRISM memory blocks may be embedded inside other memory technologies like DRAM, SDRAM, DDR DRAM, DDR II DRAM, RLDRAM, SRAM, RDRAM, FCRAM, QDR SRAM, DDR SRAM, CAMs, Boundary Addressable Memories, Magnetic memories, Flash or other special purpose memories or a combination thereof or future derivates of such memory technologies to enable memory based content search.

One preferred embodiment of the invention is in an integrated circuit memory chip that may support around 128,000 8-symbol regular expressions or may support around 18 Mbit of ternary CAM memory in current process technologies. A second preferred embodiment of the PRISM technology is an integrated circuit memory chip that may support around 8,000 regular expression rules in current process technologies to support applications where a lower content search memory cost is required. Each process generation may provide ability to store around twice as many PRISM memory bits as the previous generation. Thus in one preferred embodiment the PRISM memory would be able to support tens of thousands of eight state FSA and can potentially support over 100,000 FSAs. There are many variations of the PRISM memory architecture that can be created that can support more or less FSAs depending upon various factors like the number of states per FSA, the chip die area, cost, manufacturability expectations and the like which will be appreciated by a person with ordinary skill in the art.

DETAILED DESCRIPTION

I describe high performance Programmable Intelligent Search Memory for searching content with regular expressions as well as other pattern searches. The regular expressions may optionally be tagged to detect sub expression matches beside the full regular expression match. The regular expressions are converted into equivalent FSAs or NFAs and optionally into tagged NFAs. The PRISM memory also optionally supports ternary content addressable memory functionality. So fixed string searches may optionally be programmed into the PRISM memory of my invention. PRISM memory of this invention enables a very efficient and compact realization of intelligent content search using FSA to meet the needs of current and emerging content search applications. Unlike a regular expression processor based approach, the PRISM memory can support tens of thousands to hundreds of thousands of content search rules defined as regular expressions as well as patterns of strings of characters. The PRISM memory performs simultaneous search of regular expressions and other patterns. The content search memory can perform high speed content search at line rates from 1 Gbps to 10 Gbps and higher using current process technologies. The description here is with respect to one preferred embodiment of this invention in an integrated circuit (IC) chip, it will be appreciated by those with ordinary skill in the art that changes in these embodiments may be made without departing from the principles and spirit of the invention. The illustrations are made to point out salient aspects of the invention and do not illustrate well understood IC design elements, components and the like implementation of the invention in integrated circuits so as not to obscure the invention.

Ability to perform content search has become a critical capability in the networked world. As the network line rates go up to 1 Gbps, 10 Gbps and higher, it is important to be able to perform deep packet inspection for many applications at line rate. Several security issues, like viruses, worms, confidential information leaks and the like, can be detected and prevented from causing damage if the network traffic can be inspected at high line rates. In general, content search rules can be represented using regular expressions. Regular expression rules can be represented and computed using FSAs. NFAs and DFAs are the two types of FSAs that are used for evaluation of regular expressions. For high line rate applications a composite DFA can be used, where each character of the input stream can be processed per cycle of memory access. However, this does have a limit on how fast the search can be performed dictated by the memory access speed. Another limiter of such approach is the amount of memory required to search even a modest number of regular expression rules. As discussed above, NFAs also have their limitations to achieve high performance on general purpose processors. In general, today's best of class microprocessors can only achieve less than 100 Mbps performance using NFAs or DFAs for a small number of regular expressions. Hence, there is a clear need to create targeted content search acceleration hardware to raise the performance of the search to the line rates of 1 Gbps and 10 Gbps. This invention shows such a high performance content search hardware that can be targeted for high line rates.

As described earlier, regular expression can be represented using FSA like NFA or DFA. FIG. 1a illustrates Thompson's construction for the regular expression (xy+y)*yx. Thompson's construction proceeds in a step by step manner where each step introduces two new states, so the resulting NFA has at most twice as many states as the symbols or characters and operators in the regular expression. An FSA is comprised of states, state transitions, and symbols that cause the FSA to transition from one state to another. An FSA comprises at least one start state, and at least one accept state where the start state is where the FSA evaluation begins and the accept state is a state which is reached when the FSA recognizes a string. Block 101 represent the start state of the FSA, while block 105 is an accept state. Block 102 represents state 2 and 104 represents state 3. The transition from state 2 to state 3 is triggered on the symbol x, 103 and is represented as a directed edge between the two states. Thompson's NFA comprises of 'ϵ' transitions, 116, which are transitions among states which may be taken without any input symbol.

FIG. 1b illustrates Berry-Sethi NFA for the regular expression (xy+y)*yx. Berry and Sethi described an algorithm of converting regular expressions into FSA using a technique called 'marking' of a regular expression. It results in an NFA which has a characteristic that all transitions into any state are from the same symbol. For example, all transitions into state 1, 107, are from symbol 'x'. The other characteristic of the Berry-Sethi construct is that number of NFA states are the same as the number of symbols in the regular expression and one start state. In this type of construction, each occurrence of a symbol is treated as a new symbol. The construction converts the regular expression (xy+y)*yx to a marked expression $(x_1y_2+y_3)^*y_4x_5$ where each $x_i$ leads to the same state, 107. The figure does not illustrate the markings. Once the FSA is constructed the markings are removed. The FIG. 1b illustrates the NFA with the markings removed. As can be seen from the figure, in Berry-Sethi construction all incoming transitions into a state are all dependent on the same symbol. Similarly, a duality of Berry-Sethi construct also has been studied and documented in the literature as discussed earlier, where instead of all incoming transitions being dependent on the same symbol, all outgoing transitions from a state are dependent on the same symbol. The Berry-Sethi construct is also called a left-biased type of construct, where as its dual is called a right-biased construct.

Finite State Automaton can evaluate incoming symbols or characters against the regular expression language of the automaton and detect when an input string is one of the strings recognized by it. However, it is advantageous in certain conditions to know if a certain sub-expression of the regular expression is also matched. That may be enabled by tagging the NFA as described in the paper by Ville Laurikari referred earlier. Following description illustrates how the inventions of this patent enable tagged NFA realization in PRISM memory. The tagging for sub-expression checking may involve further processing of the FSA to uniquely identify sub-expression matching. However for illustration purpose, if in the regular expression "(xy+y)*yx" if one desires to detect if the sub-expression "xy" is in the recognized string, one can tag the state 4, 110, as a tagged state. Thus, whenever the regular expression transitions through state 4, 110, the sub-expression match or tag match may be indicated. There may also be need to detect if a specific transition leads the regular expression through a desired sub-expression. In such a case a tag start state and a tag end state may be marked. For instance, if it is desired to detect if the transition from state 0 to state 2, 117, is taken then the state 0 may be marked as a tag start state and state 2 may be marked as a tag end state. The tagged FSA implementation may then indicate the beginning of the tag transition when the FSA reaches the tag start state and then indicate the end of the tag transition when the FSA reaches the tag end state. If the FSA moves from the tag start state immediately followed by transitioning into tag end state, then the tagged FSA can indicate the match of a tagged transition. The illustrations in the description below do not illustrate this aspect of tagged NFA, though it may optionally be supported in PRISM and may be easily implemented as follows or other means for example by adding a tag start and tag end state flags (as memory bits or flip-flops) and the logic for the tag transition detection to follow the steps described above as can be appreciated by those with ordinary skill in the art. The patent of this disclosure enables detection of sub-expressions using tagging.

FIG. 1c illustrates a DFA for the same regular expression (xy+y)*yx. DFA is deterministic in that only one of its states is active at a given time, and only one transition is taken dependent on the input symbol. Whereas in an NFA, multiple states can be active at the same time and transitions can be taken from one state to multiple states based on one input symbol. There are well known algorithms in the literature, like subset construction, to convert a RE or NFA to a DFA. One point to note for the DFA that is illustrated for the regular expression is that it has fewer states than both the Thompson NFA as well as Berry-Sethi NFA. The upper bound on the number of states for an N character DFA is $2^N$, however expressions that result in the upper bound in the number of DFA states do not occur frequently in lexical analysis applications as noted by Aho, Sethi and Ullman in section 3.7 of their book on Compilers referenced above. This DFA may be realized in the PRISM Memory using the constructs described below to represent an FSA, using a left-biased realization. Thus PRISM memory of this invention may also be used to program certain DFAs where all incoming transitions to each state are with the same symbol like the DFA of this illustration.

FIG. 2a illustrates a left-biased NFA and its state transition table (prior art). The illustration is a generic four state Berry-Sethi like NFA with all transitions from each node to the other shown with the appropriate symbol that the transition depends on. For example, state A, 201 has all incoming transitions dependent on symbol 'a' as illustrated by example transitions labeled 202 and 203. When the FSA is in State A, 201, an input symbol 'd', transitions the FSA to state D with the transition, 204, from state A to state D. The table in the figure illustrates the same FSA using a state transition table. The column 'PS', 211, is the present state of the FSA, while the row 'sym', 212, is a list of all the symbols that the state transitions depend on. The table 213, illustrates the next state (NS) that the FSA will transition to from the present state (PS) when an input symbol from those in the sym header row is received. In this FSA, state 'A' is the start state and state C is an accept state. Hence, if the FSA is in the present state 'A' and an input symbol 'b' is received, the FSA transitions to the next state 'B'. So when the next input symbol is received, the FSA is in present state 'B' and is evaluated for state transition with the row corresponding to present state 'B'.

FIG. 2b illustrates a right-biased NFA and its state transition table (prior art). The illustration is a generic four state dual of Berry-Sethi NFA with all transitions from each node to the other shown with the appropriate symbol that the transition depends on. For example, state 'A', 205 has all outgoing transitions dependent on symbol 'a' as illustrated by example transitions labeled 208 and 209 where as unlike the left-biased NFA described above, each incoming transition is not on the same symbol, for example transitions labeled 206 and 207 depend on symbols 'b' and 'd' respectively. The state transition table in this figure is similar to the left biased one, except that the FSA transitions to multiple states based on the same input symbol. For example if the FSA is in the present state 'B' and a symbol 'b' is received, then the FSA transitions to all states 'A', 'B', 'C' and 'D'. When an input symbol is received which points the FSA to an empty box, like 216, the FSA has received a string which it does not recognize. The FSA can then be initialized to start from the start state again to evaluate the next string and may indicate that the string is not recognized.

The FIG. 2a and FIG. 2b, illustrate generic four state NFAs where all the transitions from each state to the other are shown based on the left-biased or right-biased construct characteristics. However not all four state NFAs would need all the transitions to be present. Thus if a symbol is received which would require the FSA to transition from the present state to the next state when such transition on the received input symbol is not present, the NFA is said to not recognize the input string. At such time the NFA may be restarted in the start state to recognize the next string. In general, one can use these example four state NFAs to represent any four state RE in a left-biased (LB) or right-biased (RB) form provided there is a mechanism to enable or disable a given transition based on the resulting four states NFA for the RE.

FIG. 3a illustrates state transition controls for a left-biased and right-biased NFA. The figure illustrates a left-biased NFA with a state 'A', 300, which has incoming transitions dependent on receiving input Symbol 'S1' from states 'B', 301, 'C', 302, and 'D', 303. However, the transitions from each of the states 'B', 'C' and 'D' to state 'A', occur only if the appropriate state dependent control is set besides receiving the input symbol 'S1'. The state dependent control for transition from state 'B' to state 'A' is $V_2$ while those from states 'C' and 'D' to state 'A' is $V_3$ and $V_4$ respectively. Transition to the next state 'A' is dependent on present state 'A' through the state dependent control $V_1$. Thus transition into a state 'A' occurs depending on the received input symbol being 'S1' and if the state dependent control for the appropriate transition is set. Thus, one can represent any arbitrary four states NFA by setting or clearing the state dependent control for a specific transition. Thus, if a four states left biased NFA comprises of transition into state 'A', from state 'B' and 'C' but not from the states 'A' or 'D', the state dependent controls can be set as $V_1=0, V_2=1, V_3=1$ and $V_4=0$. Hence if the NFA is in state 'D' and a symbol 'S1' is received, the NFA will not transition into state 'A', however if the NFA is in state 'B' and a symbol 'S1' is received the NFA will transition into state 'A'.

Similarly, FIG. 3a also illustrates states and transitions for a right-biased NFA. The figure illustrates a right-biased NFA with a state 'A', 306, which has incoming transitions from state 'B', 307, state 'C', 308, and state 'D', 309, on receiving input symbols 'S2', 'S3' and 'S4' respectively. However, the transitions from each of the states 'B', 'C' and 'D' to state 'A', occur only if the appropriate state dependent control is set besides receiving the appropriate input symbol. The state dependent control for transition from state 'B' to state 'A' is $V_2$ while those from states 'C' and 'D' to state 'A' is $V_3$ and $V_4$ respectively. Transition to the next state 'A' is dependent on present state 'A' through the state dependent control $V_1$. Thus transition into a state 'A' occurs based on the received input symbol and if the state dependent control for the appropriate transition is set. Thus, one can represent any arbitrary four states right-biased NFA by setting or clearing the state dependent control for a specific transition. All state transition controls for a given state form a state dependent vector (SDV), which is comprised of $V_1, V_2, V_3$, and $V_4$ for the illustration in FIG. 3a for the left-biased and the right-biased NFAs.

FIG. 3b illustrates configurable next state table per state. The left-biased state table for 'NS=A', is shown by the table 311, whereas the right-biased state table for 'NS=A', is shown by the table 312. The state dependent vector for both left-biased and right-biased NFA state is the same, while the received input symbol that drive the transition are different for the left-biased vs. right-biased NFA states. Thus a state can be represented with properties like left-biased (LB), right-biased (RB), start state, accept state, SDV as well as action that may be taken if this state is reached during the evaluation of input strings to the NFA that comprises this state.

FIG. 4a illustrates state transition logic (STL) for a state. The STL is used to evaluate the next state for a state. The next state computed using the STL for a state depends on the current state of the NFA, the SDV, and the received symbol or symbols for a left-biased NFA and right-biased NFA respectively. The InChar input is evaluated against symbols 'S1' through 'Sn' using the symbol detection logic, block 400, where 'n' is an integer representing the number of symbols in the RE of the NFA. The choice of 'n' depends on how many states are typically expected for the NFAs of the applications that may use the search memory. Thus, 'n' may be chosen to be 8, 16, 32 or any other integer. The simplest operation for symbol detection may be a compare of the input symbol with 'S1' through 'Sn'. The output of the symbol detection logic is called the received symbol vector (RSV) comprised of individual detection signals 'RS1' through 'RSn'. LB/RB# is a signal that indicates if a left-biased NFA or a right-biased NFA is defined. LB/RB# is also used as an input in evaluating state transition. The STL for a state supports creation of a left-biased as well as right-biased NFA constructs. The LB/RB# signal controls whether the STL is realizing a left-biased or a right-biased construct. The state dependent vector in the form of 'V1' through 'Vn', is also applied as input to the STL. The SDV enables creation of arbitrary 'n'-state NFAs using STL as a basis for a state logic block illustrated in FIG. 4b. Present states are fed into STL as a current state vector (CSV) comprised of 'Q1' through 'Qn'. STL generates a signal 'N1' which gets updated in the state memory, block 402, on the next input clock signal. 'N1' is logically represented as N1=((V1 and Q1 and (LB/RB# OR RS1)) OR (V2 and Q2 and (LB/RB# OR RS2)) OR . . . (Vn and Qn and (LB/RB# OR RSn)) AND ((NOT LB/RB# OR RS1). Similar signal for another state 'n', would be generated with similar logic, except that the signal 401, feeding into the OR gate, 415, would be 'RSn', which is the output of the 'n'-th symbol detection logic, changing the last term of the node 'N1' logic from ((NOT LB/RB# OR RS1) to ((NOT LB/RB# OR RSn). The state memory, 402, can be implemented as a single bit flip-flop or a memory bit in the state logic block discussed below.

FIG. 4b illustrates a state logic block (SLB). The SLB comprises the STL, 406, Init logic, 408, state memory, 410, the accept state detect logic, 411, the SDV for this state, 407, start flag, 409, accept flag, 412, tag associated with this state, 419, or action associated with this state, 413 or a combination of the foregoing. The SLB receives current state vector and the received symbol vector which are fed to STL to determine the next state. The realization of a state of an arbitrary NFA can then be done by updating the SDV for the state and selecting the symbols that the NFA detects and takes actions on. Further, each state may get marked as a start state or an accept state or tagged NFA state or a combination or neither start or accept or tagged state through the start, tag and accept flags. The init logic block, 408, receives control signals that indicate if the state needs to be initialized from the start state or cleared or disabled from updates, or loaded directly with another state value, or may detect a counter value and decide to accept a transition or not and the like. The init block also detects if the FSA has received a symbol not recognized by the language of the regular expression and then may take the FSA into a predefined initial state to start processing the stream at the next symbol and not get into a state where it stops recognizing the stream. The Init block can be used to override the STL evaluation and set the state memory to active or inactive state. The STL, 406, provides functionality as illustrated in FIG. 4a, except that the state memory is included in the SLB as independent functional block, 410. The state memory, 410, can be implemented as a single bit flip-flop or a memory bit. When the state memory is set it indicates that the state is active otherwise the state is inactive. The accept detect logic, 411, detects if this state has been activated and if it is an accept state of the realized NFA. If the state is an accept state, and if this state is reached during the NFA evaluation, then the associated action is provided as an output of the SLB on the A1 signal, 416, and an accept state activation indicated on M1, 417. If the FSA reaches a state which is flagged as a tagged state using the tag flag, then the match detect logic may indicate a tag match, not illustrated, which another circuit can use to determine the action to be taken for the particular tag. The action could be set up to be output from the SLB on the state activation as an accept state as well as when the state is not an accept state, like a tagged state, as required by the implementation of the NFA. This can enable the SLB to be used for tagged NFA implementation where an action or tag action can be associated with a given transition into a state.

If there are 'n' states supported per FSA rule, then each SLB needs 'n'-bit SDV which can be stored as a n-bit memory location, 3 bits allocated to start, tag and accept flags, 1-bit for LB/RB#, m-bit action storage. Thus if n=16 and m=6, then the total storage used per SLB would be a 26-bit register equivalent which is a little less than 4 bytes per state. If tag start flag and tag end flags are supported, not illustrated, then the number of memory bits would be 28-bits. If multiple tagged expressions need to be enabled then the number of bits for tagging may be appropriately increased.

FIG. 5a illustrates State transition logic (STL) for a state in a left-biased FSA. This figure illustrates state transition logic for a state of an FSA when the logic illustrated above for FIG. 4a is simplified with the LB/RB# set to active and symbol detection logic for one of the states illustrated. The symbol bits are illustrated as 'm-bit' wide as $S_{1m} \ldots S_{11}$ illustrated in block 502. The input character symbol bits are labeled as $cIn_m \ldots cIn_1$, 501. The symbol detection logic illustrated in FIG. 4a, 400, is illustrated as individual bits labeled $E_{1m} \ldots E_{11}$, 503, and is also referred to as symbol evaluation logic in this patent. The symbol dependent vector is labeled $V_{n1} \ldots V_{11}$, 504 which indicates the symbol dependent vector bit enabling transition into state 1 from each of the 'n' states that represent the CSV, $Q_n \ldots Q_1$, 509, of the FSA. RS1, 505, is the result of the evaluation of the input character symbol with one symbol of the FSA, $S_{1m} \ldots S_{11}$ illustrated in block 502. The logic gates, 506 and 507, are NAND gates that form the logic function to generate the next state, Q1, based on the RS1, SDV, $V_{n1} \ldots V_{11}$, and CSV, $Q_n \ldots Q_1$. States $Q_n \ldots Q_2$ would be generated using similar circuit structure as the one illustrated in FIG. 5a, except the RSV bit, SDV and the symbol specific to the particular state will be used. For example, for the generation of state $Q_n$ the Symbol would be $S_{nm} \ldots S_{n1}$, the SDV vector would be $V_{nm} \ldots V_{1n}$, and the RSV bit would be RSn instead of RS1.

FIG. 5b illustrates State transition logic (STL) for a state in a right-biased FSA. This figure illustrates state transition logic for a state when the logic illustrated above for FIG. 4a is simplified with the LB/RB# set to inactive state and symbol detection logic for one of the states illustrated. Key differences between the right biased FSA circuit illustrated in this figure and the left-biased FSA illustrated in FIG. 5a, is that the next state generation logic depends on all received symbol vector bits, RS1, 505, through RSn, 505n, which are the result of the evaluation of the input character symbol with each of the 'n' symbols of the FSA instead of only one RSV bit, RS1, 505, illustrated in FIG. 5a. The logic gates, 506a and 507b, represent the right-biased FSA logic function to generate the next state based on the RSV, RS1, 505, through RSn, 505n, SDV, $V_{n1} \ldots V_{11}$, and CSV, $Q_n \ldots Q_1$. States $Q_n \ldots Q_2$ would be generated using similar circuit structure as the one illustrated in FIG. 5b, except the SDV and the symbol specific to the particular state will be used. For example, for the generation of state $Q_n$ the Symbol would be $S_{nm} \ldots S_{n1}$, the SDV vector would be $V_{nn} \ldots V_{1n}$, and the RSV vector would be the same, RS1, 505, through RSn, 505n.

PRISM memory allows various elements of the FSA blocks to be programmable as discussed below.

FIG. 6A illustrates Right-biased Tagged FSA Rule block in PRISM. As discussed earlier the FSA of PRISM are optionally Tagged. For clarity, FSA rule block, PRISM FSA rule block, PRISM FSA rule memory block, rule block, rule memory block, are used interchangeable in this application. Further, NFA rule block or PRISM NFA rule block or NFA rule memory block, are also used interchangeably and mean a PRISM FSA rule block where the FSA type is an NFA in this patent. The discussion below is with respect to tagged NFA, though it is also applicable for non-tagged NFAs or other FSA types where the tagging elements, described below, are not used or not present. This figure illustrates a state block 1, 601, which comprises of some elements of the state transition logic illustrated in FIG. 5b. The figure illustrates other state blocks, 602 and 603, that represent state blocks 2 through n, where 'n' is the number of states of the NFA or FSA programmed in this PRISM FSA rule block. These blocks are illustrated without details unlike state block 1. The primary difference between the blocks is that each state block generates its own RSV bit and uses only its own state bit from the CSV. For instance state block 2, generates RS2 by evaluating the received character with the symbol programmed in its symbol logic block which is similar to block 502. The state blocks are organized slightly differently than the illustration in FIG. 5b. The logic for one state illustrated in FIG. 5b, is illustrated to be organized in a vertical slice like, 614, where each state block holds portion of the logic necessary to form the final state. In this illustration the state Qn, 508n, is generated by processing the outputs from each state blocks's 'n'-th slice. The SDV vector bits held in each state block are for transition control from the specific state to all other states. For instance the blocks, like 504a, hold different members of the SDV vectors compared to the blocks, like 504. Thus the SDV for each state is distributed amongst multiple state blocks unlike that illustrated in FIG. 5b. For example state block 1, holds SDV vector bits $V_{1n}, V_{1(n-1)}$ through $V_{11}$ indicating state transition vector bits for transitioning out of state 1 to the 'n' states, unlike FIG. 5b which are transposed where the state transition logic for a state holds bits $V_{n1}, V_{(n-1)1}$ through $V_{11}$ for transition into state 1. The indices $V_{XY}$ indicate the state dependent vector bit that enables or disables transition from state X to state Y where each X and Y may have a range from 1 through n, where n is the number of states of the FSA. Thus the SDV of a state indicates the controls for enabling transitions from any state to itself as illustrated in 504, which indicates SDV transition controls from states n through 1 to state 1. As can be noticed the indices of the SDV vector bits are reversed between the FIG. 5b and FIG. 6a. Thus a specific state's SDV is distributed in multiple state blocks and is illustrated aligned vertically like slice 614. This figure also illustrates the initialization logic, 408, illustrated in FIG. 4b as block 605 that affects what value gets loaded in the state memory bit, 508n, under different conditions like initialization, startup, error state, store and load or context switch and the like. Thus SDV vectors for an FSA are written to the FSA rule block in a state transposed manner as described above. The initialization block comprises of initialization/start state vector memory bits. Thus the input into the init block, 605, is logically equivalent to the node N1b in FIG. 5b, adjusted for the appropriate state bit. The state control block, 604, comprises of the logic gates, 507a, which logically NANDs the partial state output, like 615, from the state blocks 1 through state block n. The state control block, 604, further comprises of the init logic blocks, like 605, and the state memory blocks, like 508a through 508n. The FSA Rule block also comprises of tagged match detect block, 613, which may optionally comprise of tagging elements for supporting tagged NFAs. The tagged match detect block comprises of Accept vector blocks, like 610, which comprise of accept vector memory bits and may optionally comprise of tag memory bits. The tagged match detect block further comprises of accept detect blocks, like 611, which comprise of accept state detection and may optionally comprise of tagged state or state transition detection logic. The state memory blocks, like 508a through 508n, may be controlled be clock or enable or a combination signals to step the FSA amongst its states as new input characters are evaluated. The clocked enable signals may provide more control over simple clock by enabling when the FSA should be evaluated. For instance upon finding a match, the FSA controller, 1302, described below may be programmed to hold further evaluation of any symbols for this FSA until the match information is processed. The FSA rule block generates multiple output signals that can be used to indicate the progress of the FSA. The FSA rule block outputs comprise of a Rule Match, 609, which indicates when the regular expression rule programmed in the FSA rule block is matched with characters of the input stream. The Rule Match signal may be used by the local or global priority encoder and evaluation processor, blocks 1315 and 1213 respectively described below, to decide on next steps to be taken based on user programmed actions and/or policies. The priority encoder and evaluation processors may optionally comprise of counters that may be triggered upon specific rule matches. The counters may be used for several purposes like statistical events monitoring, match location detection in the input stream and the like. The priority encoders may also decide the highest priority winner if multiple matches are triggered and then the output may be used to find the appropriate action associated with the matched regular expression rule. The FSA rule block output may optionally comprise of Tag Match signal(s) that may be used by the priority encoders and evaluation processors to detect partial regular expression matches. The number of tag match signals per FSA rule block may depend on the number of sub-expressions that are allowed to be detected in a given NFA. The FSA rule block is organized as a series of memory locations that each hold a portion of the FSA rule evaluation information using memory circuits like the SDV memory, Symbols memory, Mask vectors (discussed below) memory, initialization or start state vector memory, accept state vector memory, optionally tag state flag or vector memory, the FSA states memory or current state vector memory and the like. The FSA rule block comprises of FSA evaluation circuits interspersed amongst the memory blocks storing the FSA programmable information like the SDV, start state, accept state, symbols and the like. The FSA rule blocks evaluate multiple symbols against input stream for matches to step the FSA. Each symbol evaluation block, like 503, may optionally output an indication of a pattern comparison between the input character or symbol and the programmed symbol. These output signals, like 614, 616, 617, can be treated as local content addressable memory match signals. The PRISM memory may optionally support logic that enables generating merged CAM match signals from multiple FSA rule blocks organized in PRISM memory clusters, which may in turn be laid out in rows and columns of PRISM FSA rule blocks, to support larger width pattern matches. Thus the PRISM memory can be used as content addressable memory when enabled to process the CAM match signals. The PRISM memory can be optionally configured such that portions of the memory support CAM functionality while other portions may support FSA functionality or the entire PRISM memory may optionally be configured to behave like FSA memory or CAM memory. The CAM memories typically support functionality to detect 4 byte patterns, 18 byte patterns or even 144 byte patterns. PRISM memory may optionally provide configuration mechanisms to support similar large pattern evaluation by chaining multiple FSA rule blocks's CAM match signals using appropriate logic to generate composite CAM match signals for desired pattern width.

FIG. 6B illustrates Left-biased Tagged FSA Rule block in PRISM. As discussed earlier the FSA of PRISM are optionally Tagged. The discussion below is with respect to tagged NFA, though it is also applicable for non-tagged NFAs or other FSA types where the tagging elements, described below, are not used or not present. Left-biased FSA Rule blocks are similar in functionality as those discussed above for the Right-biased FSA rule blocks except for a few minor differences that enable the FSA rule block to behave as a Left-biased FSA. The state blocks, 601a, 602a, 603a, in the left-biased NFAs receive all RSV vector bits, like 505n, unlike a specific RSV bit per state block in the right-biased NFA. The input to NAND gates like 506b, is the specific RSV bit depending on the bit slice at the bit location in the state block of the NAND gate. Thus bit location 'p' where 'p' can range from 1 through 'n', uses RSp (Received Symbol Vector bit 'p') to generate the partial state block output, 615a. By making such a change in the blocks the NFA may now function as a left-biased NFA. The rest of the blocks perform similar functions as described above for a right-biased NFA.

PRISM memory may comprise of left-biased NFAs, right-biased NFAs or left-biased FSA or right-biased FSA or a combination of them or may be comprised as selectable left-biased or right-biased NFAs with logic similar to FIG. 4a. All such variations are within the scope of this invention, as may be appreciated by one with ordinary skill in the art.

FIG. 21 illustrates PRISM search compiler flow which is used for full and incremental rules distribution. For clarity, the PRISM search compiler is also referred to as search compiler or compiler in this patent application and the terms are used interchangeably. The search compiler of FIG. 21 allows an IT manager or user to create and compile the search and security rules of different types as illustrated by 2101, 2102 and 2103, without limitations. Even though, the illustrated rules list primarily security type rules there may be regular expression rules for other application that needs content search like many applications listed in this patent application. The compiler flow would optionally be provided with the characteristics of the specific nodes like the security capability presence, the rules communication method, the size of the rule base supported, the performance metrics of the node, deployment location e.g. LAN or SAN or WAN or other, or the like for specific security or network related search applications. The compiler flow may optionally use this knowledge to compile node specific rules from the rule set(s) created by the IT manager or the user if appropriate for the application. The compiler comprises a rules parser, block 2104, for parsing the rules to be presented to the PRISM FSA Compiler, block 2106, which analyzes the rules and creates rules database used for analyzing the content. The rule parser may read the rules from files of rules or directly from the command line or a combination depending on the output of the rule engines, like blocks 2101, 2102 and 2103. The rules for a specific node are parsed to recognize the language specific tokens used to describe the rules or regular expression tokens and outputs regular expression (RE) rules, 2105. The parser then presents the REs to the PRISM FSA compiler which processes the REs and generates NFAs for REs. Optionally if tagging is supported by the specific PRISM instance, and if REs use tagging, the PRISM FSA compiler then decides whether the REs will be processed as a NFAs or tagged NFAs based on the PRISM memory capability. It then generates the NFAs or tNFAs rules in a format loadable or programmable into PRISM memory and stores the database in the compiled rules database storage, 2108.

Rules distribution engine, block 2109, then communicates the rules to specific system or systems that comprise of PRISM memory. The search rules targeted to specific systems may be distributed to a host processor or a control processor or other processor of the system that comprises PRISM memory. A software or hardware on the receiving processor may then optionally communicate the rules to the PRISM memory by communicating with the external interface, block 1202, and the PRISM controller, block 1203, described below to configure and/or program the PRISM memory with the FSA rules. The Rules distribution engine, 2109, may optionally communicate directly with the PRISM controller, block 1203, through the external interface block 1202, if the external interface and PRISM controller optionally support such functionality. The rules may be distributed using a secure link or insecure link using proprietary or standard protocols as appropriate per the specific node's capability over a network.

FIG. 12 illustrates PRISM block diagram. As may be appreciated by one with ordinary skill in the art, that many different variations of these blocks and their configuration, organization and the like can be created from the teachings of this patent and are all covered without limitations. PRISM controller, block 1203, communicates with the rules distribution engine, block 2109, or with a master processor or a companion processor like a host system microprocessor or a control processor or a network processor or a switch processor or an ASIC based controller or processor or the like to receive appropriate compiled rule tables prior to starting content inspection. It programs the received rules into the appropriate PRISM FSA rule blocks, described earlier, by working with the address decode and control logic block 1204, coupled to the PRISM controller, block 1203, and the PRISM memory cluster arrays, block 1210. There may be multiple rules being stored in each PRISM memory cluster array's FSA rule blocks. There may optionally be multiple application specific contexts, not illustrated, supported by the PRISM memory cluster arrays. Once the rules distribution engine communicates the compiled rules to the PRISM controller as described above and they are setup or programmed in their respective FSA rule blocks, PRISM memory is ready to start processing the data stream to perform content inspection. The PRISM memory state configuration information is received via the external interface block, 1202, which may communicate on a system bus or a network or the like with a master processor or a companion processor, not illustrated, as described above. The PRISM memory of this patent may be deployed in various configurations like a look-aside configuration or flow-through configuration or an accelerator adapter configuration or may be embedded inside variety of processors or logic or ASICs or FPGA or the like as discussed earlier as well others not illustrated. In a look-aside or an accelerator adapter configuration, the PRISM memory may optionally be under control of a master processor which may be a network processor or a switch processor or a TCP/IP processor or classification processor or forwarding processor or a host processor or a microprocessor or the like depending on the system in which such a card would reside. The PRISM controller, 1203, receives the configuration information under the control of such master processor that communicates with the rule engine to receive the configuration information and communicates it to the PRISM memory. Once the configuration is done, the master processor provides packets or data files or content to the PRISM memory for which content inspection needs to be done. The external interface, 1202, used to communicated with a master processor may be standard buses like PCI, PCI-X, PCI express, RapidIO, HyperTransport or LA-1 or DDR or RDRAM or SRAM memory interface or there derivatives or the like or a proprietary bus. The bandwidth on the bus should be sufficient to keep the content search memory operating at its peak line rate. The PRISM memory may preferably be a memory mapped or may optionally be an IO mapped device in the master processor space for it to receive the content and other configuration information in a look-aside or accelerator configuration. PRISM memory optionally may be polled by the master processor or may provide a doorbell or interrupt mechanism to the master to indicate when it is done with a given packet or content or when it finds a content match to the programmed rules.

The PRISM controller receives incoming data for examination using regular expression rules or for examination using patterns to be matched, and may optionally store them into data buffer/memory, block 1207, before presenting it to the PRISM memory cluster arrays. The PRISM memory may optionally directly stream the content to be examined to the content stream logic, block 1208, which may stage the content for examination by the PRISM memory cluster arrays, block 2110. The PRISM controller maintains the record of the content being processed and once the content is processed it informs the master processor. The PRISM memory cluster arrays inform the global priority encoder and evaluation processor, block 1213, of the results of the search. When a match to a rule is found the priority encoder and evaluation processor may retrieve an action associated with the rule from the global action memory, block 1217, depending on programmable policies and may optionally provide this to the PRISM controller. The PRISM controller may optionally inform the master processor about the search results. The PRISM controller may execute the specific action or policy defined for the rule match. The actions may optionally comprise to stop further content evaluation, enable a certain set of rules to be examined by enabling appropriate cluster array and pass the content through that PRISM memory cluster array for further examination, or inform the master processor of the result and continue further examination or hold the match result in on-chip or off-chip memory or buffers for the master processor to request this information later or any combination thereof or the like. If the PRISM memory is configured to examine network traffic in a flow-through configuration, not illustrated, it may also be programmed to drop the offending packet or stop the specific TCP connection or the session or the like. Optionally the master processor may receive the match information and may take specific actions on the content stream.

The address decode and control logic, block 1204, is coupled to the PRISM controller, 1203, the external interface, 1202, the PRISM memory cluster arrays, 1210, the global priority encoder and evaluation processor, 1213, the database expansion port, 1218 as well as other blocks through a coupling interface, 1215. The PRISM memory may support a large number of regular expressions in some preferred embodiments as discussed above, however if there are applications that need more rules, then there may optionally be a database expansion port, 1218, which would enable the expansion of the rules by adding additional PRISM memory (ies) to the database expansion port. The database expansion port may provide a seamless extension of the number of rules and may use additional memory space in the host or master processor. There are multiple ways of enabling the database expansion as may be appreciated by those with ordinary skill in the art. The address decode and control logic is also coupled to optional, cluster address decode and FSA controller, block 1302, and decodes addresses for the PRISM memory locations which are used to hold FSA rule block programming information as well as the FSA state information. It may perform the address decode, memory read, memory write and other PRISM memory management control functions by itself or working in conjunction with cluster address decode and FSA controller. The blocks 1204 and optionally 1302, may be programmed to provide configuration information for the clusters. The configuration information may optionally comprise of size of the NFAs e.g. 8-state or 16-state or the like, CAM functionality enabling, tagged NFA related configuration, context addresses if appropriate for local cluster context addressing and/or global context addresses, clusters specific configurations that may support a mixed CAM and Regular Expression functionality at the PRISM memory level, action memory association for specific FSA rules or clusters or a combination thereof and the like. The PRISM memory cluster arrays and other blocks like global and local priority encoder and evaluation processor, blocks 1213 and 1315, local (not illustrated) and global action memories, block 1217, and the like get configured and programmed with information before the content inspection begins. Further, since PRISM memory supports dynamic reconfiguration of rules, its programming and configuration may be updated during the content inspection as well for example when a new security threat has been discovered and a new rule to catch that security violation needs to be programmed. The PRISM memory provides ability to support multiple content streams to be processed through the PRISM memory cluster arrays, using context mechanism which associates each content stream with a specific context, which may optionally be assigned a specific context ID.

FIG. 13a illustrates PRISM Memory cluster block diagram. There may be options to have multiple content streams and hence multiple contexts may optionally be simultaneously operated upon in different PRISM memory FSA clusters, illustrated in FIG. 13a. For clarity, PRISM Memory cluster, memory FSA cluster, a cluster, memory cluster and memory FSA cluster are used interchangeably in this patent. A given cluster and its associated FSAs may also be able to support multiple content streams using the context information. When a new content stream starts getting processed by a FSA rule block or a cluster or the like, it may traverse through various FSAs whose states may need to be saved, if the content stream is not fully processed, when the same FSAs need to start processing another content stream. The local context memory, block 1312, or global context memory, block 1212, or external memory (not illustrated) coupled to external memory controller, block 1221, or a combination thereof may be used to save the state of active FSAs for a given context before the FSAs are switched to operate on a different context. Further, the new context may have its saved context restored in the specific FSAs before content from that context starts to be processed. The local context memory along with global context memory affords the benefit of very fast context switching for active contexts simultaneously across multiple clusters and FSAs without creating a context switch bottleneck. The number of contexts being stored locally per cluster and those stored globally or externally is a function of the manufacturing cost and other tradeoffs which will be apparent to the one with ordinary skill in the art. Typically the amount of information that needs to be stored and retrieved per context may be limited to the NFAs or FSAs that are in the process of recognizing a specific string defined by its regular expression. In general most NFAs or FSAs may be continuously be starting to analyze the input streams from a start state if the strings being searched are not very frequent in the content being search. The FSA controller, block 1302, coupled with blocks 1204, and the local and global context memories and their respective memory controllers as well as the blocks 1213 and 1315, the local priority encoder and evaluation processor, takes the steps to perform the context switch if contexts are enabled before processing a new context.

The cluster address decode and FSA controller, block 1302, may decode incoming addresses for configuring, reading or writing from PRISM memory locations or the like of the cluster PRISM array, block 1308 which is comprised of an array of PRISM FSA rule blocks illustrated above in FIG. 6A and FIG. 6B, and also referred to as PRISM Search Engines (PSE), block 1303, and activates memory location's word line and/or bit lines or other word lines or content lines or mask lines or the like or a combination thereof, described below to read, write and/or access the specific PRISM memory location. There may optionally be cluster specific bit line drivers and sense amplifiers, block 1309, and bit line control logic, block 1310, which may be used to read or write specific bits in the cluster PRISM array, block 1308. These circuits are well understood by memory designers with ordinary skill in the art. The sense amplifiers and drivers may optionally be present at the global PRISM memory level illustrated in FIG. 12, depending on the tradeoffs of die area, performance, cost, power and the like which one with ordinary skill in the art can easily appreciate. The benefit of having local sense amps and drivers is potentially creating lower interconnect load for individual memory bits, which in turn can help improve the performance. Typically the block 1302 may be operating during the configuration, context switching or other maintenance operations like storing and retrieving specific NFA or FSA state information, or refreshing specific PRISM FSA memory bits if appropriate and the like. Generally during content processing the block 1302 may be dormant unless there is a match or an error or the like when it may start performing the necessary tasks like communicating the match, action, policy, error or the like to the PRISM controller, initiating context switching and the like. The PRISM controller, block 1203, coupled with the content stream logic, block 1208, content staging buffer, 1209, address decode and control logic, block 1204, and the cluster FSA controllers, block 1302, may present the content to be examined to the PRISM FSA rule blocks. The content to be examined may be streamed by the block 1208 from the data buffer or memory, 1207, or from external memory, or a combination into the content staging buffer. The content staging buffer, 1209, is coupled to cluster search buffer, 1306, and cluster search control, 1307 to align the appropriate content to the clusters for searching. The content staging buffer may hold content from the same context or multiple contexts depending on the configuration of the clusters and the like. The content is presented to the cluster PRISM array, 1308, that comprises of the PRISM NFA rule blocks for examination in a sequence timed using a control signal like a clock or enable or a combination. The NFA rule blocks perform their inspection and indicate whether there is any rule match or optionally if there is any CAM pattern match or optionally any tag match and the like. The match signals are looked at by cluster level local priority encoder and evaluation processor, block 1315, which may determine if there is a match and if there are multiple matches which match should be used, or all matches should be used or the like depending on the configuration. This block 1315, may be coupled to global priority encoder and evaluation processor, block 1213, which may perform a similar operation by examining match signals from multiple clusters. The local and global evaluation processors of these blocks may optionally generate address(es) for the winning match(es) to the global action memory or external memory or a combination that may store appropriate action information that needs to be retrieved and processed to determine action(s) that need to be taken as a result of specific rule match(es). There may be optional cluster level action memory, not illustrated, for fast retrieval of action information. This cluster level action memory may act as a cache of the global and/or external memory based action storage. As described earlier the FSA controller, block 1302, coupled with local context memory, block 1312, its memory controller, block 1313, along with the local and global evaluation processor and priority encoders coupled to global action and context memories, may be used to store and retrieve context information from and to configure the PRISM cluster arrays with appropriate FSA states.

FIG. 13*b* illustrates PRISM Memory duster detailed block diagram. This figure illustrates more detail of the PRISM memory duster block diagram illustrated in FIG. 13*a* and described above. The PRISM memory clusters comprise of PRISM Search Engines (PSE), blocks 1303, which comprise of the right-biased or left-biased NFA or FSA rule blocks or a combination which may optionally be tagged as illustrated in FIG. 6A and FIG. 6B and described above. The PSEs may optionally comprise row-wise, column-wise or a combination there of or the like mechanisms to enable PRISM FSA extension and optionally allow creation of PRISM based FSA rule groups. The FIG. 13*b* illustrates the PSEs arranged in an array with 'n' rows and 'm' columns where 'n' and 'm' may be any integer value and may depend on design, cost, process technology, performance, power and other parameters that one with ordinary skill in the art will appreciate. One exemplary embodiment may comprise of 'n=128' and 'm=8' providing 1024 PSEs per PRISM memory cluster. The PSEs may optionally comprise of mechanisms for extending the FSAs. The PSEs may comprise row-wise FSA extension, column-wise FSA extension or a combination thereof. The PSEs are coupled to each other and may optionally be coupled to the local priority encoder and evaluation processor, block 1315, for row-wise FSA extension using one or more signals, illustrated by lines 1321(1) through 1321(n). The PSEs may also be coupled to each other in a column-wise manner using one or more signals represented as a group of lines, 1320 (21) through 1320(nm), coupling PSEs to their column-wise neighbors. Such signals may be used to provide a column-wise FSA extension. The PRISM cluster priority encoder and evaluation processor, block 1315, may further comprise configurable controls that would allow any group of extensible FSAs to be coupled to other groups of FSAs local to the PRISM memory cluster or inter-clusters (i.e. between multiple PRISM memory clusters) or a combination thereof. Cluster Address Decode and FSA Controller, block 1302, provides controls, 1304(1) through 1304(n) like word line address and the like for each PSE and its internal memory elements like the SDV, Symbols and the like which are used to configure the PSEs with appropriate RE rules converted or compiled in to programmable FSA data structures. It may also be coupled to the cluster search controller, block 1307, and sense amps and read buffers, block 1319. The cluster search controller, block 1307, may receive the byte values to be configured into the PSEs and may comprise the bit line drivers for the PSE memories. The sense amps and read buffers may comprise the sense amplifiers and data read buffers to read and store the information retrieved from the PSE array. Once the PRISM memory clusters are configured with the RE rules, the content to be processed may be presented to the cluster search controller. The cluster search controller, block 1307, is coupled to the columns of PSEs using signals, 1322(1) through 1322(m), that may comprise bit lines for each of the 'm' columns of the PSE array. The cluster search controller may present the same content symbols or characters or bytes or the like, to each column of the array such that every FSA can process each incoming symbol and be evaluated simultaneously. However, if the PRISM cluster is configured to be used as content addressable memory, the content search controller may present the content in chunks of 'm' symbols or chunks of two 'm/2' symbols or the like to the PSE array. The PSEs provide the indication of whether a match with the programmed rules is detected or not or if a tag is matched or not or the like in a row-wise manner to the local priority encoder and the evaluation processor, block 1315, using the signals, 1311(1) through 1311(n), that couple the PSEs in a row with the block 1315. The local priority encoder and evaluation processor may receive the match signals and based on optional policy programmed, provide the winning match if multiple match signals are asserted simultaneously or may record each match or a combination. It may also provide counters to keep track of the specific location in the incoming content stream where a match or a set of matches were generated. It may further provide actions associated with specific RE or FSA rules being activated and may comprise of stopping the processing of the specific content flow or content stream or content session or the like; or generating an alert or activating a new rule group or stopping a certain rule group from further examination or a combination there of or the like. It also communicates with the global priority encoder and evaluation processor, 1213, to take appropriate actions similar to those described above. The content read into the read buffers of block 1319, may be coupled to the local cluster context memory, 1312, or global context memory, 1212, or external memory controller, 1221, through the signals 1317, block 1315, signal 1314, signals 1211 and signals 1215 for storage to the appropriate memory location internal to the PRISM chip or an external memory coupled to the block 1221 using the external interface signals 1220.

Each PSE of a PRISM memory cluster may be addressed using one PRISM Memory location or a set of PRISM memory locations or a combination thereof. All internal memory elements of a PSE like the each state dependent symbol memory, mask vector memory, SDV memory, or the initialization vector memory and the like may each be mapped as individual memory locations in the PRISM memory address space or may each be addressable in a PSE address space once the PSE is selected from a PRISM memory address or the like as may be appreciated by one with ordinary skill in the art. One preferred embodiment may comprise of 22 PRISM Memory address bits where in the upper 17 address bits are used to select a specific PSE in an embodiment with 128,000 PSEs and the lower 5 address bits are used to select a specific memory element of the selected PSE as described above. Other variations of such an arrangement are within the scope and spirit of this invention as may be appreciated by one with ordinary skill in the art. The number of address bits allocated to select PSEs depends on the number of PSEs and the number of address bits allocated to select memory elements of a PSE depend on the number of memory elements in one PSE, which may in turn depend on the number of states per PSE, FSA extension mechanisms per PSE, symbol size and the like as may be appreciated by one with ordinary skill in the art. Further, a specific PSE within a cluster may be addressed or selected by PRISM memory cluster row address and a column address which would be derived from the PSE address bits. One preferred embodiment of PRISM memory with 128,000 PSEs may use 128 rows and 8 columns of PSEs per PRISM memory cluster, there by supporting 1024 PSEs per PRISM memory cluster. In such a PRISM memory embodiment, upper 7-bits of the 22-bits for PSE address may be allocated to select a specific PRISM memory cluster, and the next 10 bits of the PSE address may optionally be used to select a specific PSE in a PRISM memory cluster while the lower 5 bits may optionally be used to select a specific memory element of the selected PSE of the selected PRISM memory cluster. The 10-bit address for selecting a specific PSE of a PRISM memory cluster, may further be allocated such that upper 7-bits of that may be used as a PSE row address selection and the remaining 3-bits of the address used as a PSE column address selection. There are multiple other ways to perform the addressing of PRISM memory as may be appreciated by one with ordinary skill in the art and all such variations are within the spirit and scope of the teachings of this invention.

FIG. 7A illustrates a state block bit in PRISM. The state block bit may comprise of symbol logic, block 703, which may comprise symbol memory block (symbol bit), block 708, to store a bit of a symbol of the FSA rule block. It may further comprise of an optional mask memory block (bit), block 709, to store an optional mask bit of a mask vector that may be applied during the symbol evaluation. The mask bit may indicate whether the associated symbol and the input character bits should be evaluated or not. The state block bit may further comprise of an optional mask circuit, block 710, which performs the masking operation when active. The state block bit further comprises of a symbol evaluate circuit, block 711, which is used to evaluate the input character bit against the symbol stored in the symbol memory block bit. In the illustration, the symbol memory is illustrated to store specific characters, though the symbols may be more complex than a simple character, for example a range of characters or logical or arithmetic operators for a specific character or the like. When the symbol is extended beyond a simple character, appropriate changes may be necessary in the symbol evaluation circuit to support more complex symbol evaluation as may be appreciated by those with ordinary skill in the art. This patent covers such symbol extensions as well. The state block bit also comprises of a SDV memory block (bit), block 712, for storing a bit of the state dependent vector used to determine whether specific state is enabled to transition to another state or not as discussed earlier. The state block bit may also comprise of partial state eval circuit, block 713, that may evaluate a portion of the state transition logic by coupling the SDV memory block (bit), the RSx, 704, and the state Qy, 716. In a preferred embodiment this may be a NAND gate circuit similar to 506 or 506a illustrated in FIGS. 5a and 5b. The partial state evaluate circuit may generate an output signal STxy, 717, that may indicate if a specific transition from the state x to state y is enabled and activated. Multiple state block bits with their appropriate memory bits like those described and illustrated above may be address as a group of memory locations. Thus for example an FSA supports 8 bit symbols and 8-state NFA, then 8 state block bits may be arrayed together to form one state block like block 601. Eight such state blocks along with state control block, 604, and tagged Match detect block, 613, may be grouped together to create an FSA or NFA rule block. The specific collection of symbol bits of a state block may be accessible as a group of a specific memory location. In this case one symbol of the 8-state NFA may be accessed as a byte of one memory address that points to it. Thus in an organization of PRISM memory as illustrated, eight one byte memory locations may be used to address each symbol for the NFA. It will be appreciated by those with ordinary skill in the art that other organizations of the PRISM memory are possible without digressing from the teachings of this patent and are all covered by the teachings in this patent. Similarly, the mask vectors of an NFA or FSA rule block occupy a set of memory locations. The memory locations for all the memory elements of the FSA rule blocks are decoded by the global and/or local cluster address decoder and FSA controllers discussed above. They generate specific word line and bit line controls to access these memory locations. The state block bit comprises of a word line input, 701, which selects the word line for the symbol memory block. The appropriate bit lines, BL/ML, 707, and their complement, BLn/MLn, 714 may also be activated depending on whether the symbol is being read or written to the memory location. In this illustrations bit lines and mask bit lines are shared lines, 707 and 714, but may be separate lines as may be appreciated by one with ordinary skill in the art. The bit lines and their complement bit lines connect to sense amplifiers, like 1309, not illustrated in this figure, like those in FIG. 13, to read the value of the location addressed by the specific word line. The bit line and its complement may be driven to desired values when the operation is to write the specific memory location selected by the word line. The FIG. 7A illustrates multiple word lines for the different memory blocks in a state block. The state block bit may comprise of an optional Mask Word line, 702, to address the optional mask memory block. The state block bit may further comprise of another word line, WL2, 705, that is used to address the SDV memory block. Thus three memory locations may be used to represent a state block in the NFA rule block in PRISM. These may be contiguous locations or partitioned differently based on the similarity of the type of information being stored. Thus if an NFA or FSA supports 8 states, there may be 24 memory locations in the PRISM memory address space that may be used to represent the memory in the state blocks. Further the NFA accept vector, start vector and optionally the tag vectors may occupy a location each in the memory space. The NFA state vector may also optionally use up another location, not illustrated, in the PRISM memory space. Thus an 8-state NFA or FSA may use 28 to 30 memory address locations to store the related information of the FSA. If the symbols are wider for example when symbols are 16-bits, and the FSA states are 8, the organization of the PRISM memory may be done slightly differently, not illustrated, to maintain the modular arrays as may be appreciated by one with ordinary skill in the art. The symbols may be used to occupy more than one address location addressed by separate word lines or may occupy a wider word if a single word line is used. Using the appropriate addressing and read, write operations of the memory, the PRISM NFA rule blocks may be programmed and dynamically reconfigure the realized regular expressions.

The symbol evaluate circuit, 711, generates a signal, RSx and/or CAM matchx, 704, which is used to indicate when the input content character or symbol matches the programmed symbol. The content symbol or character to be examined with the programmed symbol, is presented to the state block bit on the content bit lines CL, 740, and complement bit line CLn, 715 which are coupled to the symbol evaluate circuit. The symbol evaluate circuit further couples to the mask memory block bit and the symbol memory block bit through the mask circuit, 710, and evaluates if the content bit presented to this state block bit matches with the programmed symbol bit. The output of the symbol evaluate circuit is the RSx/CAM matchx signal 704, which is coupled between multiple symbol evaluate circuits of all state block bits of a state block, and is asserted when all the bits of the symbol programmed in the state block match their corresponding symbol bits of the input content to being examined. The figure illustrates separate bit lines and their complement lines for content and mask and other programming information illustrated by the lines, 740 and 707 or 714 and 715. Those with ordinary skill in the art can appreciate that the positive and complement bit lines may each be on the same signal or may each be on a separate signals. Thus all variations of these implementations are covered by the teachings of this patent. The bit lines used to store and retrieve the information to memory elements may optionally be separate from the content lines, as illustrated in the FIG. 7A for various reasons, like performance, interconnect load, die size, cost, power and the like.

FIG. 8A illustrates symbol logic bit in PRISM. This figure illustrates the circuit detail for the symbol logic, 703, of the state block bit illustrated in FIG. 7A. This figure illustrates the BL (bit line), CL (content bit line) and ML (mask bit lines) sharing the same signal as described above as a memory design choice. They may each be separate as discussed earlier, in which case the connectivity will be different to the appropriate elements of the symbol logic bit. The symbol logic bit illustrates a realization using static memory architecture for the memory bits. The transistors, 810, 825, 826, 827, 828, and 829 form a typical six transistor static memory cell which are coupled to the bit line using the line 806, and the complement of the bit line by the line 824. The transistors, 825 and 827, may optionally comprise of p-channel metal oxide semiconductor (PMOS) field effect transistor (FET) device in a complementary metal-oxide semiconductor (CMOS) process technology, while the transistors, 810, 826, 828, 829, may optionally comprise of the n-channel metal oxide semiconductor (NMOS) field effect transistor (FET) devices. These six transistors coupled together as illustrated in the FIG. 8A form a static memory cell. Memory cells comprised of other transistor devices in other process technologies like SiGe, Bipolar or the like providing similar functionality as those in this patent are all within the scope and spirit of the teachings of this patent as may be appreciated by those with ordinary skill in the art. The transistors 825, 826, 827 and 828 are setup as back to back inverters which are written to from the BL, 802, and BLn, 805, coupled to transistors 810 and 829 respectively, when word line WL, 801 is selected which activates the devices 810 and 829 and when the BL and BLn are driven by the bit line drivers with the logic value and its complement respectively to be stored in the memory cell. This memory cell stores a symbol bit. If a logic value '1' needs to be stored, the BL is driven by '1' and BLn by '0'. If the WL is active then the logic value gets stored in the symbol memory bit. When the symbol memory bit needs to be read the BL and BLn may not be driven actively other than pre-charging. The sense amplifiers attached to the bit lines may then detect the differential in the voltage swing on BL and BLn to read the symbol memory bit. The transistors, 812, 814, 815, 816, 817 and 818 form a similar six transistor memory cell as above, where the transistors 814 and 816 may optionally be of PMOS type, while the others may optionally be of NMOS type, for storing the symbol mask bit, which is accessed by selecting mask word line (MWL), line 803. This memory location is used to store the symbol mask bit. The symbol mask bit when set enables the symbol evaluation and disables the evaluation when the mask bit is disabled. Reverse setup is also feasible, except the connectivity between the symbol memory cell and the mask memory cell would need to be changed appropriately. The device pairs 808, 809 and 821, 822 are coupled to the symbol bit and mask bit and form a XOR functionality by coupling with the RSx/CAM Match x pre-charged line 804. This line 804, is shared between adjoining symbol logic bits of a NFA or FSA rule block. This line is pulled low, if any of the bit pairs of the content and the symbol do not match. The line stays high only if all the bits of the symbol match all content bits. The mask bit is coupled to devices 808 and 809 by the signal 813. When the mask bit is set, device 815, is turned-on which enables the path from devices 808 and 809, when the content value on CL, 802, coupled to device 809, is '1' and when the symbol bit value is '0', a value of '1' is coupled to 808 by signal 811 which enables the path from the RSx/CAM Match x, line 804, to ground, GND, This causes the match signal 804 to be pulled-down or low indicating a mismatch. Similarly the transistors 821 and 822, provide the complement function as the devices 809 and 808, forming a XOR function on the RSx or CAM Match x signal, line 804. Thus, the match signal, 804, stays high or active only when all the bits of the symbol and the content input match respectively. Though the symbol evaluation illustrated is a compare operation, other operations like range detect, or other ALU operations may be implemented with appropriate circuits added without digressing from the teachings of this application as may be appreciated by those with ordinary skill in the art.

FIG. 9 illustrates Partial State Logic Bit in PRISM. This figure illustrates a circuit for the partial state logic block, 706. The partial state logic bit comprises of a memory bit for state dependent vector. The transistors 906, 912, 913, 914, 915 and 918 form a typical six transistor static memory cell configuration to store the SDV bit. The operation of this memory bit is similar to the memory bits described above. The word line WL2, 901, selects devices 906 and 918, and the BL/CL/ML, and the complement are coupled to the memory cell from 905 and 920 respectively. The transistors 908, 909, 910, 911, 916 and 919, form the three input NAND gate between the stored SDV bit, the input state Qy, 921 and the RSx line 902 coupled to transistor 911 using signal 904. The NAND gate generates the partial state transition control signal STxy, 917, that indicates if there is a transition from state 'x' to state 'y' activated similar to the signal 717. Even though the circuit of the NAND gate is fully static, it may be possible to use pre-charged circuits to realize the same function with fewer gates as may be appreciated by those with ordinary skill in the art. The transistors, 912, 914, 908, 916, 919, illustrated in FIG. 9 may optionally be of the PMOS type, while the other transistors illustrated in FIG. 9 may optionally be of NMOS type.

FIG. 10a illustrates state control block in PRISM. This figure illustrates the state control block, 604, with the appropriate elements labeled. Essentially the NAND gates, 1001(1) through 1001(n) are bit specific state transition control logic portions that logically NAND the partial state outputs from the state blocks. The blocks 1002(1) through 1002(n) are the initialization blocks described earlier and the blocks 1003(1) through 1003(n) hold the states of the NFA or FSA rule block.

FIG. 10b illustrates local Init Detect Circuit in PRISM. This circuit may be optionally used to detect if the states of the FSA reach an error, which in this case is assumed to be all state bits to be inactive or low. The FSA is evaluating a symbol only when at least one of the states is set, otherwise the FSA may reach an error state and stop evaluating the input content. To prevent such a condition, the circuit illustrated in FIG. 10b is used to generate a local initialization signal whenever all the states of the FSA are inactive. This signal, LInit, can then be used to set the FSA to a predefined start state. The signal LInit, 1018, is pre-charged to an active high value. Whenever, at least one of the state bits, Q1 through Qn is active the transistor coupled to that state, 1007(1) through 1007(n) respectively, is turned on and the signal LInit is pulled to an active low state, however when each of the state bits is inactive, the LInit signal stays high indicating a local initialization signal which gets processed by state control block bit gates 1019 and the multiplexer, 1015, that then initializes the state bit, 1032, to the start state memory bit coupled through signal 1024 and the multiplexer 1014 and 1015 to the state memory bit, 1032. As illustrated in this FIG. 10b, all transistors may optionally be of NMOS type except transistor 1006 which may optionally be of PMOS type.

The FIG. 10c illustrates state control block bit in PRISM. This block bit stores the initialization vector or start state bit in a typical six transistor static memory configuration created using the transistors, 1008, 1010, 1012, 1011, 1013 and 1009. The start state bit is selected by the FSA controller by driving the word line ivWL, 1027, which is coupled to devices 1008 and 1009. The value on the BL and BLn is coupled through those transistors into the memory cell during write and is read onto the bit lines during a read operation. The output of the memory cell, 1024, is used as one of the inputs to a multiplexer, 1014 which may optionally be present to enable selection of the initialization vector bit. When the Load signal, 1017, is asserted, the value of signal LSn, 1016, is coupled to the output of the multiplexer, 1022 but when Load signal is not asserted the start state bit, 1024, is coupled to 1022. The signal LSn, may optionally be provided as a means to load a state context that was saved earlier or any other state value to be loaded into the state bit, 1032. The state bit, may alternatively be written using a memory bit and be coupled with the other initialization logic appropriately. The Load signal may be asserted by the FSA controller to indicate updating the state bit value. During normal operation the signal 1025 that acts as a select signal for the multiplexer 1015 is inactive, selecting the output of the bit location specific gate like 1001(n) which indicates the state transition of the FSA during normal content evaluation. However, if the local initialization signal is asserted then path from the start state bit 1024, to the state bit, 1032 is enabled and the state bit gets initialized. There may also be a need to provide a global cluster wide or PRISM memory wide initialization, which is controlled by asserting global initialization signal GInit, 1018b which again enables the path from the start state bit 1024 to the state bit 1032. The state control block may generate state bit signals Qn, 1029 and optionally signal Qnb, 1030. The state bit,

1032, may be updated at synchronized interval with other parts of the memory, using a control signal, 1031, which may be a clock or an enable signal or other signal like hold or a combination.

FIG. 11 illustrates Tagged match detect block bit in PRISM. As discussed earlier the FSA of PRISM are optionally Tagged. The discussion below is with respect to tagged NFA or FSAs, though it is also applicable for non-tagged NFAs or FSAa where the tagging elements, are not used or not present. The tagged match detect block bit comprises of an accept state memory bit, formed by the familiar six transistor static memory bit as earlier memory bits, where the transistors 1106, 1110, 1112, 1111, 1113 and 1114 form the accept state memory bit. The devices 1106 and 1114 are coupled to the word line AWL, 1101, which selects the accept memory bit when it needs to be read or written. These devices are also coupled to the four transistors forming the back to back inverter and the bit lines, 1104 and 1115. This memory bit is read and written in a manner similar to the description for other memory bits above. The tagged Match Detect block bit may optionally comprise of a tag state memory bit which may be set to detect a sub-expression evaluation as described earlier. Additional tag state bits and state transition tag bits may be optionally present in PRISM tagged match detect block bit as discussed earlier but are not illustrated in this figure. The optional tag memory bit is again stored in a typical six transistor memory cell comprising the transistors, 1124, 1125, 1126, 1127, 1128 and 1129. This memory location may be selected by asserting word line TWL, 1119. The operation of the tag memory cell is similar to other memory cells described above. The rule match detection is formed by coupling accept state bit 1107 and the FSA state Qn, 1102, through the devices 1108 and 1109. When accept state bit is set, it indicates that the particular state bit is an accept state, meaning that when the FSA evaluation reaches that state a string recognized by the regular expression rule programmed in the NFA is found and hence a rule match should be signaled. The Rule Match signal, 1103, is an active low signal as illustrated. It is precharged to a high value as long as a state which is an accept state is not reached. However, when On signal is asserted and the accept state bit 1107, corresponding to that state signal Qn, is set, the devices 1108 and 1109 pull the rule match signal low, indicating a match. The rule match signal is shared with the adjoining bits of the FSA, so when any of the accept state bit is matched the Rule Match signal is asserted to an active low value. The polarity of the rule match signal can be reversed by selecting appropriate bits to couple to the transistors 1109 and 1108. Similarly, if the tagging is supported, the devices 1130 and 1132, couple to the tag match signal, 1122 and pull it down if the tag is asserted and the FSA state is also asserted. The rule match and tag match signals from individual NFA rule blocks in a PRISM cluster array may be evaluated by the local and/or global priority encoder and the evaluation processors of PRISM memory illustrated in FIGS. 12 and 13 and appropriate actions taken as described above.

FIG. 14 illustrates a computing device with content search memory based accelerator. The computing device may be a server, a workstation, a personal computer, a networking device like a switch or a router or other type of device. This is one type of configuration in which a content search accelerator using one version of the content search memory of this invention may be used. The figure illustrates a computing device comprising one or more CPUs, 1400 (1) through 1400 (*n*), at least one chipset, 1402, at least one memory component, 1401, with at least one content search accelerator, 1403, and zero or more adapters providing other functions. The content search accelerator may comprise of content search memory (PRISM), 1404. It may also comprise at least one memory component, 1405, coupled to the content search memory. There are many different system configurations that may be created with the content search memory of this invention. Hence the examples in this patent should not be used as limiting the scope, rather they are primarily a means to explain the content search memory in a few sample usage scenarios. The content search memory of this patent may be used on line cards, network adapters or network interface controllers, storage networking cards, IO cards, motherboards, control processing cards, switching cards or other system elements of systems like networking devices such as routers, switches, management devices, security devices, gateways, virtualization devices, storage networking devices, servers, storage arrays, and the like. The content search memory or its components may also be coupled to or embedded in or a combination thereof, the microprocessors, network processors, regular expression search processors, content search processors, multi-core processors, switching chips, protocol processors, TCP/IP processors, control plane processors, chipsets, control processors or other devices, including being incorporated as a functional block on these processors or chips. The content search memory may be used to perform content inspection at high line rates in the systems in which it is incorporated to offload or assist in content processing to the main processors of such systems. There may be configurations where multiple content search memories may also be incorporated in systems to provide scaling in performance or number of rules or a combination thereof for content search. The content search memory may be incorporated on network line cards, in line with the traffic and offer line rate deep packet inspection when coupled to a networking processor or TOE or packet processor or the like.

The configuration illustrated in FIG. 14 may optionally be used for email security or instance message security or outbound security or extrusion detection or HIPAA compliance or Sarbanes-Oxley compliance or Gramm-Leach-Bliley compliance or web security or the like or a combination thereof. The security capabilities listed may comprise anti-spam, anti-virus, anti-phishing, anti-spyware, detection/prevention of directory harvest attacks, detection/prevention of worms, intrusion detection/prevention, firewalls, or the like or detection/prevention of leaks of confidential information, health care information, customer information, credit card numbers, social security numbers or the like or a combination thereof. The content search memory in such device may be configured with a set of security rules for one or more of the applications listed above and provide acceleration for content search for information incoming or outgoing from the device. Content search memory device may be deployed at any place in the network, like close to or embedded in a router or a switch or gateway of an organization's networks or at a departmental level or within a datacenter or a combination and provide high speed content inspection to incoming or outgoing traffic flow of the network.

FIG. 15 illustrates example anti-spam performance bottleneck and solution. As discussed earlier, content search performance using a DFA or NFA based search on a microprocessor results in below 100 Mbps performance. FIG. 15 illustrates an anti-spam application as an example application to show the value of hardware based content search. The performance numbers are not illustrated to scale. The figure illustrates four vertical stacks of operations in four types of appliances. The first stack, 1500, is illustrated to represent an email appliance stack. An email appliance typically may comprise device drivers to drive the hardware devices on the appliance, the networking protocol stack along with other functions of the Operating System (OS) and a mail transport agent (MTA) which are all typically software components along with other application software. Today's servers, which are typically used for email appliances, are able to keep up with network line rates of up to 1 Gbps, and perform the application functions due to the high performance processors. Typically a 1 GHz processor is required to process 1 Gbps line rate traffic for network protocol stack processing. Since the state of art processors are around 4 GHz today, the servers can handle the network traffic and have processing power available to do other needs of the OS and the applications running on a server. Thus the email appliance stack, 1500, running on a high end server, should be able to keep up with a high line rate. A study by network world magazine, "Spam in the Wild: Sequel" done in December 2004, showed the performance comparison of a large number of anti-spam software and appliance vendors. Under their configuration the range of the message processing performance of the vendor products listed was from around 5 messages per second to 21 messages per second. When this performance number is translated into line rate performance using the worst case message sizes used by network world of 10,000 characters per message, the line rate performance comes to be below 2 Mbps sustained performance. All the vendors either software or appliance solutions were based on dual Xeon processor servers. Thus, a server that can handle 1 Gbps network line rate traffic, when performing anti-spam application its performance drops down to below 10 Mbps. The reason for this is that one of the features used extensively by most anti-spam vendors is searching of emails against a set of rules, which are typically represented as regular expressions. The anti-spam appliance stack, 1501, illustrates the email appliance with anti-spam capability loaded on it. Anti-spam applications typically performs many complex regular expression rules based filtering along with statistical filtering, reputation based filtering and the like. The anti-spam rules are typically applied sequentially to each incoming email one after the other to find a rule that may match the content of the email. Then the anti-spam application may apply scores to the rules that match and then decide if a message is spam or not based on the total score it receives. Such an operation causes the stack performance needs to grow substantially higher than a typical email appliance stack, where the anti-spam filters, 1505, overhead on the performance of the appliance is substantial to reduce the over all anti-spam server appliance performance to be below 10 Mbps. The content search memory of this invention can be used in such anti-spam appliances to achieve significant performance improvements. The hardware accelerated anti-spam appliance stack, 1502, illustrates the impact of using the search memory of this invention on the overall performance of the system. In such a case, all the anti-spam filters, 1511 thru 1513, may be configured on the search memory, 1506, which in turn may be used to inspect each incoming message. Since all rules would be searched simultaneously, the search memory based appliance can achieve well above 1 Gbps line rate performance or more, since the host CPU is relieved from the performance intensive regular expression searches. The compute device illustrated in FIG. 14 may be one such configuration that may be used as the anti-spam appliance to achieve multiple orders of magnitude higher performance than a standard server based anti-spam appliance. The stack, 1503, illustrates a stack of an enhanced messaging appliance which may use a TCP/IP offload processor for offloading the protocol processing from the host CPU along with the content search memory of this invention. Thus a significant amount of CPU bandwidth can be made available to other applications which may not have been possible to execute on the computing device without significant performance impact. The use of TCP/IP offload and content search memory may be done individually or in combination and the use of one does not require the use of the other. TCP offload and content search memory could be on the same device providing network connectivity and the acceleration. Although the discussion above is with respect to anti-spam application, other critical network applications like Intrusion Detection and Prevention systems suffer from similar performance issue, where the line rate gets limited by memory access time if a composite DFA type solution is used. Typical IDS/IPS performance on a single processor based solution does not scale above 1 Gbps. The content search memory of this invention can be applied for IDS/IPS regular expression search performance issues and can achieve one to two orders of magnitude higher line rate inspection than any composite DFA based solutions.

FIG. 16 illustrates an anti-spam with anti-virus performance bottleneck. This figure is very similar to FIG. 15, except that the anti-spam appliance whose stack is illustrated also supports anti-virus capability. Anti-virus searches are different then the anti-spam searches but they also add a significant performance overhead as illustrated by the stack, 1604. The number of filters for anti-virus is lot larger then those for anti-spam, though when a content search memory of this invention is used the anti-virus overhead can also be substantially reduced as illustrated by 1605.

FIG. 17 illustrates application content search performance bottleneck and solution. The content search memory of this invention can be used as a search accelerator for a large number of applications that require content search but do the search on the host processor or host CPU or host microprocessor or the like. Since, the performance of these processors for content search is not very high as discussed above, a content search memory based accelerator can substantially increase the performance of these applications. The applications that require content search are many like data warehousing applications, database applications, bioinformatics related applications, genetics, proteomics, drug discovery related applications and the like. The figure illustrates three boxes, 1700, 1701 and 1702 which represent the content search based application performance in terms of host CPU load. The traditional applications run on a server or a workstation or personal computer, and perform content search interspersed with other tasks that the application needs to perform. If the applications perform a significant amount of search, then the performance need of the search portions of the application can be substantially higher then the other parts. This is illustrated by content search portions of applications app1 and appN, 1703 and 1705 respectively, compared to the other code of these applications, 1704 and 1706. The stack in 1700 is how current or prior art solution exists for content search applications. Though the stack illustrates a continuous stack for content search and other code sections, the actual execution may generally be composed of search interspersed with other code functions. When a content search memory and accelerator of this invention is used in the computing device performing this function, it may be possible to have the application leverage the search capabilities of the memory and accelerate the performance of the application substantially compared to a computing device without the search acceleration support. The stack in 1701, illustrates the impact on the CPU load and the resulting time spent by the application when converted to leverage the content search accelerator. The stacks 1703 and 1705, could take substantially less load and time as illustrated by stacks, 1707 and 1708 respectively. Similarly, the performance of the system may be further increased by offloading the TCP/IP protocol processing as illustrated by 1709. As described above, TCP/IP offload and content search offload are independent of each other and may each be done without the other in a system. However, one could also use the content search memory with the TCP/IP processor together as separate components or on the same device and achieve the performance benefits.

FIG. 18 illustrates an example content search API usage model. As discussed above, the content search memory may be used to accelerate content search portions of generic applications. To enable an ease of creation of new applications and migrate existing applications to leverage such search memory acceleration capability this invention illustrates an application programming interface (API) for content search. An example content search API is illustrated in FIG. 19 and described below. The content search API may reside in the user level or the kernel level with user level calls, or a combination. The FIG. 18 illustrates the content search API at the user layer, 1807. The content search API would provide API functions that any application can call to get the benefit of content search acceleration. There would be a convention of usage for the applications to use the content search API. For example the application may be required to setup the search rules that can be configured on the search memory using the API calls before the application is run or may be required to dynamically create the rules and set them up in the appropriate format so that they can be configured on the content search memory using the API or a combination. There would be API calling conventions that may be established dependent on the hardware system, the operating system or the search memory or a combination. The applications may then be coded to the API conventions and benefit from the search memory acceleration. The figure illustrates applications App1, 1800 through App N, 1803, working with the content search API, 1807 to get access to the content search memory/acceleration hardware, 1817, using logical interface paths illustrated as 1812, 1813 and 1814. The content search API may access the services and resources provided by the content search memory/accelerator through a port driver which may be running under a kernel. The applications may pass the content to be searched directly through this interface or put the content to be searched as well as tables to be setup as needed, in the application's buffers, 1804, 1805, and then instruct the content search memory to retrieve the information from these buffers through the content search API. The API may map these buffers to the kernel space so the port driver for the search API can provide them to the content search memory or the buffers may be made available for direct memory access by the search memory hardware. The search memory may store the content in on-chip or off-chip memory buffers, 1818, and then perform the requested search on the content. Once the search is complete the results of the search may be provided back to the application using a doorbell mechanism or a callback mechanism or data buffers or the like as allowed by the operating systems' model. The content search API may provide a polling mechanism as well which may be used by the application to check and/or retrieve the search results.

FIG. 19 illustrates an example content search API with example functions. The figure illustrates a set of functions which may be a part of the example content search API. Though, the list of functions may be more or less than those illustrated, the functions provide a basic set that would enable an application to use the content search memory hardware with the use of the API. The example functions do not illustrate the input, output or return parameters for API function calls, which may depend on the operating system, calling conventions and the like as can be appreciated by one with ordinary skill in the art. An application may use the API, by first querying the capabilities of the PRISM content search memory and then initializing it with appropriate rules, pointers, permissions and the like that may be required for the content search memory to communicate with the application and its resources through the kernel or the user mode or a combination. The application may set specific rules as tNFA rules or NFA rules which may get configured in the search memory. An application may be given access to multiple contexts that it may be able to leverage to perform context based search. The application can start performing the search against its content once the content search memory is appropriately setup with all necessary rules. The application can communicate the content to be searched directly to the search memory using the API by sending a byte stream of the content through the interface. There may be versions of an API function, not illustrated, like sendData( ) which may be used by an application to start sending data to the search memory, start the search and to indicate when the search memory should stop searching. A more efficient way of performing the search may be that the application may fill a buffer or a set of buffers to be searched, and then provide the search memory with a pointer(s) to the buffer(s) so it can then start searching the buffers with the configured rules once it receives a call to start the search using an API call like startHWsearch( ). The search memory may have been initialized to communicate the results of the search to the application through one of many mechanisms like copying the results to a result buffer or storing the result on the memory associated with the search memory or invoking a callback function registered by the application to the operating system or the like. The search memory may also communicate to the application with a doorbell mechanism to inform it that the search is done. There are many different ways of communicating the information as described earlier and may be dependent on the operating system and the system hardware architecture as can be appreciated by one with ordinary skill in the art. There may also be polling mechanism available with an API function like is SearchDone( ), not illustrated, which may provide the answer to a query to the search memory whether a specific search is complete. If the answer from the PRISM memory to the application is that the search is done, then the application may ask for the specific result using an API call like getRes( ), or the application may ask for a pointer to a buffer that may hold the result using an API call like getResPtr( ) illustrated in FIG. 19. Once the application is done with the specific search or is done using the search memory it may call the API function stopHWsearch( ) to stop the PRISM memory from performing the search for this application. There may also be an API call like removeAppContext( ), not illustrated, which may be called by the application to indicate to the OS and the search memory hardware that the application is done using the search memory and hence all its associated context may be freed-up by the search memory hardware for use by another application that may need the search memory resources. There may be other hardware features specific API calls as well, like setRuleGroup( ), selectRuleGroup( ), setinitGroup( ) and the like, that may allow an application to create groups of rules and the order of their execution using mechanisms of rule grouping using the PRISM cluster arrays that may enable rule groups. As discussed earlier there may be many more functions and variation of API functions that can be created to enable a general content search application acceleration using a hardware search memory from the teachings of this patent that will be appreciated by one with ordinary skill in the art. Thus it is possible to create a content search API to provide content search capabilities to general applications. Though, the description above is given with an example where the rules to be used are setup by an application before starting the search, it may be possible to update the rule set that is configured in the search memory dynamically while the search is in progress by adding, removing and/or modifying the rules that have already been configured to start using the updated rule set for any future searches by the application.

FIG. 20 illustrates an example application flow (static setup) using the search memory. The flow illustrates a static process for setting up the rules and the search memory although as discussed above a dynamic setup is also feasible as would be obvious to one with ordinary skill in the art. The flow may allow an application to add/remove/modify rules in the search memory as the application executes at runtime to enable a dynamic flow. The illustration provides a mechanism where existing applications or new applications may be updated with content search rules and API calls which can enable the application to use a content search memory. An application source, 2000, may be updated, 2001 to create application source with modifications for content search where the content search rules may be setup in distinct code sections or may be clearly marked, 2002, as expected by the content search compiler coding conventions, which is then compiled by a content search aware compiler, 2003. The compiler generates an object code, 2004, with content search rules compiled in sections which a loader may use to configure them in the search memory. The application object code may then be distributed to customers or users of content search memory for accelerating the application's search performance. The application code may be distributed electronically using the internet, world wide web, enterprise network, or other network or using other means like a CD, DVD, or other computer storage that can be used to load the application. The application update, 2001, may be done manually or using a tool or both as appropriate. The distributed object code, 2006, is read by the loader, 2007, or a similar function provided by an operating system to which the application is targeted, and setup for execution on the system. The loader or another function may use a set of content search API calls or a port driver or other OS function or a combination to configure the content search memory with appropriate rules that the application needs as coded in the object code as illustrated by block 2008. Once the search memory hardware is setup and other resources that the application needs get reserved or setup, the application is started, 2009, by the OS. The application may execute or perform tasks, 2010, if needed before content search. The application may then setup the content, 2011, it needs to search by the search memory. Then it starts the search memory to perform search, 2013. Once the search is done it may retrieve the results, 2014. While the search is being conducted by the search memory, the application may continue to perform other tasks, 2012, on the main CPU or other elements of the system. If the application is done the application may exit, otherwise the application may continue the execution where more tasks may be performed including new search if necessary. The flow diagram illustrates the execution of tasks as a loop from 2015 to 2010, though the tasks being executed may be very different from one time to the next through the loop. The loop is not illustrated to mean that the same code sequence is being repeated. It is meant to illustrate that the type of tasks may be repeated. Further, not all tasks from 2010 through 2015 may need to be present in an application flow as may be appreciated by one with ordinary skill in the art. Once the application is done, it may release all the resources it uses beside those for the content search memory.

FIG. 21 illustrates a PRISM search compiler flow (full and incremental rule distribution). The flow can be used for distributing search rules or security rules when the full set of rules are defined or when any updates or modifications are made to the rule set and incremental changes to the rule set need to be communicated and configured in the search memory. The search memory may be used in a distributed security architecture within system nodes across a network which may be a LAN, WAN, MAN, SAN, wireless or wired LAN and the like. The rules like application layer rules, network layer rules or storage network layer rules or any other search rules may be created using manual or automated means and provided as inputs to the search compiler flow in a predefined format. The search compiler's rule parser, 2104, parses the rules and converts them into regular expression format if the rules are not already in that form. Then the regular expression rules are converted into FSA rules compiled to the node capabilities of the node that has the content search memory and stored in the rules database. The rules from the rule database are retrieved and distributed by the rules distribution engine to the appropriate node(s) with the search memory. The search or security rules may be distributed to the host processor or a control processor or a host microprocessor or a network processor or a master processor or a combination thereof as appropriate depending on the node capability. The rules may be distributed using a secure link or insecure link using proprietary or standard protocols as appropriate per the specific node's capability over a network. The network may be a local area network (LAN), wide area network (WAN), internet, metro area network (MAN), wireless LAN, storage area network (SAN) or a system area network or another network type deployed or a combination thereof. The network may be Ethernet based, internet protocol based or SONET based or other protocol based or a combination thereof.

The PRISM memory of this invention may be manufactured into hardware products in the chosen embodiment of various possible embodiments using a manufacturing process, without limitation, broadly outlined below. The PRISM memory in its chosen embodiment may be designed and verified at various levels of chip design abstractions like RTL level, circuit/schematic/gate level, layout level etc. for functionality, timing and other design and manufacturability constraints for specific target manufacturing process technology. The design would be verified at various design abstraction levels before manufacturing and may be verified in a manufactured form before being shipped. The PRISM memory design with other supporting circuitry of the chosen embodiment at the appropriate physical/layout level may be used to create mask sets to be used for manufacturing the chip in the target process technology. The mask sets are then used to build the PRISM memory based chip through the steps used for the selected process technology. The PRISM memory based chip then may go through testing/packaging process as appropriate to assure the quality of the manufactured product.

Thus the inventions of this patent cover various aspects like:

A memory architecture comprising programmable intelligent search memory (PRISM) for content search wherein the PRISM memory provides search capability for regular expression based search.

The PRISM memory further comprises an array of search memory circuits that provide the regular expression search functions for searching content from documents, messages or packets or other data received from the network or the local host or a master processor or a network processor or TCP Offload Engine or Processor or Storage Network processor or a security processor or other processor or a combination thereof.

The PRISM memory further comprises of a plurality of clusters of the search memory circuits that provide regular expression search functions for a plurality of regular expressions. The search memory circuits comprise of memory elements to store symbols of finite state automata representing the regular expressions. The search memory circuits further comprise memory elements to store mask vectors (MV) that may be applied to the stored symbols. The mask vectors are coupled to the symbol memory elements and the content being searched through symbol evaluation circuits that detect whether the received content comprises of the symbols being searched. The search memory circuits further comprise of memory elements to store elements of state dependent vectors (SDV) which are used to decide the state traversal by the search memory for the finite state automata. The search memory circuits further comprise of match detect circuits that operate by coupling with the memory elements for symbols, MVs, SDVs, and the symbol evaluation circuits for multiple states of the FSAs to decide on the traversal of the states in the FSA based on the content being searched and the programmed symbols, SDVs, and MVs. The search memory circuits may further comprise tag and match detect circuits that operate to provide tagged FSA and regular expression search, wherein the tagged FSA is used to detect sub-string or partial regular expression match beside a full regular expression match.

The memory elements of the PRISM memory comprise of static memory cells. The memory elements are each independently addressable in a random order. The PRISM memory further comprises of circuits to couple the content search memory with other logic to provide coupling with processors that can interface to the PRISM memory integrated circuits. The PRISM memory further comprises of a controller for interfacing with the processors to receive the content to be searched. The PRISM memory may further comprise of address decode logic circuits which decode the received address to select the specific static memory cells location to be read or written. The memory elements of the search memory may each be uniquely addressed to read or write appropriate values in the memory elements. The address decoding logic and the controller generate control signals necessary to address the appropriate memory locations of the static memory cells based search memory. The control signals are coupled to the PRISM arrays as a series of word lines and bit lines that can randomly be used to access desired memory locations.

The memory elements of PRISM support detection of character pattern strings. The PRISM memory comprises of symbol detection circuits and may optionally comprise of mask vectors per symbol bits, that may be used to evaluate received character string using simple XOR based compare or other logic function and create a match indication. The PRISM match signal processing circuits may logically combine multiple match signals from each symbol detection block to generate a composite match signal which would be activated only if all the symbols have a match. The composite match signal creates a match functionality like a traditional CAM chip and thus enable PRISM chip to be partially or fully configured to behave like a CAM provide a pattern matching functionality beside regular expression search.

While the foregoing has been with reference to particular embodiments of the invention, it will be appreciated by those with ordinary skill in the art that changes in these embodiments may be made without departing from the principles and spirit of the invention.

The invention claimed is:

1. An integrated circuit chip comprising programmable intelligent search memory for content search wherein said programmable intelligent search memory performs regular expression based search, said programmable intelligent search memory for content search using one or more regular expressions, said one or more regular expressions comprising one or more symbols or characters, said one or more regular expressions converted into one or more finite state automata representing the functionality of said one or more regular expressions for programming in said programmable intelligent search memory, said one or more finite state automata comprising a plurality of states, said plurality of states derived from said one or more symbols or characters of said one or more regular expressions, said content comprising one or more input symbols provided as input to said programmable intelligent search memory, said programmable intelligent search memory comprising at least one of each of:
   a. a symbol memory circuit to store said one or more symbols or characters;
   b. a symbol evaluation circuit coupled to said symbol memory circuit to evaluate match of said one or more symbols or characters stored in said symbol memory circuit with said one or more input symbols of said content;
   c. a state dependent vector (SDV) memory circuit to store state transition controls for said one or more finite state automata;
   d. a current state vector (CSV) memory circuit to store said plurality of states; and
   e. a state transition circuit coupled to said symbol evaluation circuit, a current state vector memory circuit and said state dependent vector memory circuit to perform state transition from one or more first states to one or more second states of said plurality of states of said one or more finite state automata.

2. The integrated circuit chip of claim 1, wherein the symbol memory circuit, the state dependent vector memory circuit, and the current state vector memory circuit of the programmable intelligent search memory comprise static random access memory circuits.

3. The integrated circuit chip of claim 1, wherein the programmable intelligent search memory further comprises at least one of:
   a. a memory circuit to store a mask vector coupled to said one or more symbols to enable or disable evaluation of specific bits of said one or more symbols by said symbol evaluation circuit;
   b. received symbol vector signals generated by said symbol evaluation circuit to flag when said content comprises said one or more symbols of said one or more finite state automata;
   c. an accept state vector memory circuit to store which of said one or more states are accept states, said accept states used to detect when said one or more regular expressions have matched with said content;
   d. a tag state vector memory circuit to store which of said one or more states are tag states, said tag states used to detect when said one or more regular expressions have partially matched with said content;
   e. a start state vector memory circuit to store initialization values of said one or more states;

f. a regular expression match detect circuit to detect a match in said content with said one or more regular expressions;

g. a tag match detect circuit to detect a tag match in said content for said one or more finite state automata that are tagged to detect partial regular expression match or to detect sub-string match or a combination thereof; or h. any combination of a through g above.

4. The integrated circuit chip of claim 3, wherein the programmable intelligent search memory further comprises the memory circuits that are each independently addressable in a random order.

5. The integrated circuit chip of claim 1, wherein the programmable intelligent search memory further comprises circuits to couple said programmable intelligent search memory to at least one functional block or circuit or both.

6. The integrated circuit chip of claim 5, wherein the functional block comprises a microprocessor, multi-core processor, network processor, graphics processor, switch processor, microcontroller, TCP Offload Engine, network packet classification engine, protocol processor, regular expression processor, security processor, content search processor, network attached storage processor, storage area network processor, wireless processor, mainframe computer, grid computer, server, workstation, personal computer, laptop, handheld device, cellular phone, wired or wireless networked device, switch, router, gateway, chipset, unified threat management device, and the like or any derivatives thereof or any combination thereof.

7. The integrated circuit chip of claim 1, wherein the symbol evaluation circuit comprises one or more symbol match signals to indicate a match of said one or more stored symbols with said one or more input symbols of said content, a plurality of said one or more match signals coupled together to form a composite match signal.

8. The integrated circuit chip of claim 7, wherein the composite match signal indicates a composite match, said composite match signal asserted only when each of said one or more symbol match signals are coupled to form said composite match signal and have a match with a plurality of said one or more symbols of said content.

9. The integrated circuit chip of claim 7, wherein the one or more finite state automata are non deterministic finite state automata.

10. The integrated circuit chip of claim 7, wherein the one or more finite state automata are tagged non deterministic finite state automata.

11. The integrated circuit chip of claim 7, wherein the one or more finite state automata are deterministic finite state automata.

12. The integrated circuit chip of claim 7, wherein the one or more finite state automata are programmable finite state automata comprising said one or more states wherein each state of the said one or more states is coupled to at least one of said state dependent vector memory circuit to control and program which of said one or more states are coupled to said each state.

13. The integrated circuit chip of claim 7, wherein the one or more finite state automata comprise said one or more states wherein each state of said one or more states is entered from a set of said one or more states coupled to said each state using same said input symbol of said content being searched.

14. The integrated circuit chip of claim 7, wherein the one or more finite state automata comprise said one or more states wherein each state of said one or more states is exited to a set of said one or more states coupled to said each state using same said input symbol of said content being searched.

15. The integrated circuit chip of claim 7, wherein the one or more finite state automata comprise said one or more states wherein a set of said one or more states are programmed as accept states, said accept states for use to detect when said one or more regular expressions have matched with said content being searched.

16. The integrated circuit chip of claim 7, wherein the one or more finite state automata comprise said one or more states wherein a set of said one or more states are programmed as tag states, said tag states used to detect when said one or more regular expressions have partially matched with said content being searched.

* * * * *